(12) United States Patent
Akahane et al.

(10) Patent No.: US 8,047,653 B2
(45) Date of Patent: Nov. 1, 2011

(54) SI-O CONTAINING HYDROGENATED CARBON FILM, OPTICAL DEVICE INCLUDING THE SAME, AND METHOD FOR MANUFACTURING THE SI-O CONTAINING HYDROGENATED CARBON FILM AND THE OPTICAL DEVICE

(75) Inventors: Yoshihiro Akahane, Itami (JP); Takahiro Imai, Itami (JP); Takashi Matsuura, Itami (JP); Tetsuya Katayama, Itami (JP); Toshihiko Ushiro, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 372 days.

(21) Appl. No.: 12/514,238
(22) PCT Filed: Oct. 31, 2007
(86) PCT No.: PCT/JP2007/071191
§ 371 (c)(1),
(2), (4) Date: May 8, 2009
(87) PCT Pub. No.: WO2008/056577
PCT Pub. Date: May 15, 2008

(65) Prior Publication Data
US 2010/0039707 A1 Feb. 18, 2010

(30) Foreign Application Priority Data

| Nov. 10, 2006 | (JP) | 2006-305588 |
| Dec. 4, 2006 | (JP) | 2006-327185 |
| Jan. 15, 2007 | (JP) | 2007-005888 |
| Jan. 15, 2007 | (JP) | 2007-005889 |
| Feb. 14, 2007 | (JP) | 2007-033319 |
| Feb. 22, 2007 | (JP) | 2007-042670 |
| Feb. 27, 2007 | (JP) | 2007-047004 |
| Feb. 27, 2007 | (JP) | 2007-047017 |
| Feb. 27, 2007 | (JP) | 2007-047021 |
| Feb. 27, 2007 | (JP) | 2007-047022 |
| Mar. 2, 2007 | (JP) | 2007-053022 |
| Aug. 31, 2007 | (JP) | 2007-225851 |

(51) Int. Cl.
*G02B 27/42* (2006.01)
*G02B 27/28* (2006.01)
*G02B 5/32* (2006.01)
*G02B 1/12* (2006.01)
*G02F 1/29* (2006.01)
*H05H 1/24* (2006.01)

(52) U.S. Cl. ............... 353/20; 359/485.03; 359/486.01; 359/576; 353/121; 427/249.7; 427/249.15; 427/163.1; 427/906

(58) Field of Classification Search ............... 353/20, 353/121, 122; 427/574, 577, 579, 583, 569, 427/582, 853, 249.1, 249.7, 249.15, 255.11, 427/255.18, 162, 163.1, 164, 167, 902, 906; 359/486, 489, 488, 485.03, 486.01, 491.01, 359/576, 580, 583, 582, 589

See application file for complete search history.

(56) References Cited

U.S. PATENT DOCUMENTS 6,428,894 B1 * 8/2002 Babich et al. ............... 428/408
(Continued)

FOREIGN PATENT DOCUMENTS
JP 06-027398 2/1994
(Continued)

OTHER PUBLICATIONS

"Technique of Ultraprecision Machining and Mass Production of Microlens (Array)", Technical Information Institute Co., Ltd., pp. 71-81 (Apr. 28, 2003).

(Continued)

*Primary Examiner* — William C Dowling
(74) *Attorney, Agent, or Firm* — Venable LLP; Michael A. Sartori; Leigh D. Thelen

(57) ABSTRACT

An Si—O containing hydrogenated carbon film as an optical film has a refractive index in a range from at least 1.48 to at most 1.85 for light of 520 nm wavelength and an extinction coefficient of less than 0.15 for light of 248 nm wavelength, wherein the refractive index and the extinction coefficient are decreased with energy beam irradiation. By utilizing such an Si—O containing hydrogenated carbon film, it is possible to provide various types of optical elements and an optical device including the same.

33 Claims, 27 Drawing Sheets

U.S. PATENT DOCUMENTS

| | | | |
|---|---|---|---|
| 6,696,157 B1 * | 2/2004 | David et al. | 428/408 |
| 7,218,447 B2 * | 5/2007 | Okubo et al. | 359/489.11 |
| 7,935,461 B2 * | 5/2011 | Nozawa et al. | 430/5 |
| 2002/0113316 A1 | 8/2002 | Shioya et al. | |
| 2003/0117706 A1 * | 6/2003 | Okubo et al. | 359/484 |
| 2004/0087139 A1 * | 5/2004 | Yeh et al. | 438/636 |
| 2005/0064322 A1 * | 3/2005 | Babich et al. | 430/270.1 |
| 2005/0221020 A1 * | 10/2005 | Fukiage | 427/569 |
| 2006/0270226 A1 * | 11/2006 | Hosoya | 438/686 |
| 2009/0026924 A1 * | 1/2009 | Leung et al. | 313/504 |
| 2009/0169770 A1 * | 7/2009 | Padiyath et al. | 427/577 |
| 2010/0092874 A1 * | 4/2010 | Nozawa et al. | 430/5 |
| 2011/0146787 A1 * | 6/2011 | Allen et al. | 136/256 |

FOREIGN PATENT DOCUMENTS

| | | |
|---|---|---|
| JP | 07-333404 | 12/1995 |
| JP | 08-072193 | 3/1996 |
| JP | 08-313845 | 11/1996 |
| JP | 10-096807 | 4/1998 |
| JP | 11-345419 | 12/1999 |
| JP | 2000-508713 | 7/2000 |
| JP | 2000-235179 | 8/2000 |
| JP | 2002-252228 | 9/2002 |
| JP | 2002-299339 | 10/2002 |
| JP | 2003-066324 | 3/2003 |
| JP | 2004-163892 | 6/2004 |
| JP | 2004-341541 | 12/2004 |
| JP | 2005-195919 | 7/2005 |
| JP | 2005-202356 | 7/2005 |
| JP | 2005-326666 | 11/2005 |
| JP | 2006-030840 | 2/2006 |
| JP | 2006-039303 | 2/2006 |
| JP | 2006-053992 | 2/2006 |
| WO | WO 97/40207 | 10/1997 |
| WO | WO 2005/047564 A2 | 5/2005 |
| WO | WO 2005/088364 A1 | 9/2005 |

OTHER PUBLICATIONS

Optronics, No. 11, pp. 149-154 (2001).
O plus E, vol. 25, No. 4, pp. 385-390 (2003).
Optronics, No. 11, pp. 143-148 (2001).
"Large Area Display", edited by Nobuo Nishida, Kyoritsu Shuppan Co., Ltd. (2002).
Glaser et al., "Diffractive optical isolator made of high-efficiency dielectric gratings only", Applied Optics, vol. 41, No. 18, pp. 3558-3566 (2002).
ITE Technical Report, vol. 20, pp. 69-72 (1996).

* cited by examiner (a)

(b)

SI-O CONTAINING HYDROGENATED CARBON FILM, OPTICAL DEVICE INCLUDING THE SAME, AND METHOD FOR MANUFACTURING THE SI-O CONTAINING HYDROGENATED CARBON FILM AND THE OPTICAL DEVICE

TECHNICAL FIELD

The present invention relates to an optical device for use in various optical fields such as information communication, information recording, image pickup, and image display, and a material therefor, and more particularly relates to a transparent thin film having a refractive index changeable by energy beam irradiation.

BACKGROUND ART

Various optical thin films are used so as to control light in the optical fields such as information communication, information recording, image pickup, and image display. Oxide thin films such as $SiO_2$ and $TiO_2$ and fluoride thin films such as $MgF_2$ are used as typical optical thin film materials, and these are utilized for antireflection films, mirrors, filters, and others. Moreover, diffractive optical elements to which optical thin films are applied are used for various applications.

The diffractive optical elements are mainly classified into a relief type and a refractive index modulated type. The relief-type diffractive optical element is formed by alternately arranging local regions of a relatively large thickness and local regions of a relatively small thickness. In other words, a diffraction phenomenon appears because of a phase difference in lights which is caused by a difference in light paths between light passing through a medium of a convex portion corresponding to the local region of the relatively large thickness and light passing through the air in a concave portion corresponding to the local region of the relatively small thickness. Such a relief-type diffractive optical element can be formed by performing processes such as photolithography and etching on a surface of an optically transparent material such as quartz.

The refractive index modulated-type diffractive optical element is formed by alternately arranging local regions of a relatively large refractive index and local regions of a relatively small refractive index. A diffraction phenomenon appears because of a phase difference caused by a difference in light paths between lights that respectively pass through the local regions having different refractive indices. The refractive index modulated-type diffractive optical element can be formed by irradiating a material such as a Ge-doped silica glass or a photopolymer with an energy beam such as an ultraviolet ray or visible light so as to change (modulate) the refractive index of the material. Recently, an example of a refractive index modulated-type diffractive optical element utilizing a transparent diamond-like carbon (DLC) film has been proposed as disclosed in Patent Document 1 of Japanese Patent Laying-Open No. 2004-163892.

In comparison with the relief-type diffractive optical element that requires fine concavities and convexities to be formed, the refractive index modulated-type diffractive optical element has advantages in that its fabrication process is relatively simple and its flat surface prevents contaminants from adhereing thereto, and other advantages. However, it is difficult to greatly change the refractive index of conventional optical materials, and for example, a Ge-doped silica glass has a possible refractive index change $\Delta n$ as small as approximately 0.001, and photopolymers also have a possible refractive index change $\Delta n$ as small as approximately 0.08.

Here, an amount $\Delta n$ of refractive index change in a refractive index modulated-type diffractive optical element directly gives influence on the diffraction efficiency. That is, the diffraction efficiency can be enhanced when the amount $\Delta n$ is larger. In comparison with the relief-type diffractive optical element, therefore, the refractive index modulated-type diffractive optical element is greatly limited in designing thereof in the case of using an optical material having a small $\Delta n$.

In this respect, Patent Document 1 discloses a transparent DLC film in which $\Delta n$ can be increased up to 0.5, thereby enhancing flexibility in designing the optical device. The refractive index of the DLC film can be increased by energy beam irradiation. As the energy beam, it is possible to use a corpuscular beam such as an ion beam, an electron beam, or a neutron beam, or an electromagnetic wave such as an ultraviolet ray, an X-ray, or a gamma ray. Using an ultraviolet ray among these energy beams is most preferable from the viewpoint of throughput, ease in handling, device cost, and the like when industrial application is contemplated.

Patent Document 1: Japanese Patent Laying-Open No. 2004-163892
Patent Document 2: Japanese Patent Laying-Open No. 7-333404
Patent Document 3: Japanese Patent Laying-Open No. 2004-341541
Patent Document 4: Japanese Patent Laying-Open No. 8-72193
Patent Document 5: Japanese Patent Laying-Open No. 2005-202356
Patent Document 6: Japanese Patent Laying-Open No. 11-345419
Patent Document 7: Japanese Patent Laying-Open No. 2006-39303
Patent Document 8: Japanese Patent Laying-Open No. 2005-195919
Patent Document 9: Japanese Patent Laying-Open No. 8-313845
Patent Document 10: Japanese Patent Laying-Open No. 2005-326666
Patent Document 11: Japanese Patent Laying-Open No. 10-96807
Patent Document 12: Japanese Patent Laying-Open No. 2000-235179
Patent Document 13: Pamphlet of WO2005/088364
Patent Document 14: Japanese Patent Laying-Open No. 2003-66324
Patent Document 15: Japanese Patent Laying-Open No. 2006-53992
Patent Document 16: Japanese Patent Laying-Open No. 6-27398
Patent Document 17: Japanese Patent Laying-Open No. 2006-30840
Non-Patent Document 1: "Technique of Ultraprecision Machining and Mass Production of Microlens (Array)" published by TECHNICAL INFORMATION INSTITUTE CO., LTD., Apr. 28, 2003, pp. 71-81.
Non-Patent Document 2: OPTRONICS, (2001), No. 11, pp. 149-154
Non-Patent Document 3: O plus E, Vol. 25, No. 4, 2003, pp. 385-390
Non-Patent Document 4: OPTRONICS, (2001), No. 11, pp. 143-148
Non-Patent Document 5: Large Area Display edited by Nobuo Nishida, KYORITSU SHUPPAN CO., LTD., published in 2002

Non-Patent Document 6: Applied Optics, Vol. 41, 2002, pp. 3558-3566

Non-Patent Document 7: ITE Technical Report, Vol. 20, 1996, pp. 69-72

DISCLOSURE OF THE INVENTION

Problems to be Solved by the Invention

If the ultraviolet light irradiation is used to increase a refractive index of the DLC film, the extinction coefficient of the DLC film, which is not low for an ultraviolet light range, is increased for the ultraviolet light range to a visible light range as the refractive index is increased. Therefore, the ultraviolet light serving as property-modifying light (light that changes properties of the film) is more absorbed near a surface of the DLC film, and thus it becomes difficult to uniformly change the properties in a thickness direction of the film. This is caused by two factors: (1) the ultraviolet light serving as property-modifying light does not deeply penetrate into the film in its thickness direction; and (2) ablation of the film surface proceeds to generate concavities and convexities on the surface, resulting in scattering and diffraction of the ultraviolet light.

Further, an optical element fabricated with use of a DLC film as in Patent Document 1 has a higher refractive index on average, when compared with a generally-used optical element fabricated with use of glass or a transparent resin material. The optical element fabricated with use of a DLC film is therefore more likely to cause light reflection at an interface with the generally used optical element, and thus is not preferable from the viewpoint of adaptability to other generally used optical elements.

Therefore, an object of the present invention is to provide a refractive index modulated-type diffractive optical element having a large amount of refractive index change Δn (i.e., high diffraction efficiency), high transparency for the ultraviolet light range as well as the visible light range, and favorable adaptability to generally-used optical elements, and provide an Si—O containing hydrogenated carbon film serving as an optical film suitable for use in the diffractive optical element. Note that the Si—O containing hydrogenated carbon film in the present application means a hydrogenated carbon film containing Si and O.

Another object of the present invention is to provide various optical elements fabricated by utilization of such an Si—O containing hydrogenated carbon film, and various optical devices including these optical elements.

Means for Solving the Problems

According to the present invention, an Si—O containing hydrogenated carbon film as an optical film includes a refractive index in a range from at least 1.48 to at most 1.85 for light of 520 nm wavelength and an extinction coefficient of less than 0.15 for light of 248 nm wavelength, wherein the refractive index and the extinction coefficient are decreased with energy beam irradiation.

Note that the extinction coefficient for the light of 248 nm wavelength is more preferably less than 0.12 before the energy beam irradiation, and that the refractive index for the light of 520 nm wavelength is more preferably in a range from at least 1.56 to at most 1.76 before the energy beam irradiation.

The refractive index for the light of 520 nm wavelength can be decreased by an amount of change in a range from at least 0.03 to at most 0.40 by the energy beam irradiation, and the decreased refractive index may be at least 1.45. The amount of change in the refractive index is preferably in a range from at least 0.10 to at most 0.30.

In the Si—O containing hydrogenated carbon film before the energy beam irradiation, silicon content is preferably more than $0.80 \times 10^{22}$ atoms/cm$^3$ and less than $1.5 \times 10^{22}$ atoms/cm$^3$, hydrogen content is preferably more than $4.0 \times 10^{22}$ atoms/cm$^3$ and less than $8.0 \times 10^{22}$ atoms/cm$^3$, oxygen content is preferably more than $0.80 \times 10^{22}$ atoms/cm$^3$ and less than $1.4 \times 10^{22}$ atoms/cm$^3$, carbon content is preferably more than $1.5 \times 10^{22}$ atoms/cm$^3$ and less than $2.3 \times 10^{22}$ atoms/cm$^3$, an atomic % ratio of O/Si is preferably more than 0.5 and less than 1.5, and an atomic % ratio of C/Si is preferably more than 1.0 and less than 3.0.

Further, in the Si—O containing hydrogenated carbon film before the energy beam irradiation, degree of density is preferably in a range from more than 1.15 g/cm$^3$ to less than 1.60 g/cm$^3$, and spin density is preferably in a range from more than $1.0 \times 10^{16}$ spins/cm$^3$ to less than $1.0 \times 10^{20}$ spins/cm$^3$.

On the other hand, in the Si—O containing hydrogenated carbon film after the energy beam irradiation, silicon content can be more than $0.80 \times 10^{22}$ atoms/cm$^3$ and less than $1.5 \times 10^{22}$ atoms/cm$^3$, hydrogen content can be more than $1.0 \times 10^{22}$ atoms/cm$^3$ and less than $8.0 \times 10^{22}$ atoms/cm$^3$, oxygen content can be more than $0.80 \times 10^{22}$ atoms/cm$^3$ and less than $3.0 \times 10^{22}$ atoms/cm$^3$, carbon content can be more than $1.0 \times 10^{22}$ atoms/cm$^3$ and less than $2.3 \times 10^{22}$ atoms/cm$^3$, an atomic % ratio of O/Si can be more than 0.5 and less than 2.0, and an atomic % ratio of C/Si can be more than 1.0 and less than 3.0.

Further, in the Si—O containing hydrogenated carbon film after the energy beam irradiation, degree of density can be in a range from more than 1.15 g/cm$^3$ to less than 1.80 g/cm$^3$, and spin density can be less than $1.0 \times 10^{20}$ spins/cm$^3$.

In a method for manufacturing the Si—O containing hydrogenated carbon film as described above, the film is preferably formed by plasma CVD using siloxanes as a source material, and a condition for the plasma CVD is preferably that substrate temperature is at least 80° C. and at most 100° C., high-frequency power is at least 0.5 W/cm$^2$ and at most 1.2 W/cm$^2$, pressure is in a range from at least 6.7 Pa and at most 40 Pa, and the pressure until elapse of at least 3 minutes after a start of film formation is preferably increased continuously at a rate in a range from at least 1.3 Pa/minute to at most 2.7 Pa/minute.

Further, an optical element fabricated with use of the Si—O containing hydrogenated carbon film as described above can include a local region having a relatively high refractive index and a local region having a relatively low refractive index. The local region having the relatively high refractive index can be a region that has not undergone the energy beam irradiation in the Si—O containing hydrogenated carbon film. The local region having the relatively low refractive index can be a region that has undergone the energy beam irradiation in the Si—O containing hydrogenated carbon film.

In a method for manufacturing such an optical element, the local region having the relatively low refractive index can be formed by irradiating the local region of the Si—O containing hydrogenated carbon film with the energy beam that includes a corpuscular beam including an ion beam, an electron beam, or a neutron beam, or an electromagnetic wave including an ultraviolet ray, an X-ray, or a gamma ray. In this case, the energy beam irradiation is preferably performed at an energy density of at least 0.1 MJ/m$^2$.

In the case that the local region having the relatively low refractive index is formed by irradiating the local region of the Si—O containing hydrogenated carbon film with the energy beam, the energy beam irradiation is preferably performed in a state that the Si—O containing hydrogenated carbon film is heated.

The energy beam irradiation to the Si—O containing hydrogenated carbon film is preferably performed in an air atmosphere in a state that the film is heated to a temperature higher than a room temperature and at most 90° C. When the energy beam irradiation is performed in the state that the film is heated, the irradiation is more preferably performed in an atmosphere having an oxygen concentration made lower than that in the air atmosphere. The atmosphere having the oxygen concentration made lower can be one of a nitrogen atmosphere, a noble gas atmosphere, and a reduced-pressure atmosphere. The energy beam irradiation in the atmosphere having the oxygen concentration made lower than that in the air atmosphere is preferably performed in a state that the film is heated to a temperature higher than the room temperature and at most 200° C.

In an optical film according to the present invention, the Si—O containing hydrogenated carbon film may be formed on a substrate, and at least one protective layer made of any of an oxide film, a nitride film, an oxynitride film, a fluoride film, and a film containing carbon and hydrogen as a major component may be superposed on the Si—O containing hydrogenated carbon film. Note that a transparent material plate of at least 10 µm thickness may be additionally joined on the protective layer. Alternatively, an Si—O containing hydrogenated carbon film may be formed on a substrate, and a transparent material plate of at least 10 µm thickness may directly be joined thereon. When these optical films are irradiated with the energy beam to decrease a refractive index of the irradiated region in the Si—O containing hydrogenated carbon film, the energy beam irradiation is preferably performed in a state that the substrate is kept at a temperature higher than 80° C.

A flat plate-type microlens according to the present invention is formed with use of the Si—O containing hydrogenated carbon film, wherein this film includes a region having its refractive index modulated, and produces a lens effect when a light flux passes through the region having its refractive index modulated.

The microlens can be a refraction-type microlens. In this case, a refraction-type lens region having a relatively low or high refractive index may be formed on a side of one main surface of the Si—O containing hydrogenated carbon film, and the lens region may have a spherical lens-like shape surrounded by the one main surface of the Si—O containing hydrogenated carbon film and an interface corresponding to a part of an approximately spherical surface, or a columnar lens-like shape surrounded by the one main surface and an interface corresponding to a part of an approximately cylindrical surface having a central axis parallel to the main surface.

Further, the refraction-type lens region may have an approximately cylindrical shape penetrating the Si—O containing hydrogenated carbon film. In this case, a central axis of the cylindrical shape is orthogonal to the Si—O containing hydrogenated carbon film, and the refractive index is set to be lower or higher as closer to the central axis. Further, the refraction-type lens region may be a band-like region penetrating the Si—O containing hydrogenated carbon film. In this case, the refractive index is set to be lower or higher as closer to a plane that is orthogonal to the Si—O containing hydrogenated carbon film and extends through the center of a width direction of the band-like region.

Further, a microlens according to the present invention can also be a diffraction-type microlens. In this case, the Si—O containing hydrogenated carbon film can include a plurality of band-like ring regions in a manner of concentric circles; The band-like ring regions have their refractive indices relatively modulated to serve as a diffraction grating, and the band-like ring regions placed farther from the center of the concentric circles are set to have smaller or larger widths.

In the diffraction-type microlens including the plurality of band-like ring regions in a manner of concentric circles, the Si—O containing hydrogenated carbon film can include "m" concentric ring zones. Each of the ring zones preferably includes "n" band-like ring regions, inner one of the band-like ring regions preferably has a lower or higher refractive index compared with outer one of the band-like ring regions in each of the ring zones, and the band-like ring regions placed corresponding to each other in different ones of the ring zones preferably have the same refractive index.

Further, in the diffraction-type microlens according to the present invention, the Si—O containing hydrogenated carbon film can also include a plurality of band-like regions parallel to each other, the band-like regions have their refractive indices relatively modulated to serve as a diffraction grating, and the band-like regions placed farther from a prescribed band-like region are set to have smaller or larger widths.

In the diffraction-type microlens including the plurality of band-like regions parallel to each other, the Si—O containing hydrogenated carbon film can include "m" band zones parallel to each other. Each of the band zones preferably includes "n" band-like regions, the band-like regions placed closer to the prescribed band-like region preferably have lower or higher refractive indices compared with the band-like regions placed farther from the prescribed band-like region in each of the band zones, and the band-like regions placed corresponding to each other in different ones of the band zones preferably have the same refractive index.

The microlens according to the present invention as described above can exhibit a lens effect for light having a wavelength in a range from 0.4 µm to 2.0 µm, and can be utilized in wide optical fields such as optical communication and a projector.

An optical information record medium according to the present invention is the one including the Si—O containing hydrogenated carbon film deposited on a substrate, wherein recording of information on the optical information record medium can be performed by irradiating a recording spot region selected from a plurality of recording spot regions with the energy beam, and thereby decreasing a refractive index of the Si—O containing hydrogenated carbon film in the selected recording spot region.

Note that the refractive index of the Si—O containing hydrogenated carbon film in the recording spot region arbitrarily selected can be decreased to any of values set to represent a plurality of levels of the refractive index by the energy beam irradiation.

In a method for recording information on such an optical information record medium, the Si—O containing hydrogenated carbon film may be irradiated with the energy beam, through a metal film mask pattern which includes an opening corresponding to the recording spot region in which its refractive index should be decreased, to thereby decrease the refractive index of the film in the recording spot region. In this recording method, it is also possible to irradiate the Si—O containing hydrogenated carbon film with the energy beam through an additional metal film mask pattern which includes an opening corresponding to a partial recording spot region selected from the recording spot region having its refractive index decreased, to thereby further decrease the refractive index of the film in the selected partial recording spot region. Note that this step may also be repeated at least once.

A method for recording information on the optical information record medium may include the step of irradiating the Si—O containing hydrogenated carbon film with the energy beam through a mask which is made of an energy beam absorbing layer and has its thickness locally changed in multiple level corresponding to the recording spot regions, to thereby decrease the refractive indices of the film in the recording spot regions. The energy beam absorbing layer may be locally made thinner as the levels of the refractive index are decreased.

An optical information record medium according to the present invention includes the Si—O containing hydrogenated carbon film formed on a substrate. Recording of information on the optical information record medium may be retained as a refractive-index-modulated structure formed in the Si—O containing hydrogenated carbon film by a hologram that is produced by irradiating the film with an ultraviolet ray as object light including information to be recorded and an ultraviolet ray as reference light.

A record medium according to the present invention can also be a holographic optical information record medium of a laminated waveguide type, in which a plurality of recording layers each made of the Si—O containing hydrogenated carbon film and a plurality of cladding layers are alternately superposed. The recording layers include recoded information pieces different from one another and each of them has periodic light scattering elements formed therein corresponding to the recorded information pieces. Each of the periodic light scattering elements is a minute region having its refractive index decreased.

A method for manufacturing the holographic optical information record medium of the laminated waveguide type includes the steps of: (a) depositing the Si—O containing hydrogenated carbon film on a transparent substrate serving as one of the cladding layers; (b) irradiating the Si—O containing hydrogenated carbon film with the energy beam through a metal film mask pattern having openings corresponding to the periodic light scattering elements to decrease the refractive index of the Si—O containing hydrogenated carbon film in a region of each of the openings, to thereby produce the periodic light scattering elements; (c) laminating a plurality of pairs of the cladding layer and the Si—O containing hydrogenated carbon film having undergone the steps (a) and (b) described above; and (d) superposing the cladding layer on the Si—O containing hydrogenated carbon film that is exposed as an uppermost layer.

A polarization integrator according to the present invention includes: a polarization beam splitter for separating light from a light source into P-polarized light and S-polarized light; a first microlens; a half-wavelength plate; and a second microlens, wherein the first microlens is disposed to converge the P-polarized light and the S-polarized light separated by the polarization beam splitter to positions different from each other; the half-wavelength plate is disposed at a position to which the P-polarized light or the S-polarized light is converged, so as to serve to convert the P-polarized light into S-polarized light or convert the S-polarized light into P-polarized light; the second microlens serves to integrate the S-polarized light or the P-polarized light having passed through the half-wavelength plate and converted into the other polarization, with the S-polarized light or the P-polarized light having not passed through the half-wavelength plate; and at least one of the polarization beam splitter, the first microlens, the half-wavelength plate, and the second microlens is formed by using the Si—O containing hydrogenated carbon film.

Note that at least one of the polarization beam splitter and the half-wavelength plate may be formed of a refractive index modulated-type diffraction grating formed in the Si—O containing hydrogenated carbon film. Further, at least one of the first microlens and the second microlens may be any of a refraction-type lens and a diffraction-type lens of a refractive index modulated-type, which are formed in the Si—O containing hydrogenated carbon film. Further, a plurality of sets of the polarization beam splitter, the first microlens, the half-wavelength plate, and the second microlens may periodically be arranged in a cross section of a light flux from the light source. Such a polarization integrator can preferably be used in a liquid crystal projector.

A projector according to the present invention includes: a light source; and an diffractive optical element diffracting light from the light source, wherein the diffractive optical element includes the Si—O containing hydrogenated carbon film formed on a transparent substrate; the Si—O containing hydrogenated carbon film is subjected to refractive index modulation so as to include a plurality of regions having a relatively high refractive index and a plurality of regions having a relatively low refractive index, for causing diffraction of the light; and the refractive index modulation causes a diffraction effect so as to convert an intensity distribution in a cross section of a light beam directed to the Si—O containing hydrogenated carbon film into a uniform intensity distribution on a prescribed irradiation surface.

Note that by adjusting a setting of the refractive-index-modulated structure, it is also possible to cause a diffraction effect so as to convert a cross-sectional shape of the light beam directed to the Si—O containing hydrogenated carbon film into a prescribed cross-sectional shape on the prescribed irradiation surface. Further, the refractive-index-modulated structure can also be set to cause the diffraction effect on light including a wavelength in a visible range of 0.4 to 0.7 μm. For the light source used for the projector, it is possible to utilize any of a laser device, a light-emitting diode, and a lamp. For the lamp, it is possible to utilize any of an extra-high-pressure mercury lamp, a xenon lamp, and a halide lamp.

A color liquid crystal display device according to the present invention includes: a light source; a holographic color filter; and a liquid crystal panel, wherein the holographic color filter includes the Si—O containing hydrogenated carbon film formed on a transparent substrate; the film has a refractive-index-modulated structure in which a band-like region having a relatively high refractive index and a band-like region having a relatively low refractive index are alternately disposed, and has a function of diffracting and spectroscopically splitting, by a hologram, incident light supplied from the light source, so as to emit lights of different wavelengths at a prescribed spatial periodicity; and the spatial periodicity corresponds to a periodicity of a plurality of pixels included in the liquid crystal panel.

The Si—O containing hydrogenated carbon film can be combined with an additional microlens array. In that case, the band-like region having the relatively high refractive index has its width and interval being set constant, and the microlens array includes a plurality of microlenses disposed at a peripdicity corresponding to the periodicity of the pixels in the liquid crystal panel. Alternatively, the band-like region having the relatively high refractive index in the Si—O containing hydrogenated carbon film can also have its width and interval being periodically changed corresponding to the periodicity of the pixels in the liquid crystal panel, so as to cause the holographic color filter to have not only a spectroscopic function but also a microlens array function.

The holographic color filter can also include a plurality of the Si—O containing hydrogenated carbon films, and these films can have their respective peaks of diffraction efficiency with respect to lights of wavelengths different from one another. The plurality of Si—O containing hydrogenated carbon films can include a first Si—O containing hydrogenated carbon film and a second Si—O containing hydrogenated carbon film, in which the first film preferably has a peak of diffraction efficiency with respect to red light, and the second film preferably has a peak of diffraction efficiency with respect to blue light.

The refractive index is preferably changed in multiple level in a boundary region between the band-like region having the low refractive index and the band-like region having the high refractive index in the holographic color filter. Further, it is also preferable that the refractive index is continuously changed in a boundary region between the band-like region having the low refractive index and the band-like region having the high refractive index in the holographic color filter. Further, a boundary region between the band-like region having the low refractive index and the band-like region having the high refractive index in the holographic color filter can also be tilted with respect to a thickness direction of the Si—O containing hydrogenated carbon film.

Each of the plurality of pixels included in the liquid crystal panel may include a red display region, a green display region, and a blue display region, and the holographic color filter can spectroscopically split the incident light so as to direct red light, green light, and blue light to the red display region, the green display region, and the blue display region, respectively. Any of a metal halide lamp, an extra-high-pressure mercury lamp, a cold cathode-ray tube, a xenon lamp, a light-emitting diode, and a laser can be used for the light source in the color liquid crystal display device.

The region having a relatively low refractive index in the Si—O containing hydrogenated carbon film included in the color liquid crystal display device is preferably formed by exposure with a periodic ultraviolet light intensity distribution obtained by interference of two types of diffracted lights having passed through a phase grating mask.

An optical pickup device according to the present invention can be used for at least any of recording and reproducing of information on an optical information record medium, includes: a light source emitting a light beam; and a plurality of optical elements for controlling the light beam, wherein at least one of these optical elements includes the Si—O containing hydrogenated carbon film which has a local region having a relatively low refractive index and a local region having a relatively high refractive index. The optical element including such an Si—O containing hydrogenated carbon film can be any of a polarization beam splitter, a quarter wavelength plate, an objective lens, a focusing lens, and a collimator lens.

An optical beam scan device according to the present invention includes: a light source emitting a light beam; an diffractive optical element shaping the light beam; and light beam scan means for changing a traveling direction of the light beam, wherein the diffractive optical element includes the Si—O containing hydrogenated carbon film formed on a transparent substrate, and this film includes a plurality of regions having a relatively high refractive index and a plurality of regions having a relatively low refractive index. By utilizing such an optical beam scan device, it is possible to obtain a laser printer, a scanner, and a bar code reader.

EFFECTS OF THE INVENTION

According to the present invention as described above, it is possible to provide a refractive index modulated-type diffractive optical element having a large amount $\Delta n$ of refractive index change (i.e., high diffraction efficiency), high transparency for the ultraviolet light range as well as the visible light range, and favorable adaptability to generally-used optical elements, and provide an Si—O containing hydrogenated carbon film serving as an optical film suitable for being used for the diffractive optical element.

Further, it is also possible to provide various optical elements fabricated by using such an Si—O containing hydrogenated carbon film, and provide various optical devices including those optical elements.

DESCRIPTION OF THE REFERENCE SIGNS

Figure 1:
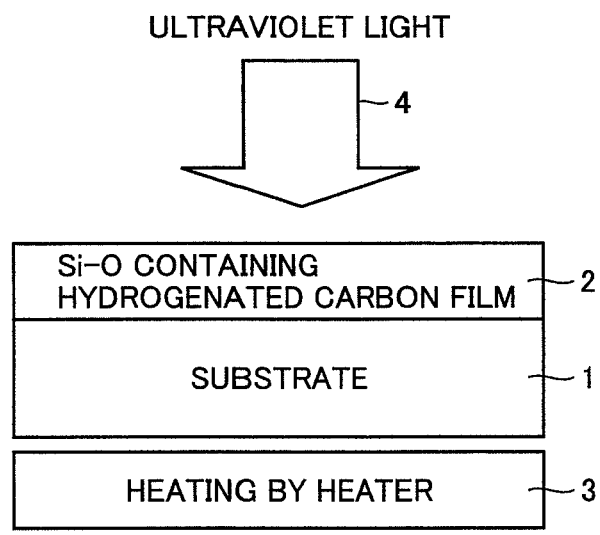
FIG. 1 is a schematic cross-sectional view that illustrates a method for fabricating an optical element according to the present invention.

1: substrate, 2: Si—O containing hydrogenated carbon film, 3: heater such as hot plate, 4: ultraviolet light, 11: silicon substrate, 12: first resist layer, 13: first mask, 14a: exposure, 14b: RIE, 11a: 2-level relief-type microlens, 15: second resist layer, 16: second mask, 14c: exposure, 14d: RIE, 11b: 4-level relief-type microlens, 21: Si—O containing hydrogenated carbon film, 21a: relatively-low-refractive-index region, 21b: refractive-index-modulated region, 21c: central axis (central plane), 21d: relatively-high-refractive-index region, 21e: refractive-index-modulated region, 22: mask layer, 22a: concave portion, 22b: convex portion, 23: energy beam, 31: silica substrate, 32: resist pattern, 32a: molten resist, 32b: resist being etched, 31a: silica substrate being etched, 31b: convex portion, 31c: stamping die, 40: refractive index modulated-type, diffraction-type microlens, 41: Si—O containing hydrogenated carbon film, Rmn: band-like ring region, f: focal length, 42: Ni conductive layer, 43: resist pattern, 44: gold mask layer, 45: energy beam, 41a: low-refractive-index region, 41b: high-refractive-index region, 101: glass substrate, 102: Si—O containing hydrogenated carbon film recording layer, 103: glass substrate, 104, 104a, 104b: metal film mask pattern, 105: energy beam, 111-1 to 111-n: cladding layer, 112-1 to 112-n-1: core layer, 113: laser light used for replay, 114: lens, 115: reflecting surface, 116: guided light, 119: light scattering element (hologram), 120: replayed hologram image, 121: glass substrate, 122: ultraviolet ray cure resin layer, 123: ultraviolet ray, 124: PMMA (polymethylmethacrylate) layer, 125: roller for forming light scattering element, 131: holographic record medium, 132: two-dimensional digital data, 133: object light, 134: lens, 135: reference light, 136: replay light, 137: lens, 138: replayed two-dimensional digital data, 201: light source, 202: dome-like or parabolic reflecting mirror, 203: collimator lens, M1, M2, M3, M4: total reflection mirror, DM1, DM2: dichroic mirror, B: blue light, G: green light, R: red light, CL1, CL2, CL3: condenser lens, LC1, LC2, LC3: liquid crystal panel, 204: prism, 205: projector lens, 211: polarization separation prism, 212: PBS film, 213: half-wavelength plate, 214: total reflection mirror, P: P-polarized light, S: S-polarized light, 251: polarization beam splitter, 251A: Si—O containing hydrogenated carbon film, 251a: high-refractive-index region, 251b: low-refractive-index region, 252: first microlens array, 253: half-wavelength plate, 254: second microlens array, 255: lens, CL: condenser lens, LC: liquid crystal panel, 301: beam-shaping element, 302: lens, 303: irradiation surface, 311a: red laser device, 311b: green laser device, 311c: blue laser device, 312a, 312b, 312c: diffraction-type beam-shaping element, 313a, 313b, 313c: polarization beam splitter, 314a, 314b, 314c: liquid crystal panel, 315: color-combining prism, 316: projector lens, 401: glass substrate, 402: holographic film, 403: liquid crystal layer, 404: reflection-type electrode layer, 411: glass substrate, 412: diffraction grating made of Cr film, 413: one microlens region, 421: silica glass substrate, 422: Si—O containing hydrogenated carbon film, 422a: high-refractive-index region, 422b: low-refractive-index region, 422c: refractive index boundary region, 423a, 423b: silica glass substrate, 424a, 424b: gold mask, 424c: relief-type phase grating mask, 425a, 425b, 425c: UV light, 426: spacer, 434: gold mask, 435: He ion beam, L1: incident light, L2: refracted light, L3: diffracted light, 440: liquid crystal panel, 441: liquid crystal display layer, 442: black matrix, 450: holographic color filter, 451: holographic plate, 452: microlens, 460: backlight, 461: red light, 462: green light, 463: blue light, 471: first holographic film, 472: second holographic film, a: holographic film having the maximum diffraction efficiency for green light, b: holographic film having the maximum diffraction efficiency for red light, c: holographic film having the maximum diffraction efficiency for blue light, d: holographic color filter having peaks of diffraction efficiency for red light and blue light, 481: white light source, 482: dichroic mirror, 484, 484a: holographic lens layer, 485: thin glass plate layer, 486: transparent electrode, 487: liquid crystal layer, 488: pixel electrode, 489: active matrix drive circuit, 490: projection lens, 491B: blue light-emitting element, 491G: green light-emitting element, 491R: red light-emitting element, 501: substrate, 511: light source, 513: polarization beam splitter, 514: quarter wavelength plate, 515: objective lens, 516: optical information record medium, 516a: information recording surface, 517: focusing lens, 518: light-receiving element, 519: collimator lens, 561: first Si—O containing hydrogenated carbon film, 562: second Si—O containing hydrogenated carbon film, 500: diffraction lens, 520: 0th order diffracted light, 521: 1st order diffracted light, 522: 2nd order diffracted light, 602: light source, 603: diffractive optical element, 604: polygon mirror, 605: object to be irradiated, 606: spherical lens, 607: toroidal lens, 608: photoconductive drum, 610: source document, 611: detector, 631: transparent substrate, 632: Si—O containing hydrogenated carbon film.

BEST MODES FOR CARRYING OUT THE INVENTION

In the following, description will be given on an Si—O containing hydrogenated carbon film serving as an optical film according to the present invention, and a method for manufacturing the same, and then given on fabrication of a refractive-index-modulated structure made of the Si—O containing hydrogenated carbon film, and functions and applications of an optical element using the same.

(1) Si—O Containing Hydrogenated Carbon Film and Method for Manufacturing the Same The inventors of the present invention have developed an Si—O containing hydrogenated carbon film that can have a large amount Δn of refractive index change caused by energy beam irradiation and a high transparency for a visible light range. Therefore, description will initially be given on the Si—O containing hydrogenated carbon film and a method for manufacturing the same.

In the Si—O containing hydrogenated carbon film developed by the inventors, an atomic % ratio of O/Si is more than 0.5 and less than 1.5, and an atomic % ratio of C/Si is more than 1.0 and less than 13.0. The Si—O containing hydrogenated carbon film has a small extinction coefficient for the visible light range and is thus preferable as a material for an optical element used for the visible light range. Here, the contents of carbon, oxygen, silicon, and others can be determined by using RBS (Rutherford Backscattering), a pyrolysis method, ICP (induction coupled plasma) emission spectrometry, NDIR (nondispersive infrared) spectrometry, and the like.

Such an Si—O containing hydrogenated carbon film can be obtained, for example, by a plasma CVD (Chemical Vapor Deposition) method using siloxane having a relatively low molecular weight as a raw material. An SiOx film synthesized by using siloxane as a raw material and a silicon oxide film containing carbon are disclosed in Patent Document 2 of Japanese Patent Laying-Open No. 7-333404, Patent Document 3 of Japanese Patent Laying-Open No. 2004-341541, and Patent Document 4 of Japanese Patent Laying-Open No. 8-72193, and the like.

Siloxane includes, in its chemical structure, a periodic structure of ~Si—O— in its skeleton, with a hydrogen atom or a hydrocarbon-based group being attached to a side chain of a silicon atom. As specific examples of such siloxane, there are polydimethylsiloxane $[(CH_3)_2SiO]_n$, polydiphenylsiloxane $[(C_6H_5)_2SiO]_n$, polymethylphenylsiloxane $[(CH_3)(C_6H_5)SiO]_n$, polymethylhydrogensiloxane $[(H)(CH_3)SiO]_n$, and the like.

Using siloxane as a raw material of the plasma CVD method has major two advantages. One advantage is that, if the film is synthesized using siloxane by the plasma CVD method, unsaturated bonds of carbon atoms which cause coloring as seen in the DLC film in Patent Document 1 hardly form a long chain, thereby making it possible to provide a film having high transparency. It is considered that the synthesized film has a structure close to an amorphous structure, and the film includes therein bonds such as $CH_3$, $CH_2$, SiO, SiC, and CO.

The other advantage is that the film synthesized with use of a raw material such as siloxane originally containing much oxygen, is less likely to cause volumetric change even if oxidation or escape of hydrogen occurs in a subsequent property-modifying process using energy beam irradiation, and thus is less likely to cause deformation, peeling, surface unevenness, and the like, so that this film is preferable when being applied to an optical element. In contrast, it is often observed that a film not containing substantive oxygen, such as a DLC film, causes a relatively large volumetric change attributed to oxidation or escape of hydrogen in a subsequent property-modifying process, and causes deformation, peeling, surface unevenness, and the like.

To obtain high transparency for the visible light range and a sufficiently large amount of refractive index change caused with the energy beam irradiation in the synthesized Si—O containing hydrogenated carbon film, further artifice is required in the film-forming method. As a result that the inventors conducted various tests for searching preferable conditions, they have succeeded in ensuring high transparency for a visible light range and also a sufficiently large amount of refractive index change caused with the energy beam irradiation, by forming the film under the following exemplary conditions. Specifically, when a film is to be formed by plasma CVD using siloxanes having a relatively low molecular weight as a raw material, the substrate temperature is set to be at least 80° C. and at most 100° C., the high-frequency power is set to be at least 0.01 W/cm$^2$ and at most 1.2 W/cm$^2$, and the pressure is set to be at least 6.7 Pa (0.05 Torr) and at most 67 Pa (0.5 Torr).

In the Si—O containing hydrogenated carbon film obtained as such, the extinction coefficient k is at most 0.005 for the visible light range, so that the transparency is ensured for the visible light range. Further, a refractive index of the film can be changed (decreased) in a range from at least 0.05 to less than 0.4 by the energy beam irradiation.

However, in the Si—O containing hydrogenated carbon film obtained in the range of the above-described conditions for film formation, the transparency was not sufficiently high for the ultraviolet light range (i.e., extinction coefficient k was not sufficiently low for the ultraviolet light range). Therefore, to form the Si—O containing hydrogenated carbon film having a sufficiently low extinction coefficient k for the ultraviolet light range, the inventors further reconsidered the conditions for film formation. As a result that the inventors examined various conditions for film formation as to the Si—O containing hydrogenated carbon film, they succeeded in providing the sufficiently large amount Δn of refractive index change caused with the energy beam irradiation and also sufficiently decreasing the extinction coefficient k for the ultraviolet light range while maintaining the sufficiently low extinction coefficient k for the visible light range.

Under the newly developed conditions for film formation, it is possible to obtain an Si—O containing hydrogenated carbon film having properties as described below. The developed conditions for film formation will be described in detail later.

Specifically, the refractive index of the Si—O containing hydrogenated carbon film according to the present invention can be set in a range from at least 1.48 to at most 1.85 for light of 520 nm wavelength. An Si—O containing hydrogenated carbon film having a refractive index in another range may also be utilized optically. However, if the film has a refractive index less than 1.48, the refractive index is hardly changed even if the film is irradiated with an energy beam. On the other hand, an Si—O containing hydrogenated carbon film having a refractive index larger than 1.85 is not preferable because the extinction coefficient of the film becomes too large for the ultraviolet light range to the visible light range.

Further, the extinction coefficient of the Si—O containing hydrogenated carbon film according to the present invention can be less than 0.15 for light of 248 nm wavelength. If the extinction coefficient of the Si—O containing hydrogenated carbon film is larger than this value, and the refractive index of the film is to be changed by the ultraviolet light irradiation, the extinction coefficient is too large for the ultraviolet light range, so that ultraviolet light serving as property-modifying light is more absorbed in the vicinity of a surface of the film. As a result, the ultraviolet light is less likely to penetrate deeply in the film thickness direction. Further, ablation of the film surface is developed to cause surface unevenness that acts to cause unexpected scattered light and diffracted light. As a result, uniform property modification in the film thickness direction becomes difficult.

Further, the Si—O containing hydrogenated carbon film according to the present invention is also characterized in that its refractive index for light of 520 nm wavelength and an extinction coefficient for light of 248 nm wavelength are decreased by irradiating the film with an energy beam. Consideration will be given later to the mechanism of change in the refractive index and the extinction coefficient of the Si—O containing hydrogenated carbon film according to the present invention. If the extinction coefficient for light of 248 nm wavelength is increased by ultraviolet light irradiation, the ultraviolet light serving as property-modifying light is more absorbed in the vicinity of a surface of the film as its properties are modified by the ultraviolet light irradiation, so that uniform property modification in the film thickness direction becomes much more difficult.

The extinction coefficient of the Si—O containing hydrogenated carbon film for light of 248 nm wavelength is more preferably less than 0.12 before the energy beam irradiation, because this is more effective for uniform property modification caused by the energy beam irradiation in the film thickness direction.

The refractive index of the Si—O containing hydrogenated carbon film for light of 520 nm wavelength is more preferably in a range from at least 1.56 to at most 1.76 before the energy beam irradiation. If the Si—O containing hydrogenated carbon film has a refractive index of at least 1.56 before the energy beam irradiation, it is possible to ensure an amount Δn of refractive index change of at least 0.10 caused by the energy beam irradiation. Therefore, in the diffraction-type optical element of the refractive index modulated-type fabricated with use of such an Si—O containing hydrogenated carbon film, its properties (e.g., diffraction efficiency and the like) and design freedom are enhanced. On the other hand, in the case that the Si—O containing hydrogenated carbon film has a refractive index of at most 1.76 before the energy beam irradiation, the extinction coefficient for light of 248 nm wavelength can be less than 0.12, so that this is preferable from the viewpoint of uniform property modification of the film in its thickness direction as described above.

In the Si—O containing hydrogenated carbon film before the energy beam irradiation, silicon content is preferably more than $0.80 \times 10^{22}$ atoms/cm$^3$ and less than $1.5 \times 10^{22}$ atoms/cm$^3$, hydrogen content is preferably more than $4.0 \times 10^{22}$ atoms/cm$^3$ and less than $8.0 \times 10^{22}$ atoms/cm$^3$, oxygen content is preferably more than $0.80 \times 10^{22}$ atoms/cm$^3$ and less than $1.4 \times 10^{22}$ atoms/cm$^3$, carbon content is preferably more than $1.5 \times 10^{22}$ atoms/cm$^3$ and less than $2.3 \times 10^{22}$ atoms/cm$^3$, an atomic % ratio of O/Si is preferably more than 0.5 and less than 1.5, and an atomic % ratio of C/Si is preferably more than 1.0 and less than 3.0.

Here, the contents of carbon, oxygen, silicon, hydrogen, and the like can be determined by using RBS (Rutherford Backscattering), a pyrolysis method, ICP (induction coupled plasma) emission spectrometry, NDIR (nondispersive infrared) spectrometry, or the like. The hydrogen content may also be determined by a combination of BFS (Hydrogen Forward Scattering) and RBS. For example, a thin film to be analyzed is irradiated with helium ions, and then helium ions scattered backward and hydrogen atoms scattered forward can be detected by a detector to thereby determine relative proportions of various kinds of constituent elements.

The Si—O containing hydrogenated carbon film in the range of the above-described relative proportions has a small extinction coefficient for the ultraviolet light range to the visible light range, and is thus preferable as a material to be used for an optical element which is fabricated with use of property-modifying light in the ultraviolet light range and used for the visible light range. In contrast, the Si—O containing hydrogenated carbon film falling beyond the range of the relative proportions is not preferable from at least any of the viewpoints such as its refractive index, extinction coefficient, amount of refractive index change, material strength, and the like.

When the extinction coefficient, the refractive index, and the like are considered, the Si—O containing hydrogenated carbon film preferably has a degree of density in a rage from more than 1.15 g/cm$^3$ to less than 1.60 g/cm$^3$ and a spin density in a range from more than $1.0 \times 10^{16}$ spins/cm$^3$ to less than $1.0 \times 10^{20}$ spins/cm$^3$. If the degree of density is at most 1.15 g/cm$^3$ or the spin density is at most $1.0 \times 10^{16}$ spins/cm$^3$, the refractive index of the Si—O containing hydrogenated carbon film for light of 520 nm wavelength is below 1.48, so that a necessary amount of refractive index change cannot be ensured. If the degree of density is at least 1.60 g/cm$^3$ or the spin density is at least $1.0 \times 10^{20}$ spins/cm$^3$, the extinction coefficient of the Si—O containing hydrogenated carbon film for light of 248 nm wavelength exceeds 0.15, making it difficult to uniformly modify properties in the film thickness direction.

The degree of density in the Si—O containing hydrogenated carbon film can be determined by an X-ray reflectivity (GIXR) method and the like. This is a method for calculating a degree of density in a thin film to be analyzed from a reflectivity or the like of an X-ray applied to the thin film. The spin density can be calculated by an electron spin resonance (ESR) method. The spin density is synonymous with the unpaired electron density, and the higher spin density represents the presence of the larger number of dangling bonds, i.e., defects in the thin film.

The Si—O containing hydrogenated carbon film described above according to the present invention has been achieved for the first time by adopting, e.g., a newly-developed manufacturing method as described below. Specifically, the Si—O containing hydrogenated carbon film according to the present invention is formed by plasma CVD using siloxanes having a relatively low molecular weight as a raw material. As conditions for the plasma CVD during formation of the film, substrate temperature is at least 80° C. and at most 100° C., high-frequency power is at least 0.5 W/cm$^2$ and at most 1.2 W/cm$^2$, and pressure is in a range from at least 6.7 Pa (0.05 Torr) to at most 40 Pa (0.3 Torr), and the pressure until elapse of at least 3 minutes after a start of film formation is continuously increased at a rate in a rage from at least 1.3 Pa/minute (0.01 Torr/minute) to at most 2.7 Pa/minute (0.02 Torr/minute). These conditions for film formation are required for the following reasons.

If the substrate temperature is lower than 80° C., mass transfer reaction (migration) occurs insufficiently in film formation, so that the Si—O containing hydrogenated carbon film becomes clouded, and the transparency of the film is deteriorated for the visible light range. If the substrate temperature exceeds 100° C., on the other hand, the reaction in film formatin proceeds too fast, so that the film may peel off the substrate. Even if the peeling does not occur, the synthesis reaction excessively proceeds to stabilize the film, so that the amount of refractive index change caused by the energy beam irradiation becomes at most 0.03 for light of 520 nm wavelength. This is not preferable from the viewpoint of applying the film to a refractive index modulated-type diffractive optical element and the like.

In the case of the high-frequency power being less than 0.5 W/cm$^2$, the density of active species in the plasma becomes low, and it becomes only possible to obtain a deposited film closer to siloxanes used as a source material, i.e., a film having too low a refractive index of at most 1.48 for the visible light range (wavelength of 520 nm). In the case of the high-frequency power exceeding 1.2 W/cm$^2$, on the other hand, the density of active species in the plasma becomes excessively high, and it becomes only possible to obtain a synthesized film having an increased spin density and thus having too large an extinction coefficient of at least 0.15 for the ultraviolet light range (wavelength of 248 nm).

In the case of the pressure being lower than 6.7 Pa (0.05 Torr), the mean free path of the active species in the plasma becomes too long, and it becomes only possible to obtain a synthesized film having an increased spin density and thus having too large an extinction coefficient of at least 0.15 for the ultraviolet light range (wavelength of 248 nm). In the case of the pressure exceeding 40 Pa (0.3 Torr), on the other hand, the mean free path of the active species in the plasma becomes too short, and it becomes only possible to obtain a deposited film closer to siloxanes used as a source material, i.e., a film having too low a refractive index of at most 1.48 for the visible light range (wavelength of 520 nm).

Here, in order to decrease the extinction coefficient of the film to be less than 0.15 for the ultraviolet light range (wavelength of 248 nm), it is essential to continuously increase the pressure at a rate in a range from at least 1.3 Pa/minute (0.01 Torr/minute) to at most 2.7 Pa/minute (0.02 Torr/minute) until elapse of at least 3 minutes after the start of film formation. Although the details of mechanism through which the extinction coefficient is decreased have not yet been clarified, it is possible to consider as follows.

Namely, it seems that delicate control of the internal pressure at the start of decomposition of a source material gas determines types of active species generated at an early stage of plasma generation, that the presence of the active species at the early stage becomes a significant controlling factor that determines the subsequent state of the plasma, and that the active species are essential for decreasing the extinction coefficient of the synthesized film for the ultraviolet light range (wavelength of 248 nm). Actually, in the case that the pressure was kept constant from the start of film formation, the case that the pressure was continuously increased for less than 3 minutes, or the case that the increasing rate of the pressure was set to be less than 1.3 Pa/minute (0.01 Torr/minute) or more than 2.7 Pa/minute (0.02 Torr/minute), it was only possible to produce a film having an extinction coefficient larger than 0.15 for the ultraviolet light range (wavelength of 248 nm).

The Si—O containing hydrogenated carbon film according to the present invention is made of a homogeneous single phase (single composition) that does not contain a dispersed phase and the like. This is also an essential factor for decreasing the extinction coefficient of the film to be less than 0.15 for the ultraviolet light range (wavelength of 248 nm). This is because impurities such as dispersed phases may become factors for light scattering, and such scattering becomes remarkable particularly for the ultraviolet light range. The inventors have devised the following measures to develop an Si—O containing hydrogenated carbon film of a single phase so as to decrease the extinction coefficient of the film for the ultraviolet light range.

Generally, one of the reasons why the dispersed phase is included in the optical film is that the dispersed phase serves as a reinforcing material. For example, in the case of a film made of components that are completely decomposed during a property-modifying process with the energy beam irradiation, the film may be broken into pieces or peel off the substrate without being able to ensure strength required for the film. Further, in the case of a film that shows a significant change in volumetric expansion or contraction during a property-modifying process, the film may become brittle owing to internal stress and may also be broken into pieces or peel. To prevent deterioration of the film due to these two causes, an Si—O containing hydrogenated carbon film was synthesized by using a source material originally containing oxygen, such as siloxane. The film synthesized as such is less likely to cause a volumetric change even if oxidation or escape of hydrogen occurs during the subsequent property-modifying process with the energy beam irradiation, and the film is not completely decomposed. It is therefore possible to achieve the Si—O containing hydrogenated carbon film of a single phase without using a reinforcing material.

Generally, another reason why a dispersed phase is included in the optical film is considered that the dispersed phase may be essential for the property-modifying process. For example, there may be the case that although a mother phase (a matrix surrounding a disperse phase) itself does not cause a reaction with the energy beam irradiation, a dispersed phase causes a reaction with the energy beam irradiation, and then a product generated by the reaction reacts with the mother phase to promote the property modification.

On the other hand, the present invention has succeeded in developing an Si—O containing hydrogenated carbon film of a single phase that causes a reaction with the energy beam irradiation. It becomes thereby possible for the first time to decrease the extinction coefficient of the optical film for the ultraviolet light range.

(2) Fabrication of Refractive-Index-Modulated Structure

In the Si—O containing hydrogenated carbon film according to the present invention, it is possible to decrease the extinction coefficient for the ultraviolet light range to the visible light range as well as the refractive index for the visible light range by energy beam irradiation, More specifically, it is possible to decrease the refractive index and the extinction coefficient of the Si—O containing hydrogenated carbon film by irradiating the film with a corpuscular beam such as an ion beam, an electron beam, or a neutron beam, or an electromagnetic wave such as an ultraviolet ray, an X-ray, or a gamma ray.

For example, injection of He ions at a dose rate of $5 \times 10^{17}/cm^2$ at an acceleration voltage of 800 keV can decrease the refractive index and the extinction coefficient. Injection of ions such as of H, Li, B, or C, or SR (synchrotron radiation) having a spectrum of 0.1 to 130 nm can also decrease the refractive index and the extinction coefficient. In the ultraviolet light radiation, irradiation with KrF excimer laser light having a wavelength of 248 nm, for example, at an irradiation power density of 3-40 mW/mm$^2$ per pulse can decrease the refractive index and the extinction coefficient. Irradiation with excimer laser light such as ArF (wavelength of 193 nm), XeCl (wavelength of 308 nm), XeF (wavelength of 351 nm), or the like, or irradiation with a third harmonic wave (wavelength of 355 nm) or a fourth harmonic wave (wavelength of 266 nm) of YAG (yttrium aluminum garnet) laser light, at an irradiation power density of 3-40 mW/mm$^2$ per pulse, can also decrease the refractive index and the extinction coefficient. Further, irradiation with mercury lamp light (e.g., an i-ray having a wavelength of 365 nm, a DUV (deep ultraviolet) ray having a wavelength of 248 nm, 193 nm, or the like) at a power density of at least 0.1 mW/mm$^2$, can also decrease the refractive index and the extinction coefficient. The irradiation amount of such an energy beam is preferably at least 0.1 MJ/m$^2$.

By utilizing such a modifiable property of the Si—O containing hydrogenated carbon film, it is possible to form a pattern of optical properties in the film through irradiation of its local regions with an energy beam. In other words, it is possible to decrease the refractive index in a prescribed pattern in the Si—O containing hydrogenated carbon film to fabricate a waveguide, an diffractive optical element, or the like. For forming a pattern of such a refractive index change, it is possible to apply a known method using one of various types of masks or interference exposure.

Although the details of the mechanism by which the refractive index and the extinction coefficient of the Si—O containing hydrogenated carbon film according to the present invention are decreased with the energy beam irradiation have not yet been clarified, a presumption may be made as follows.

The DLC film in Patent Document 1 contains hydrogen atoms, and the energy beam irradiation causes escape of the hydrogen atoms. Therefore, it is considered that the refractive index is increased in the DLC film owing to increase in the degree of density caused by the hydrogen escape and/or decrease of hydrogen atoms having a small dielectric constant. Further, it is considered that, in the DLC film, unpaired electrons of carbon atoms are increased owing to the hydrogen escape caused by the energy beam irradiation, and the extinction coefficient is increased accordingly.

In the Si—O containing hydrogenated carbon film according to the present invention, on the other hand, it is considered that oxidation is promoted by the energy beam irradiation to thereby increase Si—O bonds, so that the film partially becomes closer to an SiO$_2$ structure and its refractive index is decreased. Further, in the Si—O containing hydrogenated carbon film, it is considered that double bonds such as C=O and C=C and unpaired electrons, both which have large optical absorption for the ultraviolet light range, react with the energy beam irradiation and are decreased, causing decrease in extinction coefficient accordingly.

As described above, the DLC film in Patent Document 1 significantly differs from the Si—O containing hydrogenated carbon film according to the present invention in that the DLC film has a refractive index and an extinction coefficient increased for the ultraviolet light range to the visible light range by the energy beam irradiation, whereas the Si—O containing hydrogenated carbon film has a refractive index and an extinction coefficient decreased by the energy beam irradiation.

If a refractive index is to be increased by irradiating the DLC film with an energy beam, its extinction coefficient is simultaneously increased, so that it is difficult to maintain uniformity in modification of the optical properties in a thickness direction of the film. In contrast, in the Si—O containing hydrogenated carbon film, decrease in refractive index caused by the energy beam irradiation also causes decrease in extinction coefficient. Therefore, the Si—O containing hydrogenated carbon film is quite preferable in that it can maintain uniformity in modification of the optical properties in the film thickness direction, even if the film has a larger thickness.

The refractive index of the Si—O containing hydrogenated carbon film according to the present invention is decreased depending on the irradiation amount of an applied energy beam. If the refractive index thereof is decreased, its minimum value for light of 520 nm wavelength becomes at least 1.45-1.46, and is no longer decreased. This agrees with the fact that the refractive index of silica glass for light of 520 nm wavelength is approximately 1.46.

In further consideration of the fact that the refractive index of the Si—O containing hydrogenated carbon film before property modification is in a range from 1.48 to 1.85 for light of 520 nm wavelength, the refractive index can be decreased by an amount of refractive index change $\Delta n$ in a range of at most 0.40. Within this range, the refractive index can arbitrarily be changed depending on the amount of energy beam irradiation. However, properties (e.g., diffraction efficiency and the like) of an optical element formed with a film having small $\Delta n$ are not so good, and flexibility in design of the optical element is decreased, and thus $\Delta n$ of less than 0.03 is not preferable. In view of the foregoing, amount $\Delta n$ of refractive index change of the Si—O containing hydrogenated carbon film for light of 520 nm wavelength is preferably in a range from at least 0.03 to at most 0.40.

Amount $\Delta n$ of refractive index change of the Si—O containing hydrogenated carbon film for light of 520 nm wavelength is more preferably in a range from at least 0.10 to at most 0.30. This is because, if the film can ensure amount $\Delta n$ of refractive index change of at least 0.10, a refractive index modulated-type, diffraction-type optical element fabricated with use of the film can enhance its optical properties and flexibility in design. If amount $\Delta n$ of refractive index change is more than 0.30, on the other hand, it is necessary to increase the refractive index of the Si—O containing hydrogenated carbon film before the energy beam irradiation to be more than 1.76. In this case, as described above, the extinction coefficient of the Si—O containing hydrogenated carbon film for light of 248 nm wavelength becomes at least 0.12, which is relatively disadvantageous from the viewpoint of uniform property modification in the film thickness direction. Therefore, it is preferable that $\Delta n$ is not more than 0.30.

The property-modified region of the Si—O containing hydrogenated carbon film generally tends to be decreased in hydrogen content and carbon content, and increased in oxygen content. In an actual optical element fabricated with use of the Si—O containing hydrogenated carbon film, it is almost impossible to measure the composition and properties in each minute property-modified region of the film. However, by irradiating the whole surface of the Si—O containing hydrogenated carbon film with the energy beam under the same conditions as those used in fabrication of the optical element, it is possible to determine the composition and properties of the property-modified region of the optical element.

The inventors conducted measurement and found that the following range of the composition is preferable. Specifically, in the Si—O containing hydrogenated carbon film after the energy beam irradiation, silicon content is preferably more than $0.80 \times 10^{22}$ atoms/cm$^3$ and less than $1.5 \times 10^{22}$ atoms/cm$^3$, hydrogen content is preferably more than $1.0 \times 10^{22}$ atoms/cm$^3$ and less than $8.0 \times 10^{22}$ atoms/cm$^3$, oxygen content is preferably more than $0.80 \times 10^{22}$ atoms/cm$^3$ and less than $3.0 \times 10^{22}$ atoms/cm$^3$, carbon content is preferably more than $1.0 \times 10^{22}$ atoms/cm$^3$ and less than $2.3 \times 10^{22}$ atoms/cm$^3$, an atomic % ratio of O/Si is preferably more than 0.5 and less than 2.0, and an atomic % ratio of C/Si is preferably more than 1.0 and less than 3.0.

Further, the property-modified region in the Si—O containing hydrogenated carbon film generally tends to be increased in degree of density and decreased in spin density. The inventors also measured the degree of density and the spin density in the Si—O containing hydrogenated carbon film after the energy beam irradiation. It can be said that the degree of density is preferably in a range from more than 1.15 g/cm$^3$ to less than 1.80 g/cm$^3$, and that the spin density is preferably less than $1.0 \times 10^{20}$ spins/cm$^3$.

Further, in comparison with an optical element fabricated by irradiating a DLC film with an energy beam, an optical element fabricated by irradiating an Si—O containing hydrogenated carbon film with an energy beam has a relatively low refractive index. In other words, the optical element fabricated with use of the DLC film has a higher refractive index in average as compared with the generally-used optical element fabricated with use of glass or a transparent resin material, and thus is more likely to cause light reflection at an interface with the generally-used optical element. In contrast, the optical element fabricated by irradiating the Si—O containing hydrogenated carbon film with an energy beam has an average refractive index closer to that of the generally-used optical element, and thus causes less reflection at an interface with the generally-used optical element, and is quite preferable from the viewpoint of adaptability.

(3) Functions and Applications of Optical Element Using Refractive-Index-Modulated Structure As described above, by forming a refractive-index-modulated structure in the Si—O containing hydrogenated carbon film of the present invention, it is possible to obtain various optical control functions. More specifically, it is possible to obtain an optical element having a function of combining/branching wavelengths, combining/branching power, combining/branching polarizations, converging light, or even shaping a beam. Further, by periodically disposing minute refractive-index-modulated regions at a distance nearly equal to a wavelength of light, the optical element can also be used as a photonic crystal.

Since the optical element utilizing the Si—O containing hydrogenated carbon film according to the present invention is applicable to light in a wide range covering from the infrared range to the visible light range and near-ultraviolet range, it is applicable to a wider variety of applications. Further, the optical element according to the present invention is of a refractive index modulated type utilizing a thin film, so that reduction in size and thickness is easy. Specifically, the optical element utilizing the Si—O containing hydrogenated carbon film is applicable to various optical elements for optical communication, optical elements in optical machining devices using laser and the like, optical elements in various image display devices and optical recording devices, optical elements in optical measuring apparatuses, and the like.

For example, regarding the function of combining/branching wavelengths, the optical element utilizing the Si—O containing hydrogenated carbon film according to the present invention is applicable to a filter for combining/branching wavelengths in optical communication, an element for combining/branching RGB (red, green, and blue) lights in an image display device, and the like. Regarding the function of combining/branching power, the optical element according to the present invention is applicable to a multi-laser-beam machining of a laser machining apparatus, an optical coupler for optical communication, and the like. Regarding the function of combining/branching polarizations, the optical element according to the present invention is applicable to a device for branching TE and TM waves in optical communication, a polarizer, an analyzer, a polarizing plate for a liquid crystal, and the like. Regarding the function of converging light, the optical element according to the present invention is applicable to various lenses, a microlens array, and the like for a display device and a recording device. Regarding the function of shaping a beam, the optical element according to the present invention is applicable to a homogenizer or the like in a machining apparatus or a display device.

Furthermore, it is considered that the photonic crystal fabricated by using the Si—O containing hydrogenated carbon film of the present invention is applicable to a two-dimensional photonic crystal waveguide and a filter for combining/branching wavelengths (see S. Noda, A. Chutinan, and M. Imada, Nature 407, 608 (2000)), a two-dimensional photonic crystal microcavity (see Y. Akahane, T. Asano, B. S. Song, and S. Noda, Nature 425, 944 (2003)), a two-dimensional photonic crystal microcavity laser (see 0. Painter, R. K. Lee, A. Scherer, A. Yariv, J. D. O' Brien, P. D. Dapkus, and I. Kim, Science 284, 1819 (1999)), a two-dimensional photonic crystal surface emitting laser (see S. Noda, M. Yokoyama, M. Imada, A. Chutinan, and M. Mochizuki, Science 293, 1123 (2001)), an improvement in LED light extraction efficiency (see Hiroyuki Ichikawa, Toshihiko Baba, Spring Meeting of the Japan Society of Applied Physics, 28 p-ZF-8 (2002)), and the like.

According to Hiroyuki Ichikawa, Toshihiko Baba; Spring Meeting of the Japan Society of Applied Physics, 28 p-ZF-8 (2002)), for example, by fabricating a photonic crystal at a surface of an LED (light-emitting diode) on its light extraction side, light in the semiconductor is extracted to the air through avoidance of total reflection, so that the light extraction efficiency is improved. In this case, however, the semiconductor portion is directly machined to fabricate the photonic crystal, and thus defects are resultantly introduced in the active layer and the cladding layer in the LED. In other words, the photonic crystal does not always produce preferable effects in the light-emitting element.

In contrast, by depositing the Si—O containing hydrocarbon film according to the present invention on a light extraction side of an LED and then providing a refractive-index-modulated structure in the film by the energy beam irradiation, it is possible to fabricate a two-dimensional photonic crystal in the film. By properly designing the size and the periodicity of refractive-index-modulated portions in the two-dimensional photonic crystal, it is possible to avoid total reflection of light coming out from the semiconductor, so that the light extraction efficiency from the LED can be improved. In this case, since the semiconductor portion is not machined, defects are not introduced in the active layer and the cladding layer, so that the photonic crystal can produce only preferable effects for the light-emitting element.

Various examples of the present invention will hereinafter be described with reference to Table 1 to Table 4, along with various comparative examples. However, the scope of the present invention is of course not limited to these examples.

Table 1 shows the various conditions for film formation by plasma CVD regarding the Si—O containing hydrogenated carbon film. Table 2 shows the various compositions and properties regarding the various Si—O containing hydrogenated carbon films formed under the various conditions for film formation shown in Table 1. Table 2 also includes the optical properties of some DLC films for reference. Table 3 shows the conditions for energy beam irradiation at a room temperature, the diffraction efficiency and the surface unevenness in the case that the refractive index modulated-type diffractive optical elements are fabricated under the respective conditions, and the other special remarks, regarding the various optical films shown in Table 1 and Table 2. Table 4 shows the various compositions and properties regarding the various films after the energy beam irradiation shown in Table 3. The numerical values at least parenthesized in these tables represent that they go beyond the range of the conditions for the present invention.

TABLE 1

| | | conditions for film formation | | | | |
| --- | --- | --- | --- | --- | --- | --- |
| | | | | | pressure | |
| | film | substrate temperature (° C.) | high-frequency power (W/cm$^2$) | initial pressure (Torr) | increased amount (Torr/minute) | time for pressure increase (minute) |
| Example 1 | Si—O containing hydrogenated carbon film | 90 | 0.63 | 0.1 | 0.012 | 5 |
| Example 2 | Si—O containing hydrogenated carbon film | 90 | 0.84 | 0.1 | 0.015 | 5 |
| Example 3 | Si—O containing hydrogenated carbon film | 90 | 0.63 | 0.1 | 0.012 | 5 |
| Example 4 | Si—O containing hydrogenated carbon film | 90 | 0.63 | 0.1 | 0.012 | 5 |
| Example 5 | Si—O containing hydrogenated carbon film | 90 | 0.63 | 0.1 | 0.012 | 5 |
| Example 6 | Si—O containing hydrogenated carbon film | 90 | 0.63 | 0.1 | 0.012 | 5 |
| Example 7 | Si—O containing hydrogenated carbon film | 90 | 0.84 | 0.1 | 0.015 | 5 |
| Example 8 | Si—O containing hydrogenated carbon film | 90 | 1.2 | 0.05 | 0.019 | 5 |
| Example 9 | Si—O containing hydrogenated carbon film | 90 | 0.53 | 0.24 | 0.011 | 5 |
| Example 10 | Si—O containing hydrogenated carbon film | 90 | 1.1 | 0.1 | 0.018 | 5 |
| Comparative Example 1 | transparent DLC film | | | | | |
| Comparative Example 2 | transparent DLC film | | | | | |
| Comparative Example 3 | Si—O containing hydrogenated carbon film | 90 | 0.63 | 0.1 | (0) | (0) |
| Comparative Example 4 | Si—O containing hydrogenated carbon film | 90 | 0.84 | 0.1 | (0) | (0) |
| Comparative Example 5 | Si—O containing hydrogenated carbon film | 90 | 0.84 | 0.1 | (0) | (0) |
| Comparative Example 6 | Si—O containing hydrogenated carbon film | 80 | 1.12 | (0.05) | (0) | (0) |
| Comparative Example 7 | Si—O containing hydrogenated carbon film | 100 | 0.51 | 0.5 | (0) | (0) |
| Comparative Example 8 | Si—O containing hydrogenated carbon film | 90 | 0.84 | 0.1 | (0.008) | 5 |
| Comparative Example 9 | Si—O containing hydrogenated carbon film | 90 | 0.84 | 0.1 | 0.013 | (2) |
| Comparative Example 10 | Si—O containing hydrogenated carbon film | 90 | (1.3) | 0.1 | 0.018 | 5 |
| Comparative Example 11 | Si—O containing hydrogenated carbon film | 90 | (1.3) | 0.1 | 0.018 | 5 |
| Comparative Example 12 | Si—O containing hydrogenated carbon film | 90 | 1.2 | 0.05 | (0.022) | 5 |
| Comparative Example 13 | Si—O containing hydrogenated carbon film | 90 | (0.42) | 0.24 | 0.011 | 5 |
| Comparative Example 14 | Si—O containing hydrogenated carbon film | (70) | 0.84 | 0.1 | 0.015 | 5 |
| Comparative Example 15 | Si—O containing hydrogenated carbon film | (110) | 0.84 | 0.1 | 0.015 | 5 |
| Comparative Example 16 | Si—O containing hydrogenated carbon film | (110) | 0.63 | 0.1 | 0.012 | 5 |

TABLE 2

| | before energy beam irradiation | | | | | | | | | | |
|---|---|---|---|---|---|---|---|---|---|---|---|
| | content (10$^{22}$ atoms/cm$^3$) | | | | atomic % ratio | | degree of density (g/cm$^3$) | spin density (10$^{16}$ spins/cm$^3$) | refractive index n (wavelength of 520 nm) | extinction coefficient k (wavelength of 248 nm) | (wavelength of 520 nm) |
| | Si | H | O | C | O/Si | C/Si | | | | | |
| Example 1 | 1.0 | 4.9 | 0.91 | 1.8 | 0.91 | 1.80 | 1.28 | 31 | 1.56 | 0.030 | 0.00035 |
| Example 2 | 1.2 | 6.3 | 1.1 | 1.7 | 0.92 | 1.42 | 1.47 | 300 | 1.68 | 0.070 | 0.0014 |
| Example 3 | 1.0 | 4.9 | 0.91 | 1.8 | 0.91 | 1.80 | 1.28 | 31 | 1.56 | 0.030 | 0.00035 |
| Example 4 | 1.0 | 4.9 | 0.91 | 1.8 | 0.91 | 1.80 | 1.28 | 31 | 1.56 | 0.030 | 0.00035 |
| Example 5 | 1.0 | 4.9 | 0.91 | 1.8 | 0.91 | 1.80 | 1.28 | 31 | 1.56 | 0.030 | 0.00035 |
| Example 6 | 1.0 | 4.9 | 0.91 | 1.8 | 0.91 | 1.80 | 1.28 | 31 | 1.56 | 0.030 | 0.00035 |
| Example 7 | 1.2 | 6.3 | 1.1 | 1.7 | 0.92 | 1.42 | 1.47 | 300 | 1.68 | 0.070 | 0.0014 |
| Example 8 | 1.4 | 7.5 | 0.9 | 1.6 | 0.64 | 1.14 | 1.58 | 9100 | 1.84 | 0.14 | 0.0047 |
| Example 9 | 0.9 | 4.4 | 1.3 | 2.2 | 1.44 | 2.44 | 1.19 | 8 | 1.49 | 0.011 | 0.000089 |
| Example 10 | 1.3 | 7.1 | 1.0 | 2.1 | 0.77 | 1.62 | 1.55 | 1700 | 1.76 | 0.11 | 0.0029 |
| Comparative Example 1 | | | | | | | | | 1.56 | (0.16) | |
| Comparative Example 2 | | | | | | | | | 1.56 | (0.16) | |
| Comparative Example 3 | | | | | 0.88 | 1.73 | | | 1.56 | (0.16) | 0.00052 |
| Comparative Example 4 | | | | | 0.92 | 1.50 | | | 1.68 | (0.17) | 0.0016 |
| Comparative Example 5 | | | | | 0.92 | 1.50 | | | 1.68 | (0.17) | 0.0016 |
| Comparative Example 6 | | | | | 0.62 | (3.50) | | | 1.82 | (0.21) | 0.0031 |
| Comparative Example 7 | | | | | 1.41 | 1.08 | | | 1.50 | (0.15) | 0.00028 |
| Comparative Example 8 | | | | | | | | | 1.67 | (0.16) | 0.0031 |
| Comparative Example 9 | | | | | | | | | 1.69 | (0.15) | 0.0028 |
| Comparative Example 10 | 1.4 | 7.9 | 0.9 | 1.9 | 0.64 | 1.36 | (1.63) | (15000) | (1.87) | (0.15) | (0.0053) |
| Comparative Example 11 | 1.4 | 7.9 | 0.9 | 1.9 | 0.64 | 1.36 | (1.63) | (15000) | (1.87) | (0.15) | (0.0053) |
| Comparative Example 12 | 1.4 | 7.7 | 0.9 | 1.6 | 0.64 | 1.14 | (1.61) | (11000) | 1.85 | (0.15) | 0.0048 |
| Comparative Example 13 | 0.9 | 4.3 | 1.3 | 2.1 | 1.44 | 2.33 | (1.13) | (<1) | (1.47) | 0.0095 | 0.000046 |
| Comparative Example 14 | | | | | | | | | | (0.21) | (0.008) |
| Comparative Example 15 | | | | | | | | | | | |
| Comparative Example 16 | | | | | | | | | 1.55 | 0.028 | 0.00031 |

TABLE 3

| | energy beam | refractive index patterning method | refractive index modulated-type diffractive optical element | | special remarks |
|---|---|---|---|---|---|
| | | | diffraction efficiency (%) | surface unevenness (nm) | |
| Example 1 | KrF excimer laser (wavelength of 248 nm) | none | | | |
| Example 2 | KrF excimer laser (wavelength of 248 nm) | none | | | |
| Example 3 | KrF excimer laser (wavelength of 248 nm) | interference exposure | 22 | <10 | |
| Example 4 | XeCl excimer laser (wavelength of 308 nm) | interference exposure | 26 | <10 | |
| Example 5 | fourth harmonic wave of YAG laser (wavelength of 266 nm) | interference exposure | 19 | <10 | |
| Example 6 | synchrotoron radiation beam (50-3000 eV) | gold mask | | | lens fabrication |
| Example 7 | XeCl excimer laser (wavelength of 308 nm) | interference exposure | 62 | <10 | |
| Example 8 | KrF excimer laser (wavelength of 248 nm) | none | | | |
| Example 9 | KrF excimer laser (wavelength of 248 nm) | none | | | |
| Example 10 | KrF excimer laser (wavelength of 248 nm) | none | | | |
| Comparative Example 1 | KrF excimer laser (wavelength of 248 nm) | none | | | |
| Comparative Example 2 | KrF excimer laser (wavelength of 248 nm) | interference exposure | 0.2 | 320 | |
| Comparative Example 3 | KrF excimer laser (wavelength of 248 nm) | none | | | |
| Comparative Example 4 | KrF excimer laser (wavelength of 248 nm) | none | | | |
| Comparative Example 5 | KrF excimer laser (wavelength of 248 nm) | interference exposure | 5 | 60 | |
| Comparative Example 6 | KrF excimer laser (wavelength of 248 nm) | none | | | |
| Comparative Example 7 | KrF excimer laser (wavelength of 248 nm) | none | | | |
| Comparative Example 8 | | | | | |
| Comparative Example 9 | | | | | |
| Comparative Example 10 | KrF excimer laser (wavelength of 248 nm) | none | | | |
| Comparative Example 11 | KrF excimer laser (wavelength of 248 nm) | interference exposure | 6 | 50 | |
| Comparative Example 12 | | | | | |
| Comparative Example 13 | | | | | |
| Comparative Example 14 | | | | | clouded |
| Comparative Example 15 | | | | | film peeling |
| Comparative Example 16 | KrF excimer laser (wavelength of 248 nm) | none | | | small Δn |

TABLE 4

| | content ($10^{22}$ atoms/cm$^3$) | | | | atomic % ratio | | degree of density (g/cm$^3$) | spin density ($10^{16}$ spins/cm$^3$) | refractive index n (wavelength of 520 nm) | amount Δn of refractive index change (wavelength of 520 nm) | extinction coefficient k (wavelength of 248 nm) | (wavelength of 520 nm) |
|---|---|---|---|---|---|---|---|---|---|---|---|---|
| | Si | H | O | C | O/Si | C/Si | | | | | | |
| Example 1 | 1.1 | 2.2 | 1.6 | 1.4 | 1.45 | 1.27 | 1.55 | <1.0 | 1.46 | 0.10 | 0.00048 | 0.0000017 |
| Example 2 | 1.3 | 2.3 | 1.8 | 1.5 | 1.38 | 1.15 | 1.57 | <1.0 | 1.48 | 0.20 | 0.00099 | 0.000010 |
| Example 3 | | | | | | | | | | | | |
| Example 4 | | | | | | | | | | | | |
| Example 5 | | | | | | | | | | | | |
| Example 6 | | | | | | | | | | | | |
| Example 7 | | | | | | | | | | | | |
| Example 8 | 1.4 | 2.7 | 1.8 | 1.5 | 1.29 | 1.07 | 1.57 | <1.0 | 1.47 | 0.37 | 0.0010 | 0.000014 |
| Example 9 | 1.2 | 1.7 | 1.9 | 2.1 | 1.58 | 1.75 | 1.49 | <1.0 | 1.45 | 0.04 | 0.00076 | 0.000011 |
| Example 10 | 1.3 | 2.5 | 1.7 | 1.6 | 1.31 | 1.23 | 1.64 | <1.0 | 1.46 | 0.30 | 0.00085 | 0.0000095 |
| Comparative Example 1 | | | | | | | | | (1.89) | 0.33 | (0.25) | |
| Comparative Example 2 | | | | | | | | | | | | |
| Comparative Example 3 | | | | | 1.42 | 1.17 | | | 1.48 | 0.08 | 0.0013 | 0.0000040 |
| Comparative Example 4 | | | | | 1.31 | 1.15 | | | 1.47 | 0.21 | 0.0012 | 0.000033 |
| Comparative Example 5 | | | | | | | | | | | | |
| Comparative Example 6 | | | | | 1.23 | 3.10 | | | 1.53 | 0.29 | 0.0023 | 0.00047 |
| Comparative Example 7 | | | | | 1.67 | 1.06 | | | 1.45 | 0.05 | 0.00051 | 0.0000017 |
| Comparative Example 8 | | | | | | | | | | | | |
| Comparative Example 9 | | | | | | | | | | | | |
| Comparative Example 10 | 1.4 | 4.2 | 1.3 | 1.7 | 0.93 | 1.21 | 1.71 | 100 | 1.54 | 0.33 | 0.014 | 0.0012 |
| Comparative Example 11 | | | | | | | | | | | | |
| Comparative Example 12 | | | | | | | | | | | | |
| Comparative Example 13 | | | | | | | | | | | | |
| Comparative Example 14 | | | | | | | | | | | | |
| Comparative Example 15 | | | | | | | | | | | | |
| Comparative Example 16 | | | | | | | | | 1.53 | (0.02) | 0.008 | 0.00012 |

In these tables, the composition of the film was determined by an RBS/HFS method, the degree of density was determined by a GIXR method, the spin density was determined by an ESR method, and the refractive index and the extinction coefficient were determined by spectroscopic ellipsometry. Further, the diffraction efficiency of the refractive index modulated-type diffractive optical element was determined as a ratio of 1st order diffracted light intensity to incident light intensity by using laser light having a visible light wavelength of 532 nm. However, it is necessary to eliminate influence of the surface unevenness so as to correctly evaluate the diffraction efficiency for the refractive index modulated-type diffractive optical element. In other words, it is necessary to eliminate diffraction efficiency increment attributed to the refractive index difference between the film and the air at the surface unevenness. Therefore, matching oil having a refractive index approximately equal to that of the synthesized film was applied on the synthesized film and then a glass plate was placed thereon. By covering the surface unevenness with the oil having a refractive index approximately equal to that of the synthesized film, the diffraction efficiency was measured without the influence of the surface unevenness. The size of the surface unevenness (difference in height) was determined through measurement under an AFM (surface atomic force microscope).

In the synthesis of various Si—O containing hydrogenated carbon films, each film was deposited to a thickness of about 2 μm on a glass substrate set at the temperature shown in Table 1 by introducing hexamethyldisiloxane $(CH_3)_3SiOSi(CH_3)_3$ under the pressure condition shown in Table 1 into an evacuated reaction chamber, and applying the high-frequency power shown in Table 1. The time for energy beam irradiation in Table 3 was uniformly set to 1 hour. Various conditions, effects, and the like in the present invention will hereinafter be considered with reference to Table 1 to Table 4.

COMPARATIVE EXAMPLES 1, 2

Initially, the DLC film as Comparative Example 1 is preferable in that it can achieve a sufficiently large value of Δn=0.33 as the refractive index change caused by the energy beam (KrF excimer laser) irradiation (see Table 4). However, in the DLC film of Comparative Example 1, the extinction coefficient for the ultraviolet light range (wavelength of 248 nm) is as high as 0.16 in a state immediately after the film formation, which is not less than 0.15 (see Table 2), and the extinction coefficient is further increased to 0.25 after the KrF excimer laser irradiation (see Table 4). As a result, in the case that the refractive index modulated-type diffractive optical element was fabricated with use of the DLC film formed under the same conditions as in Comparative Example 1 and by interference exposure with the KrF excimer laser as shown in Comparative Example 2, a significantly large unevenness of 320 nm was generated on the film surface, and only a significantly low value of 0.2% could be obtained as the diffraction efficiency (see Table 3). It is considered that this low diffraction efficiency was caused because uniform property-modifying patterns could not be formed in the film thickness direction under the influence of the fact that ultraviolet light serving as property-modifying light did not penetrate deeply into the film owing to the high extinction coefficient and the surface unevenness became unexpected factors of scattering and diffraction, and other facts.

EXAMPLES 1-3

Examples 1 and 2 show typical and preferable Si—O containing hydrogenated carbon films according to the present invention. In each of the Si—O containing hydrogenated carbon films in Examples 1, 2, it is found that the refractive index just after the film formation for light of 520 nm wavelength falls within the range for the condition of the present invention, i.e., from at least 1.56 to at most 1.76, that the extinction coefficient for light of 248 nm wavelength is in the more preferable range, i.e., less than 0.12 (see Table 2), and that the refractive index and the extinction coefficient are decreased by the energy beam (KrF excimer laser) irradiation (see Table 4). Further, in each of the films of Examples 1 and 2, the amount of refractive index change is in the more preferable range of at least 0.10 and at most 0.30 for the visible light range, and the extinction coefficient is not more than 0.005 resulting in sufficient transparency (see Table 4). Further, in each of Examples 1 and 2, it is found that all of the composition, the degree of density, and the spin density in the film before and after the energy beam irradiation fall within the respective ranges of the above-described preferable conditions in the present invention (see Table 2, Table 4).

In Example 3 in which a refractive index modulated-type diffractive optical element was fabricated with use of an Si—O containing hydrogenated carbon film formed under the same conditions as in Example 1 (see Table 1) and by the interference exposure with a KrF excimer laser, the diffraction efficiency has a sufficiently high value of 22% (see Table 3). This is because the extinction coefficient of the film in Example 3 was sufficiently low for laser light having a wavelength of 248 nm, and thus the film properties were uniformly modified in the film thickness direction. Further in Example 3, the surface unevenness of the film after the ultraviolet light irradiation has a favorable small value less than 10 nm (see Table 3).

The reason why each of the Si—O containing hydrogenated carbon films in Examples 1-3 could have a sufficiently low value of an extinction coefficient for the ultraviolet light range (wavelength of 248 nm) is that the above-described conditions for the film-forming method developed in the present invention were satisfied (see Table 1).

COMPARATIVE EXAMPLES 3-9

The conditions for depositing the Si—O containing hydrogenated carbon films in Comparative Examples 3, 4 were similar to those in Examples 1, 2 except that the pressure was not increased after the start of film formation (see Table 1). As is clear from comparison between Comparative Examples 3, 4 and Examples 1, 2, the present invention has succeeded for the first time in decreasing the extinction coefficient for the ultraviolet light range (see Table 2) by continuously increasing the pressure at a rate in a range from at least 0.01 Torr/minute and at most 0.02 Torr/minute until elapse of at least 3 minutes after the start of film formation (see Table 1). It is found that each of the Si—O containing hydrogenated carbon films in Comparative Examples 3, 4 has favorable properties such as an refractive index, an amount of refractive index change, and transparency for the visible light range, except that the extinction coefficient is high for the ultraviolet light range (see Table 2, Table 4).

In Comparative Example 5, a refractive index modulated-type diffractive optical element was fabricated with use of an Si—O containing hydrogenated carbon film formed under the same conditions as in Comparative Example 4 (see Table 1) and by the interference exposure with a KrF excimer laser. In this case, since the extinction coefficient of the film was high for the ultraviolet light range, the obtained refractive index modulated-type diffractive optical element has a low diffraction efficiency of 5% and somewhat large unevenness of 60 nm on the surface (see Table 3).

In deposition of each of the Si—O containing hydrogenated carbon films in Comparative Examples 6, 7, as compared with Comparative Examples 3, 4 in which the pressure was not changed during film formation, the other conditions, i.e., the substrate temperature and the high-frequency power were changed (see Table 1). It is found that each of the Si—O containing hydrogenated carbon films in Comparative Examples 6, 7 has favorable properties as to the refractive index, the amount of refractive index change, and the transparency for the visible light range, except that the extinction coefficient is high for the ultraviolet light range (see Table 2, Table 4).

The conditions for depositing the Si—O containing hydrogenated carbon film in Comparative Example 8 were similar to those in Example 2, except that the rate of pressure increase after the start of film formation was decreased to 0.008 Torr/minute (see Table 1). It is found that in Comparative Example 8 as well, the extinction coefficient of the film is as large as 0.16 for the ultraviolet light range, which is not less than 0.15 (see Table 2).

The conditions for depositing the Si—O containing hydrogenated carbon film in Comparative Example 9 were similar to those in Example 2, except that the time for pressure increase after the start of film formation was reduced to 2 minutes (see Table 1). It is found that in Comparative Example 9 as well, the extinction coefficient of the film is as large as 0.15 for the ultraviolet light range (see Table 2).

EXAMPLES 4-7

Examples 4, 5 were similar to Example 3, except that the conditions for energy beam irradiation (types of applied laser) were changed (see Table 3). It is found that in each of Examples 4, 5 as well, the diffraction efficiency is high and the film unevenness is small as in Example 3 (see Table 3).

In Example 6, on the Si—O containing hydrogenated carbon film obtained under the same conditions for deposition as those in Example 1 (see Table 1), a gold mask was patterned by a lift-off method, and the refractive index of the film was modulated by exposure using synchrotron radiation (energy of 50 to 3000 eV) (see Table 3). The gold mask was then removed by etching, so that there was formed a refractive index modulated-type diffraction lens having a function of converging visible light.

In Example 7, a refractive index modulated-type diffractive optical element was fabricated with use of the film obtained under the same conditions for film formation as those for the Si—O containing hydrogenated carbon film in Example 2 (see Table 1) in which the relatively large amount of refractive index change Δn=0.20 was obtained (see Table 4). In this case, the film was irradiated with an XeCl excimer laser (wavelength of 308 nm) by the known interference exposure method within three days after the film formation (see Table 3), and refractive index patterning was performed to thereby fabricate the diffractive optical element. As a result, an extremely high diffraction efficiency of 62% was obtained. In this case as well, the surface unevenness has a significantly small value less than 10 nm, which is favorable (see Table 3).

COMPARATIVE EXAMPLES 10, 11

Comparative Example 10 is related to an Si—O containing hydrogenated carbon film before the energy beam irradiation, having a extinction coefficient not less than 0.15 for the ultraviolet light range (wavelength of 248 nm) (see Table 2). Comparative Example 10 shows the case that the high-frequency power in the conditions for film formation is excessively higher than the preferable range of the present invention. In the Si—O containing hydrogenated carbon film before the energy beam irradiation, the degree of density was not less than 1.60 g/cm$^3$, the spin density was not less than $1.0\times10^{20}$/cm$^3$, the refractive index was not less than 1.85 for the visible light range (wavelength of 520 nm), and the extinction coefficient was not less than 0.005 for the visible light range. All of their numerical values are higher than the preferable range of the present invention.

In Comparative Example 11, the refractive index modulated-type diffractive optical element was fabricated with use of the film obtained under the same conditions for deposition as those for the Si—O containing hydrogenated carbon film in Comparative Example 10 (see Table 1), and by interference exposure with an KrF excimer laser. In this case, since the extinction coefficient of the film was high for the ultraviolet light range, the diffraction efficiency is as low as 6% and the surface unevenness has a somewhat large value of 50 nm (see Table 3).

EXAMPLES 8, 9 and COMPARATIVE EXAMPLES 12, 13

Examples 8, 9 show the cases corresponding to the upper and lower limits of the ranges of the conditions for film formation and various properties desired in the present invention. In other words, Example 8 represents the case that the refractive index of the Si—O containing hydrogenated carbon film before the energy beam irradiation was 1.84, which is close to the desired upper limit value of 1.85, and Example 9 represents the case that the refractive index was 1.49, which is close to the desired lower limit value of 1.48 (see Table 2). In both the cases of Examples 8, 9 as well, the compositions and various properties of the films was in the range of the desired conditions in the present invention (see Table 2, Table 4).

On the other hand, Comparative Example 12 represents the case that the extinction coefficient of the film was 0.15 for the ultraviolet light range, which exceeds the upper limit of the condition range required in the present invention, i.e, less than 0.15 (see Table 2), and Comparative Example 13 represents the case that the refractive index of the film was 1.47 for the visible light, which is less than the lower limit value of 1.48 required in the present invention. The reason why the values of these properties of the films in Comparative Examples 12, 13 slightly went beyond the upper limit and the lower limit, respectively, of the condition range required in the present invention is that the conditions for film formation deviated from the conditions required in the present invention (see Table 1). Specifically, this is because in Comparative Example 12, the rate of pressure increase exceeded the upper limit of the condition range, and in Comparative Example 13, the high-frequency power was below the lower limit of the condition range (see Table 1). It is found that, in accordance with the deviations from the film-forming conditions, the degree of density and the spin density in the film also fall outside the condition range required in the present invention (see Table 2).

EXAMPLE 10

The Si—O containing hydrogenated carbon film deposited under the conditions for film formation in Example 10 (see Table 1) has values close to the upper limit of the more preferable range in the present invention, as to the refractive index for the visible light range (wavelength of 520 nm) and the extinction coefficient for the ultraviolet light range (wavelength of 248 nm). More specifically, in the Si—O containing hydrogenated carbon film before the energy beam irradiation, the refractive index was 1.76, the extinction coefficient for the ultraviolet light range was 0.1, and the amount of refractive index change was 0.30 (see Table 2, Table 4).

COMPARATIVE EXAMPLES 14-16

Comparative Examples 14-16 correspond to the cases that the substrate temperature deviates from the preferable range in the present invention. Comparative Example 14 represents the case that the substrate temperature was as low as 70° C. (see Table 1). In this case, the deposited film was clouded as shown in the column of the special remarks in Table 3. Owing to light scattering attributed to the cloudiness, the film in Comparative Example 14 showed an apparent extinction coefficient as high as 0.21. Comparative Example 15 represents the case that the substrate temperature was as high as 110° C. (see Table 1). In this case, the deposited film peeled off the substrate as shown in the column of special remarks in Table 3. For the reason of this, it may be considered that the excessively high substrate temperature caused excessive oxidation of the film and thus the film was deteriorated and peeled. Comparative Example 16 represents the case that the substrate temperature was as high as 110° C. similarly as in Comparative Example 15. However, Comparative Example 16 used the high-frequency power and the pressure increase rate decreased as compared with Comparative Example 15. In Comparative Example 16, amount Δn of refractive index change of the Si—O containing hydrogenated carbon film was as small as 0.02. For the reason of this, it may be considered that the excessively high substrate temperature promoted mass transfer reaction (migration) and thus the film was stabilized.

EXAMPLE 11

In Example 11 in the present invention, a refractive index modulated-type diffractive optical element was fabricated at a room temperature with use of an Si—O containing hydrogenated carbon film deposited on a quartz substrate under the same conditions as those of Example 1 (see Table 1), and by beam scanning with fourth harmonic wave (wavelength of 266 nm) light of a YAG laser. More specifically, a lens was used to decrease a beam diameter to 0.3 μm, and the beam scanning was performed under the conditions of an irradiation power density of 35.0 mW/mm$^2$ and a rate of 0.5 mm/s. Here, the beam diameter refers to a diameter of an area having light intensity not less than 1/e of the maximum light intensity at the center of a cross section of the beam, and the beam scanning was conducted along parallel lines arranged at a spacing of 0.5 μm. Measurement of diffraction efficiency was conducted on the diffractive optical element fabricated as such, and the result of measurement showed a value of 3.1%.

EXAMPLE 12

In Example 12 in the present invention, measurement of refractive index change was conducted on the Si—O containing hydrogenated carbon film that was deposited on a quartz substrate under the same conditions as those of Example 2 (see Table 1) and irradiated with 248 nm wavelength light of a mercury lamp (a DUV ray (deep ultraviolet ray)) at a room temperature. In this case, the irradiation power density was set to 0.34 mW/mm$^2$, and the irradiation energy density was variously changed in a range from 0.01 to 1.8 MJ/m$^2$ by changing the irradiation time. The measured refractive index changes are shown in the graph of FIG. 45.

Figure 45:
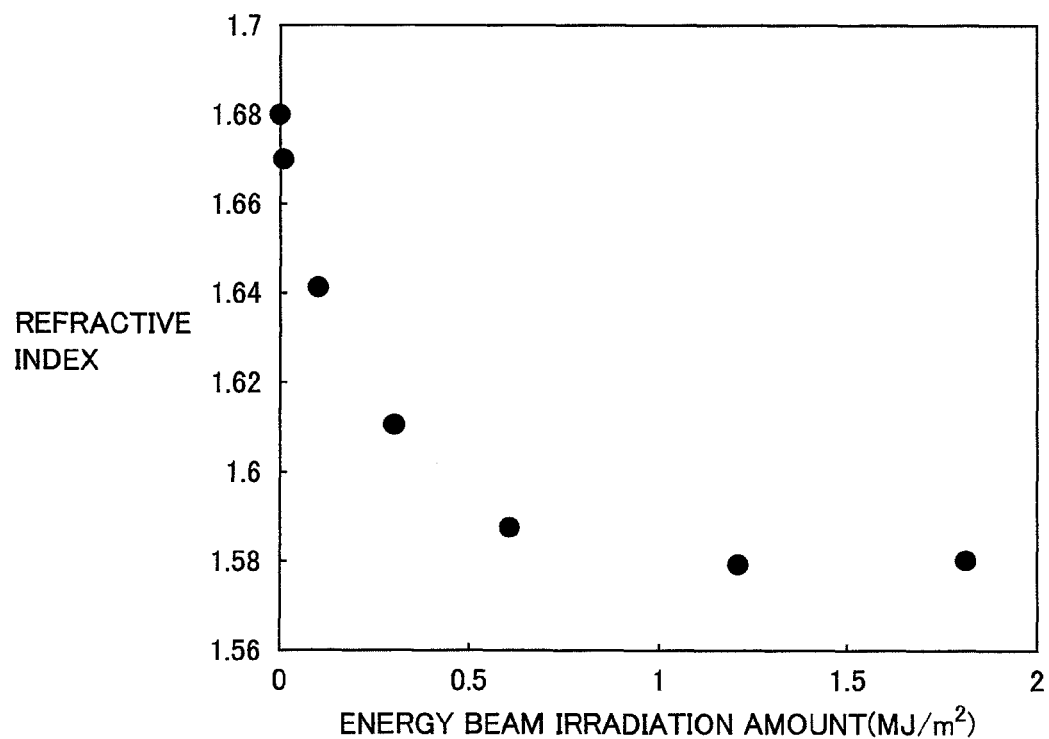
FIG. 45 is a graph that shows the relation between the amount of energy beam irradiation and the amount of refractive index change in the Si—O containing hydrogenated carbon film.

In the graph of FIG. 45, the horizontal axis shows the energy beam irradiation amount by an energy density per area (MJ/m$^2$), and the vertical axis shows the measured refractive index. As is clear from the graph, the refractive index of the Si—O containing hydrogenated carbon film can also be changed (decreased) by the irradiation with light of the mercury lamp. Here, the energy beam irradiation of 0.01 MJ/m$^2$ causes a refractive index decrease only by 0.01, whereas the energy beam irradiation of at least 0.1 MJ/m$^2$ causes a refractive index decrease by a change amount of at least 0.04. It can be expected to utilize such a large amount of refractive index change to thereby fabricate a refractive index modulated-type diffractive optical element having favorable properties.

In Example 12, therefore, a refractive index modulated-type diffractive optical element was fabricated by irradiating the Si—O containing hydrogenated carbon film with light of a mercury lamp. Specifically, a photomask having an L & S (line and space) pattern that includes repetition of lines (light-blocking portions) each having a width of 1.2 μm and spaces (transmitting portions) each having a width of 1.2 μm, and a DUV ray (wavelength of 248 nm) aligner were used to transfer the mask pattern at the same magnification to the Si—O containing hydrogenated carbon film deposited under the same conditions as those of Example 2, through the irradiation with mercury lamp light. In this case, a plurality of refractive index modulated-type diffractive optical elements were fabricated with the irradiation power density being set to 0.34 mW/mm$^2$, and with the energy beam irradiation amount being variously changed in the range from 0.01 to 1.8 MJ/m$^2$ by changing the irradiation time. The graph of FIG. 46 shows the results of evaluation of the diffraction efficiency in the diffractive optical elements obtained as such.

Figure 46:
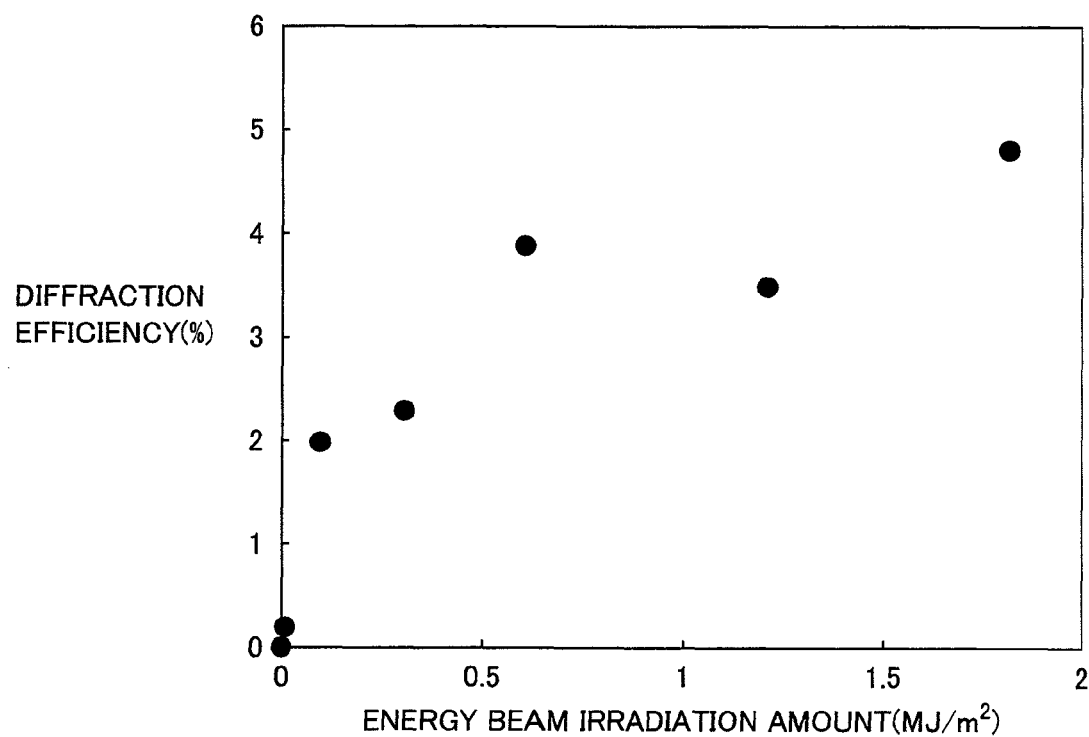
FIG. 46 is a graph that shows the relation between the amount of energy beam irradiation and the diffraction efficiency in an diffractive optical element fabricated by using the Si—O containing hydrogenated carbon film.

In the graph of FIG. 46, the horizontal axis shows the energy beam irradiation amount (MJ/m$^2$), and the vertical axis shows the measured diffraction efficiency. As is clear from the graph, it is also possible to fabricate the refractive index modulated-type diffractive optical element by irradiating the Si—O containing hydrogenated carbon film with the mercury lamp light. Here, an energy beam irradiation amount of 0.01 MJ/m$^2$ only provides a diffraction efficiency of at most 0.2%. However, an energy beam irradiation amount of at least 0.1 MJ/m$^2$ provides a refractive index modulated-type diffractive optical element having a diffraction efficiency of at least 2.0% and suitable for practical use. In view of the foregoing, when the Si—O containing hydrogenated carbon film is irradiated with an energy beam to fabricate a refractive index modulated-type diffractive optical element, the energy beam irradiation amount is preferably at least 0.1 MJ/m$^2$.

In the Si—O containing hydrogenated carbon films fabricated in the above-described various examples, and the diffractive optical elements utilizing the same, it is possible to achieve an amount of refractive index change that could not be obtained in the conventional refractive-index-changing material such as a Ge-doped silica glass or a photopolymer. The diffractive optical elements formed with use of such an Si—O containing hydrogenated carbon film can achieve a high diffraction efficiency that could not be obtained in the conventional diffractive optical elements.

EXAMPLE 13

In Example 13 according to the present invention, an Si—O containing hydrogenated carbon film having a thickness of 2 μm was synthesized on a quartz substrate under the same conditions as those of Example 2.

FIG. 1 shows in a schematic cross-sectional view an example of a method for changing the refractive index of the optical thin film obtained as such by performing ultraviolet ray irradiation while controlling the temperature of the film. Specifically, an Si—O containing hydrogenated carbon film 2 synthesized on a substrate 1 is placed on a heater 3 such as a hot plate, and thin film 2 is irradiated with ultraviolet light 4 in a heated state or a non-heated state.

More specifically, fourth harmonic wave (wavelength of 266 nm) light of a YAG laser was used as irradiation light 4 to expose a whole area of thin film 2 in the air, to thereby change the refractive index of the whole area of thin film 2. At that time, ultraviolet light 4 had an irradiation power density of 12.5 mW/mm$^2$. When the ultraviolet light irradiation was performed, thin film 2 on substrate 1 was controlled on a hot plate 3 to various temperatures. For the temperature control, three conditions were set up: no heating; heating to 60° C.; and heating to 90° C.

Figure 2:
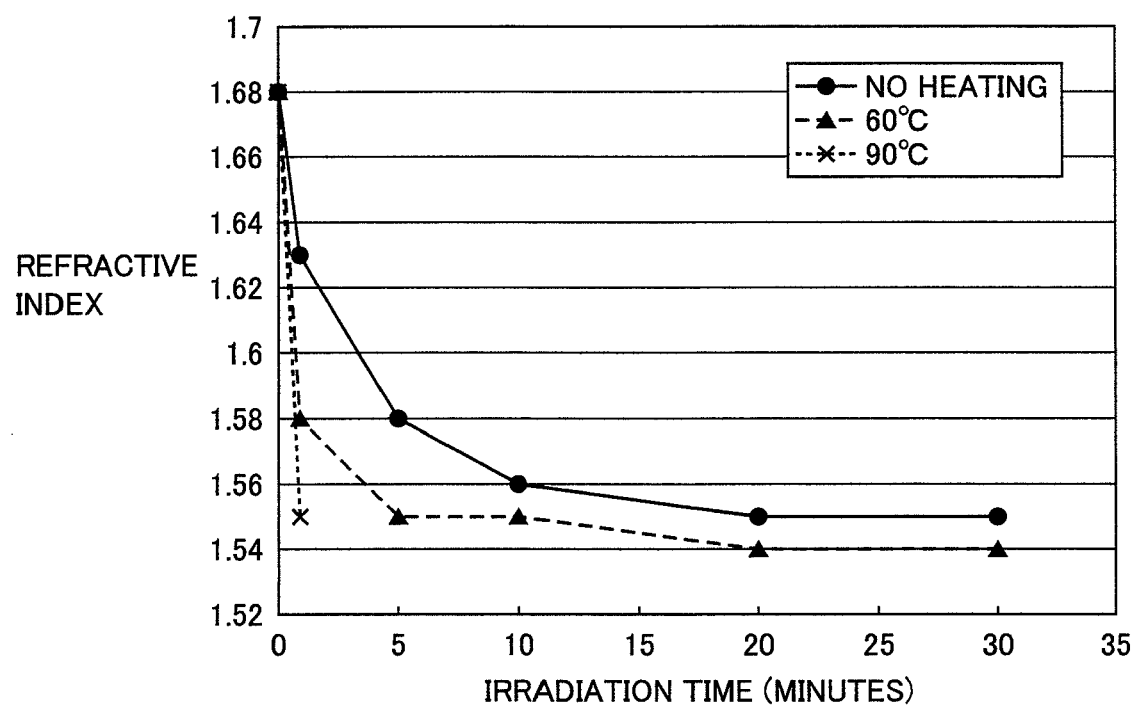
FIG. 2 is a graph that shows influence of the substrate temperature on the relation between time for irradiating the optical thin film with ultraviolet light and the refractive index change.

The graph in FIG. 2 shows a refractive index change in thin film 2 when irradiation time of ultraviolet light 4 was variously changed at the three substrate temperatures. Namely, the horizontal axis of the graph shows time (minute) during which irradiation with ultraviolet light 4 was performed, and the vertical axis shows a refractive index of thin film 2 irradiated with the ultraviolet light. Black circles represent the case of no heating, black triangles represent the case of heating to 60° C., and crosses represent heating to 90° C. in the graph.

As is seen from FIG. 2, the refractive index of thin film 2 was more rapidly changed in the case that heating was performed, in comparison with the case that heating with hot plate 3 was not performed. Further, when the case of a heating temperature of 60° C. is compared with the case of a heating temperature of 90° C., it is found that a refractive index of thin film 2 was more rapidly changed in the case of the higher heating temperature of 90° C., until the time for irradiation with ultraviolet light 4 reached 1 minute.

The reason why FIG. 2 includes no data in the case that time for irradiation with ultraviolet light 4 reached or exceeded 5 minutes in heating to 90° C. is that thin film 2 peeled off substrate 1 and the refractive index could not be evaluated. As is clear from this, an excessively high heating temperature in the air causes thin film 2 to peel off substrate 1, so that the heating temperature is preferably at most 90° C.

EXAMPLE 14

In Example 14, each of Si—O containing hydrogenated carbon films having thicknesses of 1 μm and 2 μm was synthesized on a quartz substrate under the same conditions as those of Example 1.

On each of these thin films, a pattern of a refractive index modulation was formed by a known interference exposure method using a KrF excimer laser (wavelength of 248 nm) as an irradiation light source. In other words, in FIG. 1, thin film 2 was irradiated with interference light 4 that had passed through a known phase grating mask (not shown). As such, there was formed a refractive index modulated-type diffractive optical element having a spectroscopic function for the visible light. During the interference exposure, the temperature of thin film 2 was controlled on hot plate 3. For the temperature control, there were set up two conditions: no heating; and heating to 200° C. Excimer laser light 4 was applied in a nitrogen atmosphere at a power density of 12.5 mW/mm$^2$ for irradiation time of 120 minutes.

To evaluate the spectroscopic function of the refractive index modulated-type diffractive optical element obtained by such an interference exposure method, the diffraction efficiency, i.e., ratio of 1st order diffracted light intensity to incident light intensity was measured by using laser light having a visible light wavelength of 532 nm. The graph of FIG. 3 shows the results thereof.

Figure 3:
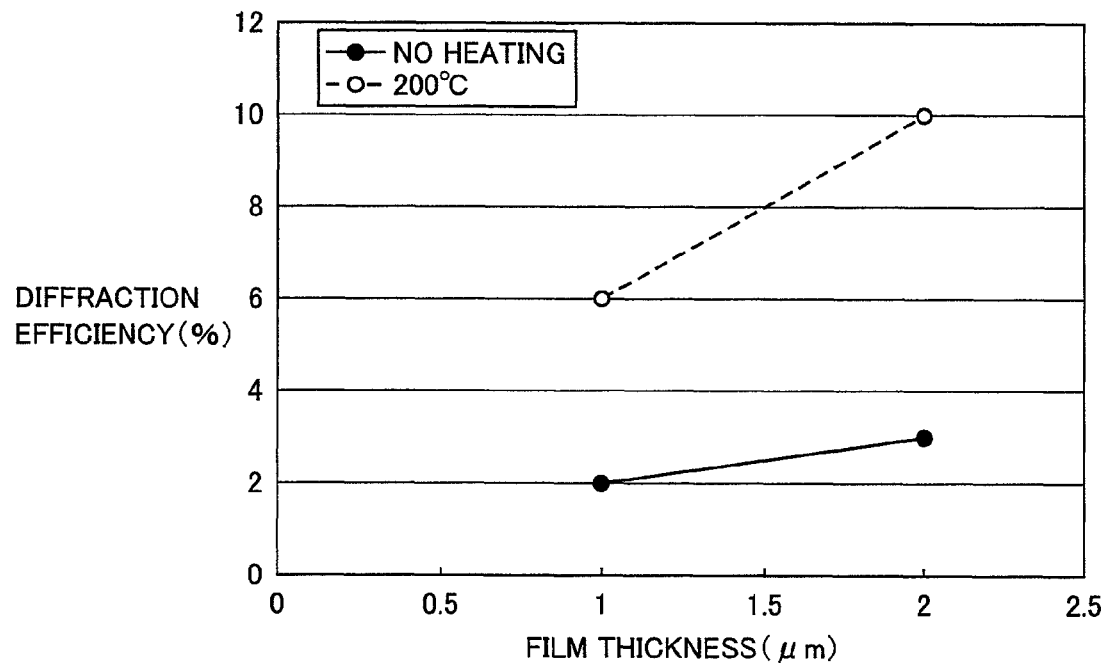
FIG. 3 is a graph that shows influence of the substrate temperature during ultraviolet light irradiation on the relation between the thickness of the optical element obtained by irradiating the optical thin film with ultraviolet light and its diffraction efficiency.

In the graph of FIG. 3, the horizontal axis shows the thickness (μm) of the thin film, and the vertical axis shows the diffraction efficiency (%) of the refractive index modulated-type diffractive optical element obtained by the interference exposure method. Black circles in the graph represent the case that interference exposure was performed with no heating, and white circles represent the case that interference exposure was performed with heating to 200° C.

The graph of FIG. 3 shows that the thin films subjected to interference exposure while being heated to 200° C. has a higher diffraction efficiency as compared with the thin films subjected to interference exposure while not being heated, in both the cases of the film thickness of 1 μm and the film thickness of 2 μm. This is because heating of the thin film promotes refractive index modulation, i.e., property modification of the thin film.

In Example 14, peeling of the thin film as in Example 13 did not occur even if the interference exposure was performed at a temperature as high as 200° C. for a period as long as 120 minutes. This is conceivably because the oxygen concentration in the nitrogen atmosphere was low during the excimer laser irradiation, so that oxidation reaction in the thin film was less likely to proceed, resulting in that deterioration of the thin film was suppressed.

When the thin film is irradiated with ultraviolet light, an atmosphere of a noble gas such as argon may of course be used instead of the nitrogen atmosphere.

EXAMPLE 15

In Example 15, an Si—O containing hydrogenated carbon film having a thickness of 2 μm was synthesized on a quartz substrate under the same conditions as those of Example 2.

On the obtained film, a pattern of a refractive index modulation was formed by an interference exposure method similar to that in Example 14, using XeCl excimer laser (wavelength of 308 nm) light as irradiation light 4. As such, there was formed a refractive index modulated-type diffractive optical element having a spectroscopic function for the visible light. At this time, the temperature of thin film 2 was controlled on hot plate 3 during the laser light irradiation. As the condition, there were set up three conditions: no heating; heating to 120° C.; and heating to 200° C. The excimer laser light irradiation was performed in vacuum at a power density of 19.8 mW/mm$^2$ for irradiation time of 30 minutes. Regarding the spectroscopic function of the refractive index modulated-type diffractive optical element obtained as such, FIG. 4 shows the results evaluated with the same method as that of Example 14.

Figure 4:
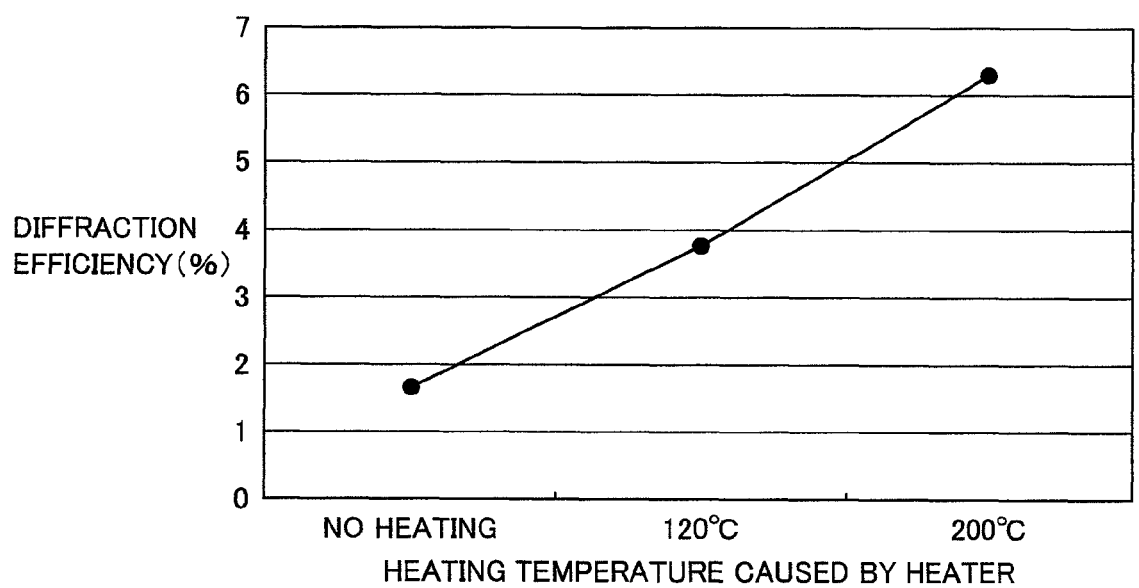
FIG. 4 is a graph that shows the relation between the diffraction efficiency of the optical element obtained by irradiating the optical film with ultraviolet light and the substrate temperature during the ultraviolet light irradiation.

In the graph of FIG. 4, the horizontal axis shows the heating temperature by the heater, and the vertical axis shows the diffraction efficiency (%) of the refractive index modulated-type diffractive optical element obtained by the interference exposure method. It is seen in the graph that the optical element having been heated and irradiated with ultraviolet light is higher in diffraction efficiency than the optical element having not been heated. Further, it is found that a higher heating temperature causes a higher diffraction efficiency. This is because heating of the thin film during the ultraviolet light irradiation promotes refractive index modulatein, i.e., property modification of the thin film. In Example 15 as well, peeling of the thin film did not occur similarly as in Example 14 even at a temperature as high as 200° C. This is conceivably because the oxygen concentration in the vacuum atmosphere was low during the excimer laser irradiation, so that oxidation reaction in the thin film was less likely to proceed, resulting in that deterioration of the thin film did not proceed.

EXAMPLE 16

In Example 16 according to the present invention, a protective layer or/and a transparent material plate is/are attached onto the Si—O containing hydrogenated carbon film formed on the substrate.

(Protective Layer)

This protective layer is for preventing the Si—O containing hydrogenated carbon film from reacting with oxygen or water at the time of the optical property modification or under use of the film. The protective layer is expected to show effects of serving as a barrier film against oxygen and water and inhibiting the detachment of elements from and the ablation at a surface of the Si—O containing hydrogenated carbon film. However, it is considered that this protective film has a relatively low barrier effect against a hydrogen molecule of a small molecular size or a hydrogen atom of a small atomic size.

More specifically, a silicon oxide film, a silicon oxynitride film, a silicon nitride film, an aluminum oxide film, a titanium oxide film, a tantalum oxide film, a magnesium fluoride film, or a polymer film (containing carbon and hydrogen as major components) is preferable as the protective layer. Each of these films is superior in its high barrier effect against oxygen and water as well as high transparency when included in the optical element. It is desirable that there exist no or very few pinholes and cracks in the protective film.

A vapor phase synthesis process such as plasma CVD, sputtering, vacuum evaporation, or ion beam assisted vacuum evaporation is applicable to formation of the protective film. Moreover, as for some polymers, the protective film can be formed by spin coat.

More specifically, the protective silicon oxide film, the protective aluminum oxide film, and the like can be synthesized by any of plasma CVD, sputtering, vacuum evaporation, ion beam assisted vacuum evaporation, and the like. The protective silicon oxynitride film, the protective silicon nitride film, and the like can mainly be synthesized by the plasma CVD method and the like. The protective titanium oxide film, the protective tantalum oxide film, the protective magnesium fluoride film, and the like can mainly be synthesized by sputtering, vacuum evaporation, ion beam assisted vacuum evaporation, and the like.

When the protective film is formed before the optical property modification of the Si—O containing hydrogenated carbon film, it can provide the protective effect both at the time of the property modification and under use as an optical element. However, it is also possible not to use the protective film at the time of the property modification but to form the protective film after the property modification in order to improve only the durability under use as an optical element. In the case that the protective film is formed before the property modification, some restrictions arise in the material and thickness of the protective film in order not to hinder the property modification. In the case that the protective film is formed after the property modification, on the other hand, such restrictions do not arise. Note that detailed explanation will later be given on a thickness of the protective film in the case of forming the protective film before the property modification of the Si—O containing hydrogenated carbon film.

In the case of forming the protective film before the property modification, it is generally preferable to form the protective film continuously without taking the underlying Si—O containing hydrogenated carbon film out to the air. This is because defects such as pinholes are liable to be formed in the protective film if the underlying Si—O containing hydrogenated carbon film is taken out to the air. However, this does not apply to the case that a coating of a polymer or the like is formed with spin coat or the like.

(Transparent Material Plate)

The transparent material plate joined on the Si—O containing hydrogenated carbon film can be anything with no particular restriction, as long as it can block oxygen and water and allow light to transmit therethrough. Generally, a glass-based material is preferable for the transparent material plate. This is because the glass-based material is relatively inexpensive and is excellent in blocking effect against oxygen and water. Moreover, a resin sheet coated with an inorganic transparent material can also be used as the transparent material plate.

The transparent material plate preferably has a thickness of at least 10 μm. This is because the transparent material plate of such a thickness has a high blocking effect against oxygen and water and is easy to handle.

The transparent material plate is affixed directly onto the Si—O containing hydrogenated carbon film, or onto the protective film on the Si—O containing hydrogenated carbon film, with an adhesive such as of a thermoset type, an ultraviolet cure type, a visible light cure type, or the like. It is preferable that this adhesive used for the joining also has a low permeability to oxygen and water, and it is also preferable that the thickness of the adhesive layer can be made small.

The transparent material plate, as well as the protective film, can provide the effect both at the time of the property modification and under use as an optical element if being joined before the property modification of the Si—O containing hydrogenated carbon film. However, it is generally preferred to join the transparent material plate after the property modification only to improve durability under use as an optical element, because the transparent material plate may not allow the energy beam to pass therethrough at the time of the property modification or the transparent material plate itself may be degraded with the energy beam. Note that the protective effect can further be enhanced with use of such a transparent material plate together with the protective film.

In the case that the Si—O containing hydrogenated carbon film is irradiated with electromagnetic waves as the energy beam to modify the properties of the film, the thickness of the protective film is preferably larger than 0.02 μm and smaller than 10 μm. This is because the barrier effect against oxygen and water is not sufficient if the thickness is at most 0.02 μm, and cracks tend to occur in the protective layer if the thickness is at least 10 μm. The minimum thickness is more preferably larger than 0.05 μm, and still more preferably larger than 0.1 μm. The maximum thickness is more preferably less than 5 μm, and still more preferably less than 3 μm.

In contrast, in the case that the Si—O containing hydrogenated carbon film is irradiated with a corpuscular beam as the energy beam to modify the properties of the film, it is possible to apply any of an electron beam, an ion beam, and a neutron beam. However, since the electron beam tends to be scattered and spread in a solid, it is not easy to perform the optical property modification in a narrow and deep pattern by the electron beam. The neutron beam is not easy to handle because its energy level and density are not highly controllable. The ion beam is excellent in controllability in its energy level and density, and it is suitable to use ions of a relatively lightweight element such as hydrogen or helium for the property modification in a narrow and deep pattern.

In the property modification by the corpuscular beam, the thickness of the protective film is preferably larger than 0.02 μm and smaller than 1 μm. This is because the barrier effect against oxygen and water is not sufficient if the thickness is at most 0.02 μm, and the corpuscular beam is less likely to reach the Si—O containing hydrogenated carbon film if the thickness is at least 1 μm. The minimum thickness is more preferably larger than 0.05 μm, and still more preferably larger than 0.1 μm. The maximum thickness is more preferably less than 0.5 μm, and still more preferably less than 0.2 μm.

Moreover, the thickness of the protective film should also have a certain preferable range in relation to its extinction coefficient with respect to the wavelength band in which the optical element is used. This is because the optical transmittance of the film depends on the thickness and extinction coefficient of the film. The extinction coefficient of the protective film is preferably less than $5 \times 10^{-3}$, more preferably less than $1 \times 10^{-3}$, and still more preferably less than $5 \times 10^{-4}$. Generally, in relation to the internal transmittance of the protective film, the film thickness is preferably such that the internal transmittance larger than 80% can be obtained, more preferably such that the internal transmittance larger than 95% can be obtained, and still more preferably such that the internal transmittance larger than 99% can be obtained.

On the other hand, in the case of using irradiation with light (electromagnetic wave) in the visible to ultraviolet range for the optical property modification of the Si—O containing hydrogenated carbon film, in relation to the transmittance of the protective film with respect to the wavelength, the film thickness is preferably such that the transmittance larger than 40% can be obtained, more preferably such that the transmittance larger than 60% can be obtained, and still more preferably such that the transmittance larger than 80% can be obtained.

(Property Modification Temperature)

The substrate temperature at the time of irradiating the Si—O containing hydrogenated carbon film with the energy beam for the property modification can be an arbitrary temperature. For example, the property modification at the substrate temperature in a room temperature state requires no temperature control device and is preferable from the viewpoint of simplification of the process and cost reduction.

Practically, however, it seems that the substrate temperature in the vicinity of the property-modified portion tends to become higher than the room temperature, because of the energy beam irradiation. Since the substrate temperature at the time of the energy beam irradiation influences the physical properties of the Si—O containing hydrogenated carbon film, it is preferable to positively adjust the substrate temperature to increase the controllability of the property modification.

More specifically, as described above, when the Si—O containing hydrogenated carbon film is held at a higher temperature at the time of the property modification, the modification rate becomes higher. On the other hand, in the case that the protective layer is provided at a surface of the Si—O containing hydrogenated carbon film as in Example 16, the modification rate of the Si—O containing hydrogenated carbon film tends to become lower. Therefore, when such a protective layer is provided, it is effective to use a method in which the modification rate is increased by raising the substrate temperature. Specifically, the substrate temperature is preferably higher than 80° C. and lower than 400° C., more preferably higher than 100° C. and lower than 250° C., and still more preferably higher than 120° C. and lower than 220° C.

Note that, although the high substrate temperature is preferable from the viewpoint of the increased modification rate, an excessively high substrate temperature causes adverse effects from the viewpoint of coloring of the Si—O containing hydrogenated carbon film, the controllability of the property modification, or the like. Incidentally, other than heating by a usual heater, heating by infrared radiation including light of a wavelength of at least 3 μm is also effective in heating the substrate.

In Example 16, more specifically, an Si—O containing hydrogenated carbon film having a thickness of 1.5 μm was formed on a quartz substrate under the same conditions as those of Example 2 to prepare Sample 1A.

An $SiO_2$ protective film having a thickness of 0.1 μm was formed by a magnetron sputtering method on Sample 1A to prepare Sample 1B.

Further, a glass plate having a thickness of 0.05 mm was joined on Sample 1B with a visible light cure-type adhesive to prepare Sample 1C.

Samples 1A-1C were irradiated for 500 hours with lights having wavelengths of at most 400 nm, which lights were extracted and converged from lights of a 100 W xenon lamp. Thereafter, Samples 1A-1C were examined for their amounts of transmittance change for blue light of 460 nm wavelength. As a result, Sample 1A had a change of increase by 7%, Samples 1B and 1C had changes of increase by approximately 2% and approximately 0.5%, respectively. This means that Sample 1B having the $SiO_2$ protective film attached thereto, and Sample 1C having the thin glass plate further joined thereon had less change in transmittance.

EXAMPLE 17

In Example 17, an Si—O containing hydrogenated carbon film having a film thickness of 2 μm was formed on a quartz substrate under the same conditions as those of Example 2 to prepare Sample 2A.

The refractive-index-modulated structure was formed with a pattern in Sample 2A, by interference exposure in the air with an excimer laser (XeCl) using a quartz mask that includes concavities and convexities with 1 μm periodicity.

Subsequently, an $SiO_2$ protective film having a thickness of 0.1 μm was formed on Sample 2A by the magnetron sputtering method to prepare Sample 2B.

Further, a quartz plate having a thickness of 0.1 mm was adhered onto Sample 2B with a visible light cure-type adhesive to prepare Sample 2C.

It was confirmed that although Sample 2A obtained as such served as a diffraction grating, its diffraction efficiency dropped by 5% after a year of its use. In contrast, it was confirmed that Samples 2B and 2C served as a diffraction grating, and the diffraction efficiency of Sample 2B dropped by 2% after a year of its use, and the diffraction efficiency of Sample 2C did not change after a year of its use.

EXAMPLE 18

Example 18 in the present invention relates to a flat plate-type microlens. A flat plate-type microlens can be utilized in various optical fields. For example, it can be preferably used as a condenser lens for optical coupling between an LD (laser diode) and an optical fiber in the field of optical communication. Further, a flat plate-type microlens array can preferably be used as a condenser lens array in a projector.

Conventionally, a refraction-type microlens has mainly been used as a microlens. In recent years, however, a diffraction-type microlens has received attention from the viewpoint of reduction in size, weight, cost, and others of an optical system. The diffraction-type microlens utilizes a light diffraction phenomenon to cause a lens function. The diffraction-type microlens can roughly be classified into a relief-type (or film thickness modulated-type) microlens and a refractive index modulated-type microlens. The relief-type microlens typically has a structure in which a plurality of fine, concentric, ring-like grooves are formed on a surface of a transparent substrate, and depths of these grooves (i.e. thicknesses of the substrate) are periodically modified. In contrast, the refractive index modulated-type microlens typically has a structure in which a flat plate-like substrate is divided into a plurality of fine, concentric, band-like ring regions, and refractive indices of these regions are periodically modified.

The periodic modification in thickness or in refractive index of the transparent substrate causes periodic modification in phase of light passing through the substrate, and then causes a light diffraction effect similarly as in a diffraction grating. As the grating pitch of the diffraction grating is decreased, the diffraction angle of light passing through the diffraction grating is increased. Therefore, by decreasing the pitch of the concentric diffraction grating according to increase in distance from the center to the periphery of concentric circles, it is possible to converge light passing through the diffraction grating, similarly as in the case of a convex lens. In contrast, by increasing the pitch of the concentric diffraction grating according to increase in distance from the center to the periphery of concentric circles, it is possible to diffuse light passing through the diffraction grating, similarly as in the case of a concave lens.

Figure 10:
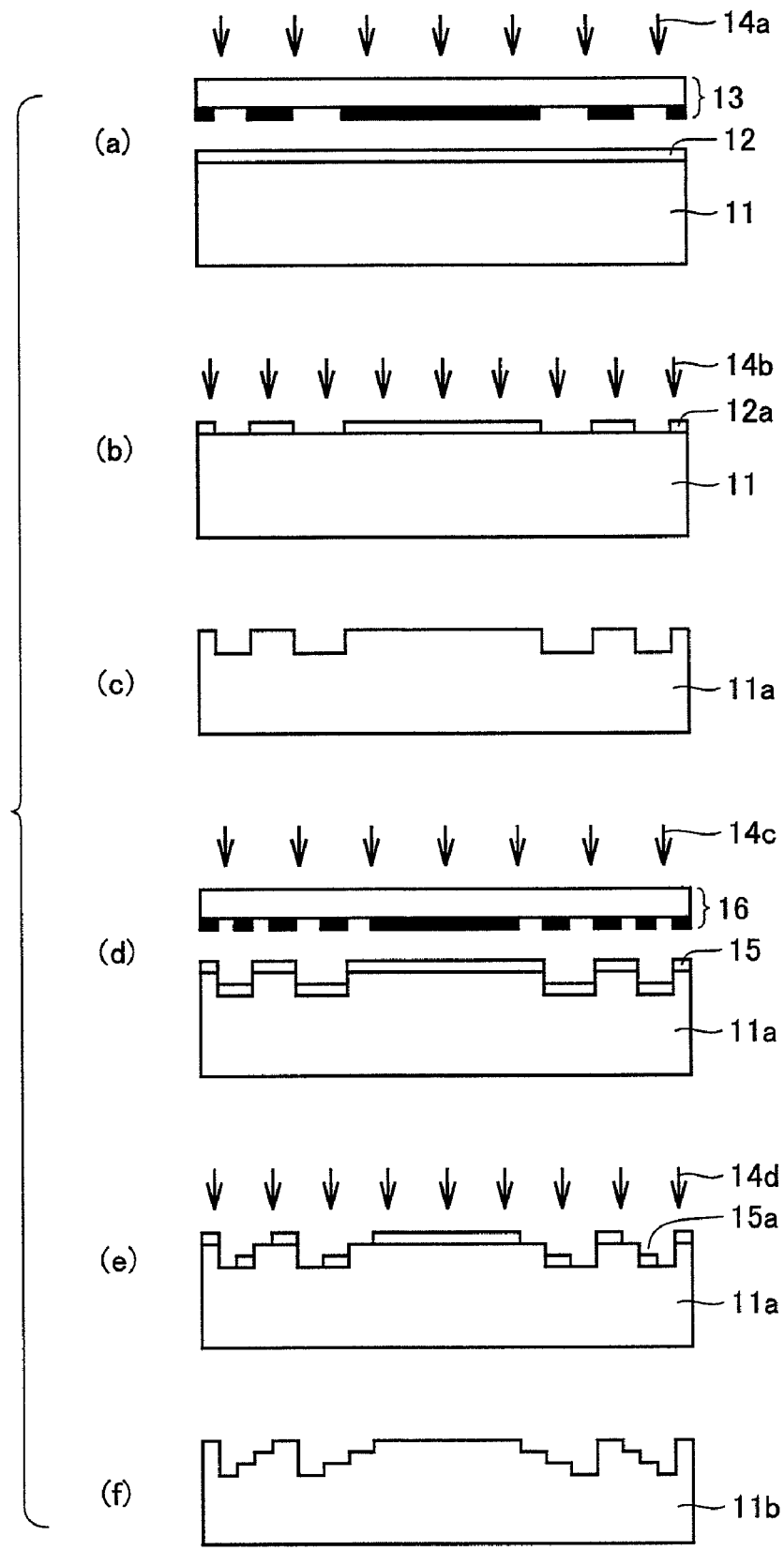
FIG. 10 shows schematic cross-sectional views that illustrate a method for fabricating a diffraction-type microlens of a conventional relief-type.
Figure 11:
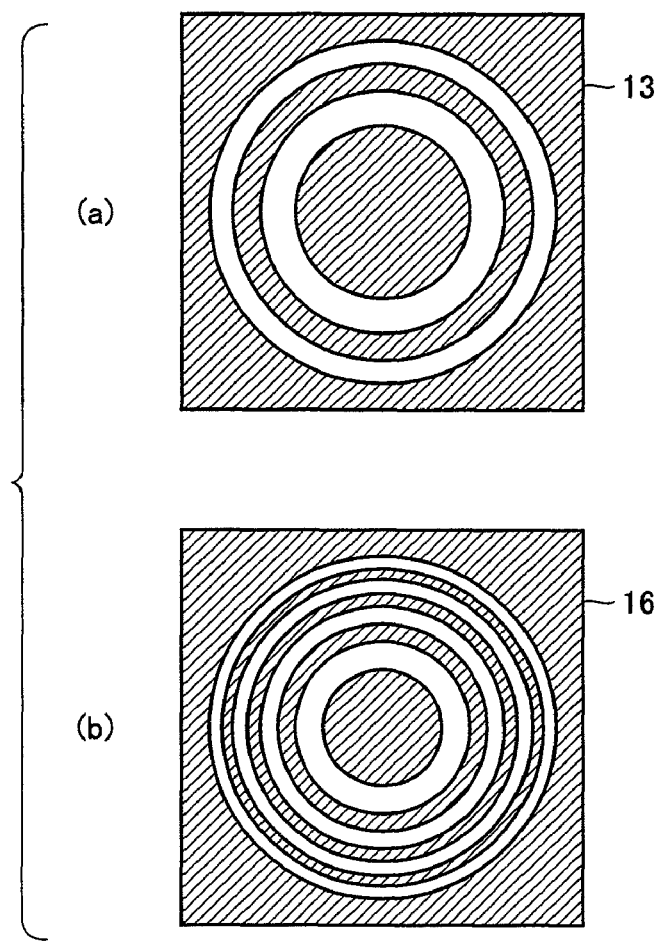
FIG. 11 shows schematic plan views that show masks used in the method for fabricating the relief-type microlens shown in FIG. 10.

FIG. 10 illustrates an example of a method for fabricating a conventional relief-type microlens in schematic cross-sectional views (Non-Patent Document 1 of "Technique of Ultra-precision Machining and Mass Production of Microlens (Array)" published by TECHNICAL INFORMATION INSTITUTE CO., LTD., Apr. 28, 2003, pp. 20-21 and pp. 71-81). FIG. 11 shows, in schematic plan views, exposure masks for use in the method for fabricating a relief-type microlens shown FIG. 10.

In FIG. 10 (a), a positive-type photoresist layer 12 is formed on an Si substrate 11, and irradiated with ultraviolet light 14a through a first photomask 13. First photomask 13 has concentric, band-like, ring patterns as shown in FIG. 11 (a), and the pitch between the rings is decreased according to an increase in distance from the center to the periphery of the concentric circles. Although only two transparent rings are shown in FIG. 11 (a) for clarity and simplicity of the drawing, it goes without saying that more rings may actually be included.

In FIG. 10 (b), exposed resist layer 12 is developed to form a first resist pattern 12a. Band-like groove rings each having a prescribed depth are formed through reactive ion etching (RIE) represented by arrows 14b with use of first resist pattern 12a as a mask.

In FIG. 10 (c), first resist pattern 12a is removed to obtain a relief-type microlens 11a with a binary level (the phase of light is modulated in two levels). The width and the depth of each of the band-like groove rings are set such that the most preferable diffraction efficiency is obtained in the two-level or multi-level, relief-type microlens.

FIGS. 10 (d)-(f) illustrate a process of fabricating a four-level, relief-type microlens, after a process similar to that of FIGS. 10 (a)-(c).

In FIG. 10 (d), a second resist layer 15 is further formed on an upper surface of Si substrate 11a that has been formed through a process similar to that up to FIG. 10 (c), and irradiated with ultraviolet light 14c through a second mask 16. FIG. 11 (b) shows second mask 16 in a schematic plan view. As seen from FIGS. 11 (a) and (b), second mask 16 has twice as many band-like transparent rings as first mask 13 has. In other words, the band-like transparent ring and the band-like non-transparent ring in the second mask have widths approximately one-half of those of the band-like transparent ring and the band-like non-transparent ring in the first mask, respectively.

In FIG. 10 (e), exposed second resist layer 15 is developed to form a second resist pattern 15a as shown in the drawing. Etching is further carried out to a prescribed depth through RIE represented by arrows 14d with use of second resist pattern 15a as a mask.

In FIG. 10 (f), second resist pattern 15a is removed to obtain a relief-type microlens 11b that can cause four-level phase variations. A higher diffraction efficiency and a higher light convergence efficiency are obtained in a multi-level diffraction-type lens than in a two-level diffraction-type lens. The N times repetitions of the above-described process of photolithography and RIE make it possible to fabricate a $2^N$-level, relief-type microlens. Theoretically, a diffraction efficiency of 100% can be obtained with a diffractive lens having an infinite number of levels. However, such a lens requires an increased number of fabrication processes and increase in cost, and thus an eight-level, diffraction-type lens that can cause a diffraction efficiency of 95% is sufficient in practice (this can be fabricated by repeating the above-described process N=3 times).

In the case of a relief-type microlens, grooves must be carved by etching in a transparent substrate and thus the substrate should have a large thickness enough to allow the groove carving. Furthermore, it is not easy to precisely adjust the depth of the grooves to be carved by etching. Additionally, the relief-type microlens has fine concavities and convexities on its surface, and thus there is also a problem that dusts and contaminants tend to attach to the lens.

In view of the problems in such a relief-type microlens, Patent Document 5 of Japanese Patent Laying-Open No. 2005-202356 proposes to utilize a DLC film in which its refractive index can be increased through irradiation with an energy beam such as an ultraviolet ray or an ion beam to thereby provide a flat plate-type microlens mechanically and thermally stable and applicable to various optical fields, in an easier manner and at a lower cost.

Although it is possible to increase the refractive index of the DLC film through irradiation with an ultraviolet ray and the like, the increase in refractive index tends to cause increase in extinction coefficient as described above, making it difficult to uniformly increase a refractive index in the thickness direction of the DLC film. Further, in the fabricated refraction-type optical element and refractive index modulated-type diffractive optical element, a high extinction coefficient in a high-refractive-index region means that light is less likely to transmit through the relevant region, and is not preferable from the viewpoint of the light utilization efficiency as well as the diffraction efficiency.

Therefore, Example 18 provides a flat plate-type microlens fabricated with use of an Si—O containing hydrogenated carbon film having superior properties as compared with the DLC film.

Figure 5:
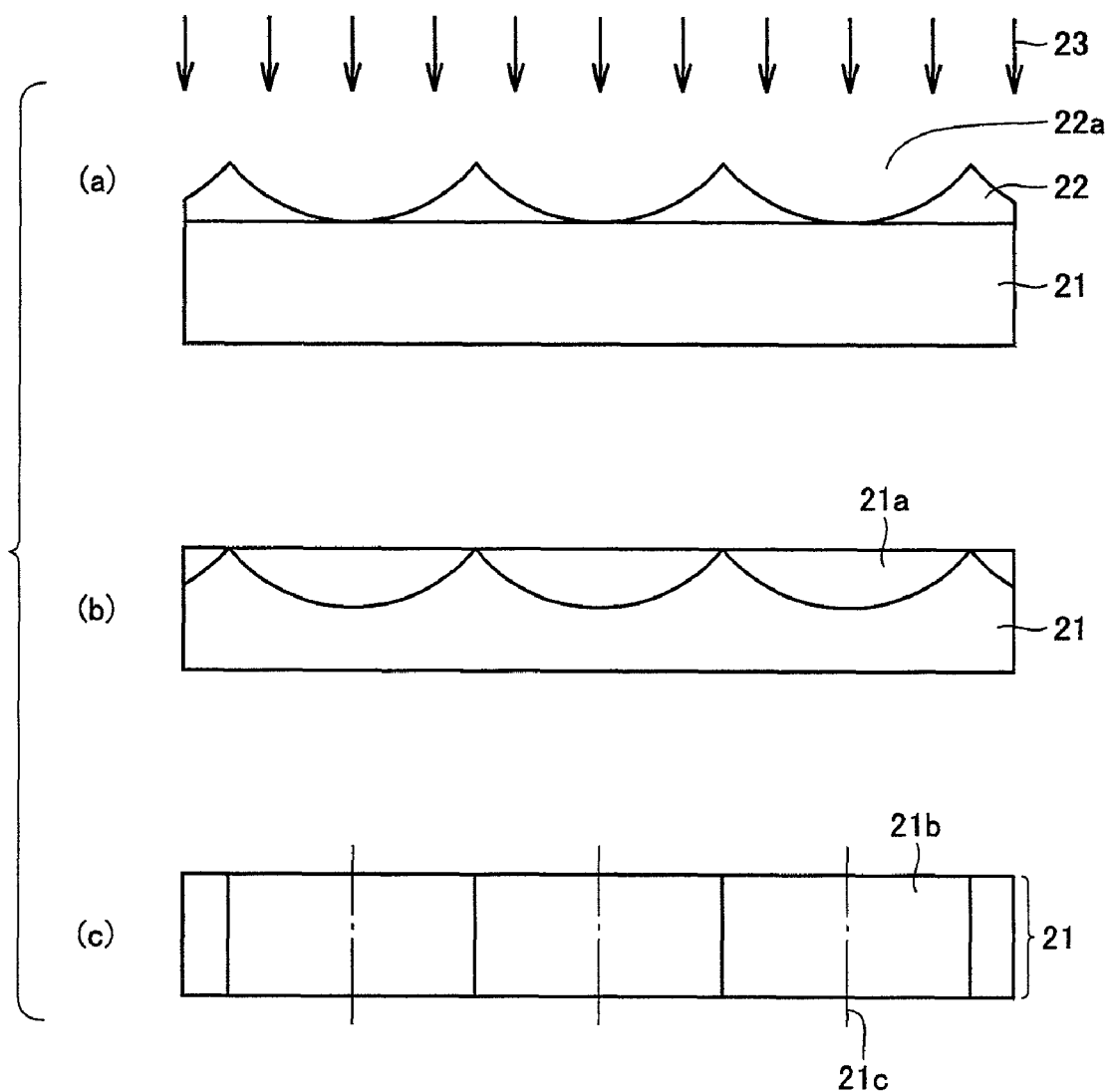
FIG. 5 shows schematic cross-sectional views that illustrate a method for fabricating a refraction-type microlens array according to the present invention.

FIG. 5 illustrates in schematic cross-sectional views a method for fabricating a refraction-type microlens array in Example 18.

In FIG. 5 (a), a mask layer 22 is formed on an Si—O containing hydrogenated carbon film 21. For mask layer 22, it is possible to use various types of materials having a function of limiting transmission of an energy beam 23. For example, the material for the mask layer can be selected from gold, chromium, nickel, aluminum, tungsten and the like, such that it can be optimized depending on a designed transmission amount of the energy beam relative to the mask layer. Mask layer 22 has minute concave portions 22a arranged in an array. Each of concave portions 22a has a bottom surface made of a part of an approximately spherical surface or a part of an approximately cylindrical surface (the central axis of the cylindrical surface is orthogonal to the paper plane of the drawing). Through mask layer 22 including the array of concave portions 22a, energy beam 23 is applied to Si—O containing hydrogenated carbon film 21.

In FIG. 5 (b), mask layer 22 is removed after the irradiation with energy beam 23 to obtain a microlens array 21a formed in Si—O containing hydrogenated carbon film 21. Specifically, an array of low-refractive-index regions 21a is formed in Si—O containing hydrogenated carbon film 21 by the irradiation with energy beam 23, corresponding to the array of concave portions 22a in mask layer 22. At this time, each of concave portions 22a in mask layer 22 has a bottom surface made of a spherical or cylindrical surface, and thus the thickness of the mask layer increases from the center toward the periphery of each of concave portions 22a. In other words, energy beam 23 is more likely to transmit through the central part than the peripheral part of each of concave portions 22a. Therefore, low-refractive-index region 21a has a shape of a spherical or cylindrical convex lens where the depth in its central part is large while the depth in its peripheral part is small. Accordingly, each of low-refractive-index regions 21a can serve as a single microlens as it is. However, microlens 21a having a convex shape has a low refractive index, and thus serves as a light-diffusing lens.

When a microlens array is fabricated by energy beam 23 as shown in FIG. 5 (a), it is possible to adjust the thickness and thus the focal length of microlenses 21a by adjusting the depth of concave portions 22a made of an approximately spherical or cylindrical surface. Even when the depth of concave portions 22a is not modified, it is also possible to adjust the focal length of microlenses 21a by modifying transmission power of energy beam 23 to be applied. For example, when an He ion beam is used as energy beam 23, it is possible to decrease the focal length of microlenses 21a by increasing acceleration energy of the ions, i.e., increasing transmission power of the ions. Furthermore, a higher dose rate of energy beam 23 into the Si—O containing hydrogenated carbon film causes larger amount Δn of refractive index change, and thus it is also possible to adjust the focal length of microlenses 21a by adjusting the dose rate.

FIG. 5 (c) shows another form of a microlens array in a schematic cross-sectional view. A microlens 21b has a cylindrical or band-like region penetrating Si—O containing hydrogenated carbon film 21. When microlens 21b is cylindrical, a central axis 21c thereof is parallel to a thickness direction of Si—O containing hydrogenated carbon film 21, and the refractive index is set to be lower as closer to central axis 21c. When microlens 21b is band-like, a central plane 21c extending through the center of its width direction (orthogonal to the paper plane of the drawing) is parallel to the thickness direction of Si—O containing hydrogenated carbon film 21, and the refractive index is set to be lower as closer to central plane 21c.

The microlens array in FIG. 5 (c) can also be formed by a method similar to that in FIG. 5 (a). In other words, by applying high-energy beam 23 that can penetrate a thin region of mask layer 22 and Si—O containing hydrogenated carbon film 21, the energy beam is applied at a higher dose rate in a region closer to the center line or central plane 21c so that the refractive index is much more decreased.

With various methods, it is possible to fabricate mask layer 22 including concave portions 22a each having a bottom surface made of an approximately spherical or cylindrical surface as shown in FIG. 5 (a). For example, mask layer 22 having a uniform thickness is formed on Si—O containing hydrogenated carbon film 21 to form thereon a resist layer having minute holes arranged in an array or linear openings arranged in parallel with each other. By performing isotropic etching through the minute holes or linear openings in the resist layer, it is possible to form approximately hemispherical or approximately half-cylindrical concave portions 22a in mask layer 22 under the minute holes.

Figure 6:
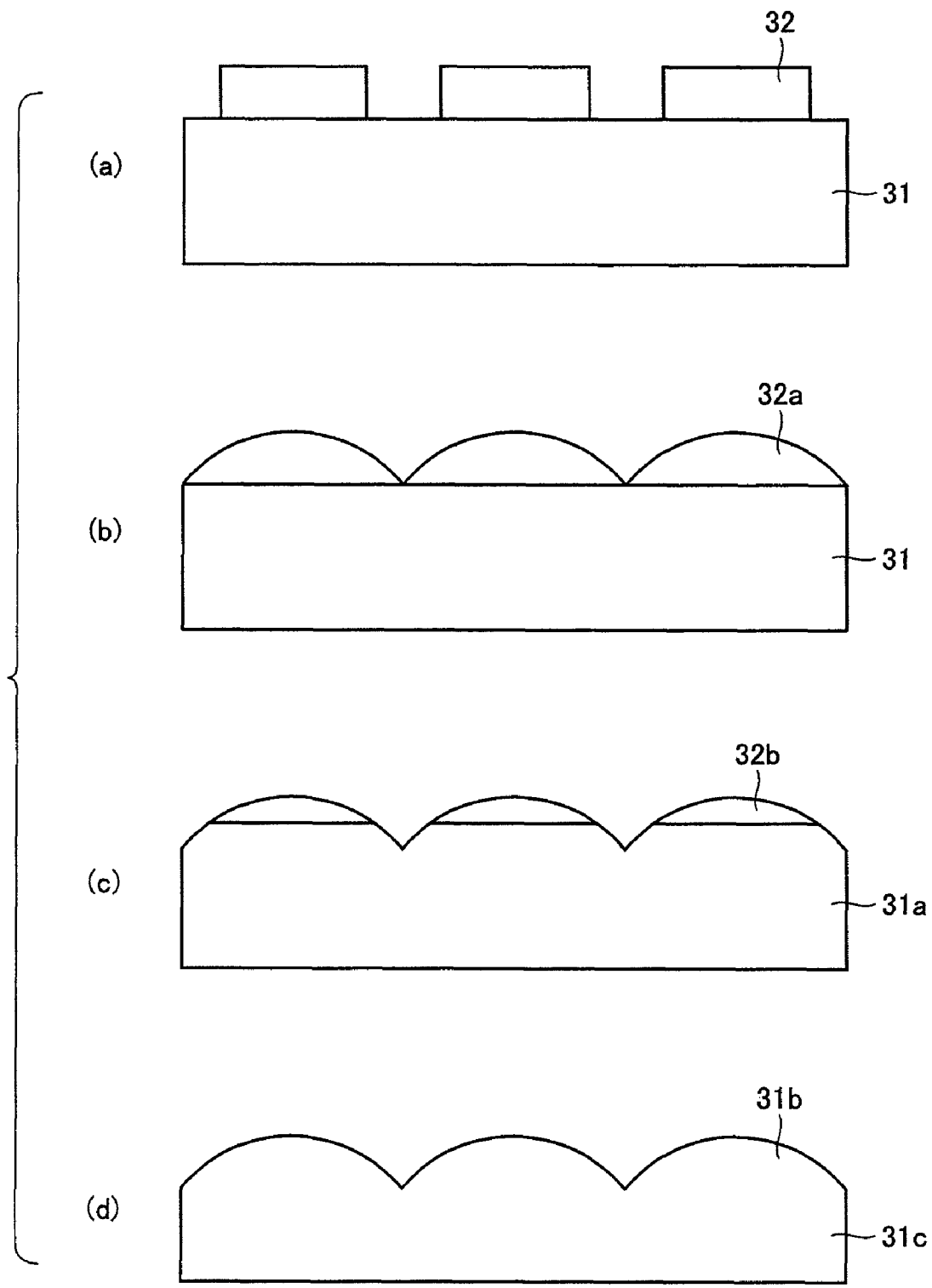
FIG. 6 shows schematic cross-sectional views that illustrate a method for forming a stamping die that can be used in the method for fabricating the refraction-type microlens array shown in FIG. 5.

Mask layer 22 including concave portions 22a each having a bottom surface made of an approximately spherical or cylindrical surface as shown in FIG. 5 (a) can also be fabricated easily with use of a stamping die that can be fabricated by a method as illustrated in schematic cross-sectional views of FIG. 6.

In FIG. 6 (a), a resist pattern 32 is formed on, for example, a silica substrate 31. Resist pattern 32 is formed on a plurality of minute circular regions arranged in an array on substrate 31, or a plurality of thin band-like regions arranged in parallel with each other on substrate 31.

In FIG. 6 (b), resist pattern 32 is heated and melted. Resist 32 melted on each of the minute circular or thin band-like regions turns into a convex lens shape 32a made of an approximately spherical or cylindrical surface, owing to its surface tension.

In FIG. 6 (c), when silica substrate 31a as well as resist 32b having an approximately convex lens shape is subjected to RIE, silica substrate 31a is etched while the diameter or width of resist 32b is decreased by the RIE.

As a result, as shown in FIG. 6 (d), there is eventually obtained a silica stamping die 31c where convex portions 31b each made of an approximately spherical or cylindrical surface are arranged thereon. It is possible to adjust the height of convex portions 31b by adjusting the ratio between the etching rate of resist 32b and the etching rate of silica substrate 31a in FIG. 6 (c).

Stamping die 31c obtained as such can preferably be used in fabrication of mask layer 22 including concave portions 22a as shown in FIG. 5 (a). Specifically, if mask layer 22 is formed of gold material, for example, gold is excellent in ductility, and thus gold mask layer 22 is stamped with stamping die 31c so that concave portions 22a can easily be formed. In addition, when stamping die 31c is once fabricated, it can be used repeatedly, which makes it possible to form concave portions 22a in an much easier manner and at a lower cost than in the case that concave portions 22a are formed in mask layer 22 by etching.

Figure 7:
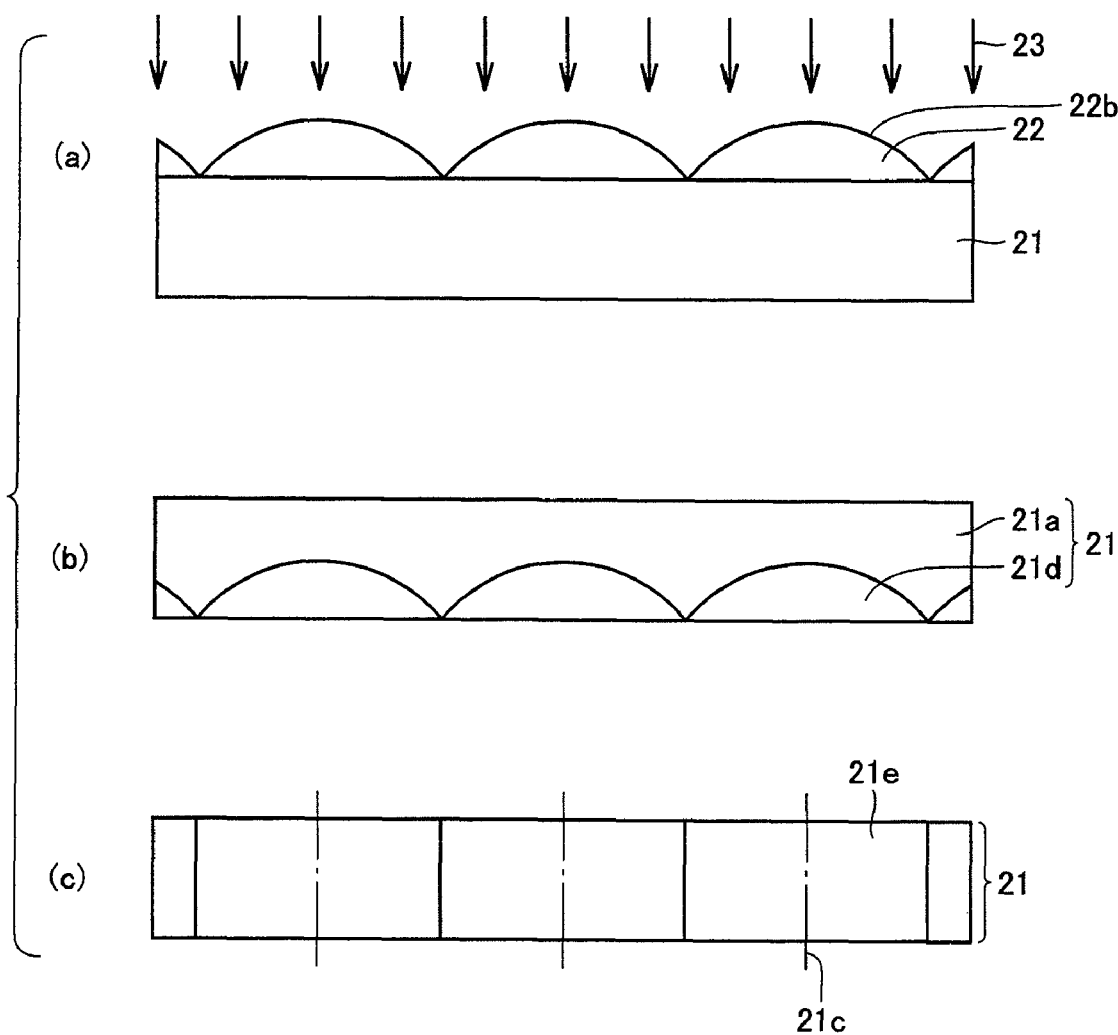
FIG. 7 shows schematic cross-sectional views that illustrate a method for fabricating another refraction-type microlens array according to the present invention.

FIG. 7 illustrates in schematic cross-sectional views a method for fabricating another refraction-type microlens array in Example 18.

In FIG. 7 (a) as well, mask layer 22 is formed on Si—O containing hydrogenated carbon film 21, similarly as in the case of FIG. 5 (a). However, mask layer 22 has convex portions 22b, instead of concave portions 22a in FIG. 5 (a). Each of convex portions 22b has an upper surface made of a part of an approximately spherical surface or a part of an approximately cylindrical surface (the central axis of the cylindrical surface is orthogonal to the paper plane of the drawing). Through mask layer 22 including the array of convex portions 22b, energy beam 23 is applied to Si—O containing hydrogenated carbon film 21.

In FIG. 7 (b), mask layer 22 is removed after the irradiation with energy beam 23 to obtain a microlens array 21b formed in Si—O containing hydrogenated carbon film 21. Specifically, low-refractive-index regions 21a are formed in Si—O containing hydrogenated carbon film 21 by the irradiation with energy beam 23, corresponding to the array of convex portions 22b in mask layer 22. At this time, each of convex portions 22b in mask layer 22 has an upper surface made of a spherical or cylindrical surface, and thus the thickness of the mask layer decreases from the center toward the periphery of each of convex portions 22b. In other words, energy beam 23 is more likely to transmit through the central part than the peripheral part of each of convex portions 22b. Therefore, the depth of low-refractive-index region 21a in the central part is small while the depth in the peripheral part is large. Lens regions 21d maintain the original refractive index of the Si—O containing hydrogenated carbon film 21 when it is formed. In other words, lens regions 21d have a shape of a spherical or cylindrical convex lens, and each of regions 21d having a relatively high refractive index can serve as a single microlens as it is. Note that microlens 21d has a relatively high refractive index, and thus serves as a condenser lens.

FIG. 7 (c) shows in schematic cross-sectional view still another microlens array in Example 18. This microlens 21e has a cylindrical or band-like region penetrating through Si—O containing hydrogenated carbon film 21. When microlens 21e is of a cylindrical shape, its central axis 21c is parallel to the thickness direction of Si—O containing hydrogenated carbon film 21, and the refractive index is made higher at a position closer to the central axis 21c. When microlens 21e is of a band-like shape, its central plane (orthogonal to the paper plane of the drawing) 21c passing through the center in its width direction is parallel to the thickness direction of Si—O containing hydrogenated carbon film 21, with the refractive index being made higher at a position closer to the central plane 21c.

The microlens array in FIG. 7 (c) can also be formed in a manner similar to that in FIG. 7 (a). Specifically, by irradiation with high energy beam 23 capable of penetrating a thin region of mask layer 22 and Si—O containing hydrogenated carbon film 21, a region farther from the central axis or central plane 21c is irradiated with the energy beam at a higher dose rate and its refractive index is further decreased.

Figure 8:
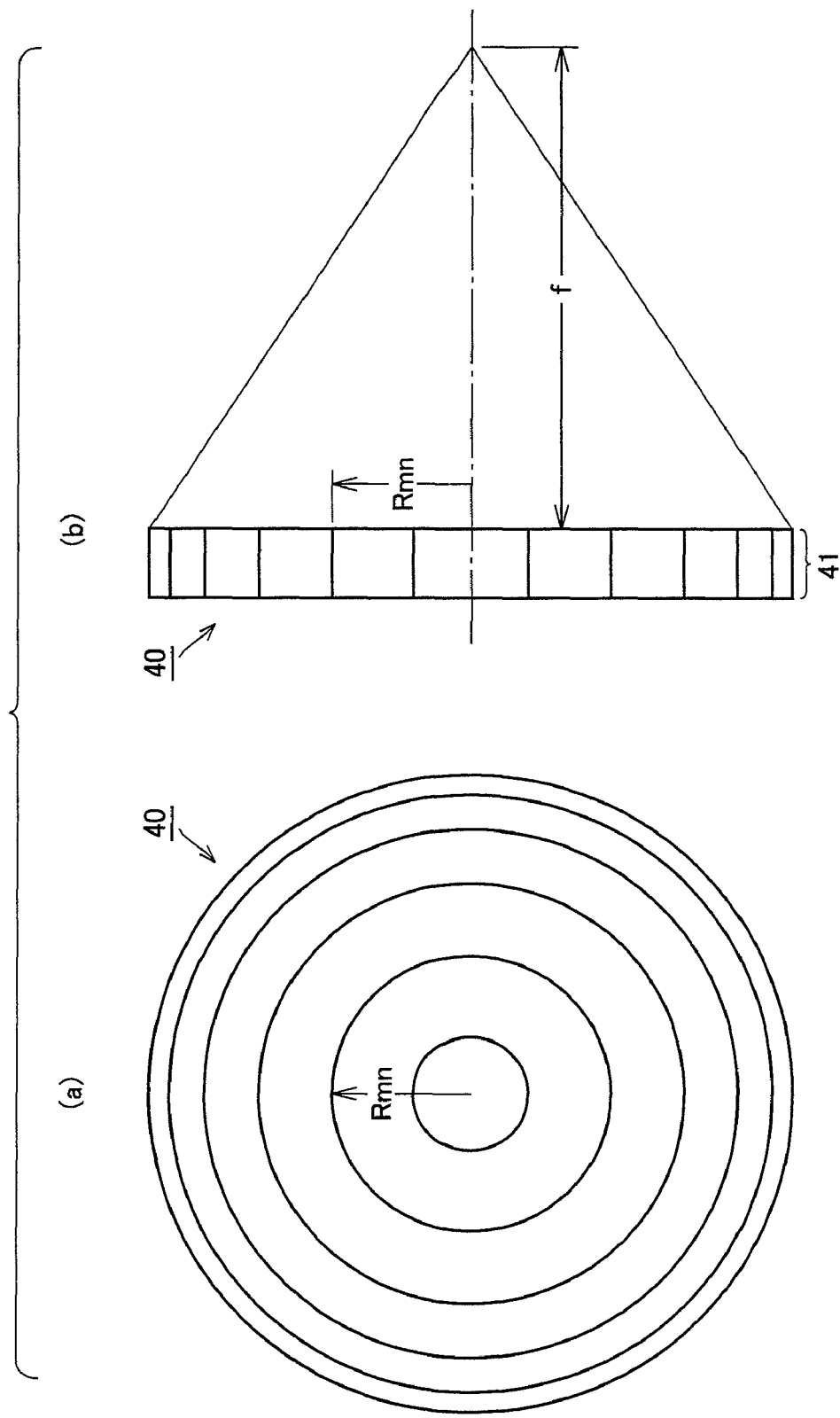
FIG. 8 (a) is a schematic plan view that illustrates a diffraction-type microlens according to the present invention, and FIG. 8 (b) is a cross-sectional view corresponding to FIG. 8 (a).

A schematic plan view in FIG. 8 (a) and a schematic cross-sectional view in FIG. 8 (b) illustrate a further microlens in Example 18, which is a diffraction-type microlens. The diffraction-type microlens can be fabricated thinner than a refraction-type microlens. It is possible to fabricate a diffraction-type microlens in an Si—O containing hydrogenated carbon film having a thickness of approximately 1-2 μm. In other words, this diffraction-type microlens 40 is also fabricated with use of an Si—O containing hydrogenated carbon film 41, and includes a plurality of concentric band-like ring regions Rmn. Here, the reference character Rmn represents the n-th band-like ring region in the m-th ring zone, and also represents the radius from the center of the concentric circles to the outer periphery of the relevant band-like ring region. One of band-like ring regions Rmn, which is farther from the center of the concentric circles, has a narrower width as compared to another nearer to the center. In other words, the diffraction-type microlens of FIG. 8 serves as a convergent lens. However, it will be understood that if one of band-like ring regions Rmn, which is farther from the center of the concentric circles, has a larger width as compared to another near to the center, the diffraction-type microlens can serve as a divergent lens.

Band-like ring regions Rmn adjacent to each other have refractive indices different from each other. If the diffraction-type microlens in FIG. 8 is a two-level diffraction-type lens, it includes first to m=3rd ring zones each including first and n=2nd band-like ring regions. In the same ring zone, the band-like ring region on the inner side has a higher refractive index as compared to the other on the outer side has.

As expected from the above, a four-level diffraction-type lens includes first to n=4th band-like ring regions in one ring zone, and in this case as well, a band-like ring region closer to the center of the concentric circles has a higher refractive index in the same ring zone. That is, the refractive index change in four levels from the inner side to the outer side is formed within a single ring zone. The period of such four-level refractive index change for each ring zone is repeated m times in total.

The radius of outer periphery of band-like ring region Rmn can be set according to the following expression (1) from a diffraction theory including scalar approximation. In the expression (1), L represents a diffraction level of a lens, λ represents a wavelength of light, and f represents a focal length of the lens. The maximum amount Δn of refractive index change should be the one that can cause the maximum amplitude of phase modulation $\Delta\phi = 2\pi(L-1)/L$.

[Expression 1]

$$Rmn = \sqrt{\frac{2mnf\lambda}{L} + \left(\frac{mn\lambda}{L}\right)^2} \quad (1)$$

Figure 9:
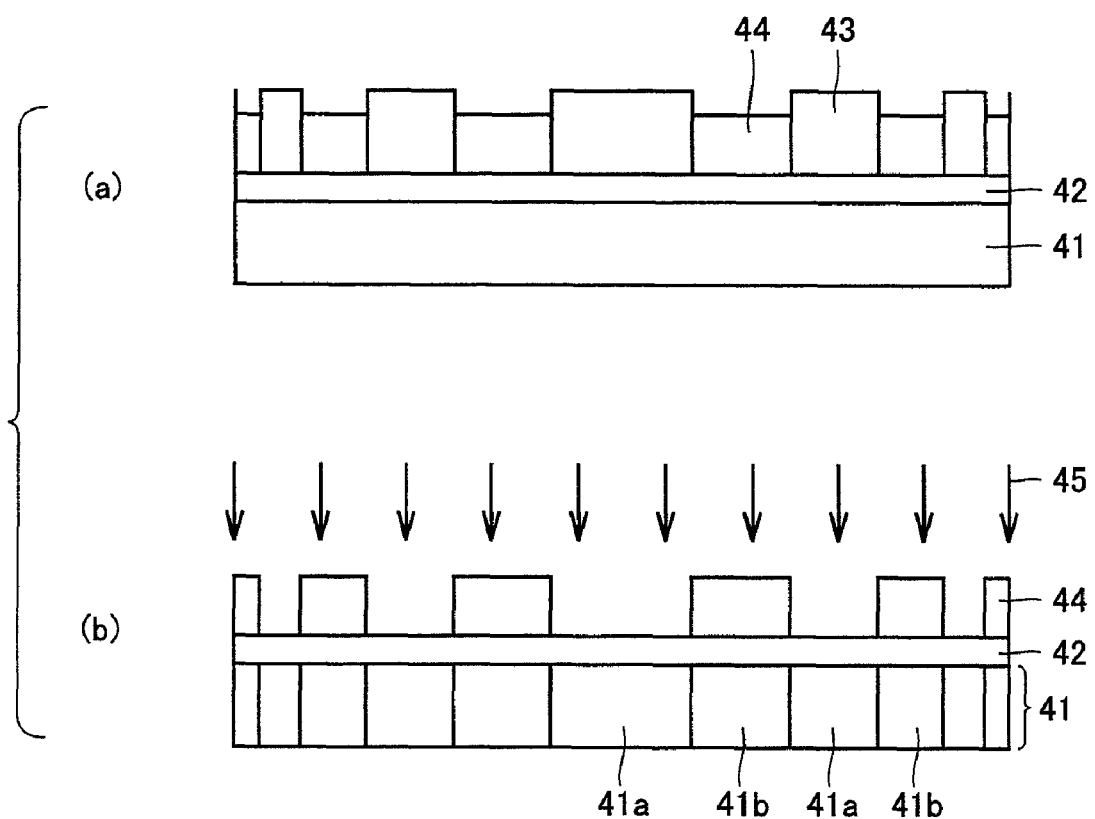
FIG. 9 shows schematic cross-sectional views that illustrate an examplary method for fabricating the diffraction-type microlens shown in FIG. 8.

FIG. 9 illustrates in schematic cross-sectional views an example of a method for fabricating such a two-level diffraction-type microlens as shown in FIG. 8.

In FIG. 9 (a), a conductive layer 42 of Ni, for example, is formed on an Si—O containing hydrogenated carbon film 41 by a well-known EB (electron beam) evaporation method. On this Ni conductive layer 42, a resist pattern 43 is formed to cover band-like ring regions Rmn (m=1 to 3) corresponding to n=1 in FIG. 4. A gold mask 44 is formed in each of the openings of resist pattern 43 by electroplating.

In FIG. 9 (b), resist pattern 43 is removed to leave gold mask 44. Si—O containing hydrogenated carbon film 41 is irradiated with energy beam 45 through the openings of gold mask 44. As a result, the refractive index of the band-like ring regions Rm1 irradiated with energy beam 45 is decreased, while the band-like ring regions Rm2 masked from energy beam 45 maintain the original refractive index of the Si—O containing hydrogenated carbon film. In other words, it is possible to obtain the two-level diffraction-type microlens as shown in FIG. 8. The gold mask after irradiation with the energy beam is immersed in a cyan-based etchant at a room temperature for about several minutes, whereby the mask is resolved and removed.

Although a mask layer is formed on each Si—O containing hydrogenated carbon film in the example shown in FIG. 9, the Si—O containing hydrogenated carbon film may be irradiated with an energy beam with use of an independent mask having openings and blocking portions that are reversed from those of the mask shown in FIG. 11 (a). Further, it will be understood that a four-level diffraction-type microlens can be formed by further irradiating the Si—O containing hydrogenated carbon film with an energy beam with use of an independent mask having the openings and blocking portions that are reversed from those of the mask shown in FIG. 11(b). In this case, it will also be understood that the way of forming the diffraction-type microlens by irradiating the Si—O containing hydrogenated carbon film with an energy beam is very simple as compared to the method for fabricating the relief-type microlens illustrated in FIG. 10.

Further, it is also possible to fabricate a multi-level diffraction-type microlens with energy beam irradiation of one time, by pressing a gold mask layer on an Si—O containing hydrogenated carbon film with a stamping die having such a shape as shown in FIG. 10 (f) instead of such a stamping die as shown in FIG. 6 (d) and then performing the energy beam irradiation through the pressed gold mask layer.

While the diffraction-type microlens corresponding to the spherical convex lens of the refraction-type lens has been described in the above example of the diffraction-type microlens, it will be understood that the present invention is also applicable to a diffraction-type microlens corresponding to the columnar convex lens of the refraction-type lens. In such a case, a plurality of refractive-index-modulated, band-like regions may be formed parallel to each other, instead of the plurality of refractive-index-modulated, concentric, band-like ring regions. In this case, in the cross-sectional view in FIG. 8 (b) for example, the plurality of refractive-index-modulated, band-like regions parallel to each other extend perpendicularly to the paper plane of the drawing. Further in this case, gold mask 44 in FIG. 9 (b) may also extend perpendicularly to the paper plane of the drawing.

Note that it is also possible to form the Si—O containing hydrogenated carbon film not only on a mere substrate but also directly on another part such as a laser diode or a lens. In such a case, the Si—O containing hydrogenated carbon film can be utilized as a refractive index modulated-type element that functions integrally with another part to control a path of laser light, correct aberration of a lens, and the like.

EXAMPLE 19

Example 19 in the present invention relates to an optical information record medium. Currently, a CD (compact disc) and a DVD (digital versatile disc) are known as typical examples of optical information recording media commercially available. In the advanced information society of today, however, further increase in recording density is still demanded in optical information recording media. In optical information recording media, it is possible to increase the recording density by decreasing a wavelength of a light beam used for recording and reproducing. From this viewpoint, a blue-ray disc that performs recording with use of a blue laser has been developed and put into practical use in recent years. However, the wavelength of laser light used for recording can be decreased only in a limited manner, and thus other various recording schemes are tried out so as to increase the recording density of the optical information recording media (see Non-Patent Document 2: OPTRONICS, (2001), No. 11, pp. 149-154).

As is well known, in a replay-only audio CD currently used, information is recorded thereon by forming pit (minute dent) patterns on a plastic substrate with use of a stamper. With one pit, a 1-bit datum representing 1 or 0 is recorded as presence or absence of the pit. Whether the pit information is 1 or 0 is determined based on the difference in reflection intensity of the reading laser light. In other words, when binary recording with 0 or 1 is performed as in the generally used CD, only two types of pit depths exist, including a depth of 0 representing that no pit is formed.

Figure 15:
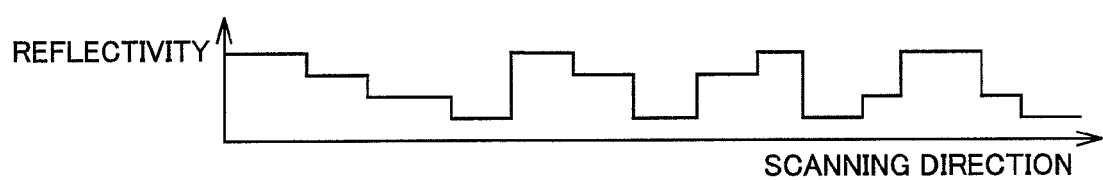
FIG. 15 is a schematic graph that shows differences in reflectivity regarding a plurality of pits having different depths included in a multivalued optical disc.

Therefore, an attempt has been made to commercialize a multivalued optical disc by changing the pit depth in multiple levels. For example, if four types of pit depths are provided including a depth of 0, reflectivity of the reading light beam varies depending on the pit depths, and thus it is possible to obtain four types of reflectivities from the plurality of pits aligned in a scanning direction of the reading light, as shown in the schematic graph in FIG. 15. In other words, one pit can represent any of a value of 0, 1, 2, and 3, which is equivalent to a feature that 2-bit information can be recorded in one pit.

Further, an attempt has been made to commercialize a holographic memory (see Non-Patent Document 3: O plus E, Vol. 25, No. 4, 2003, pp. 385-390). The holographic memory can theoretically record three-dimensional information in a three-dimensional recording medium. When such a holographic memory is utilized, many pages of two-dimensional data can be recorded in a superposing manner. The two-dimensional data can be recorded and reproduced on a page-by-page basis.

Figure 16:
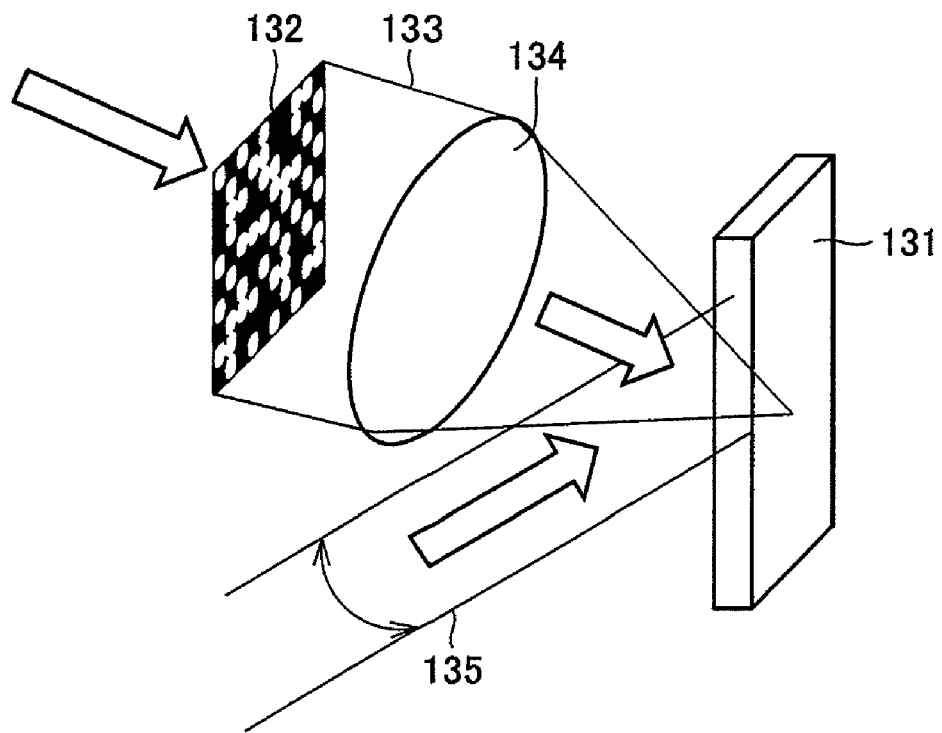
FIG. 16 is a schematic perspective view that illustrates an operation of writing data on a holographic record medium.
Figure 17:
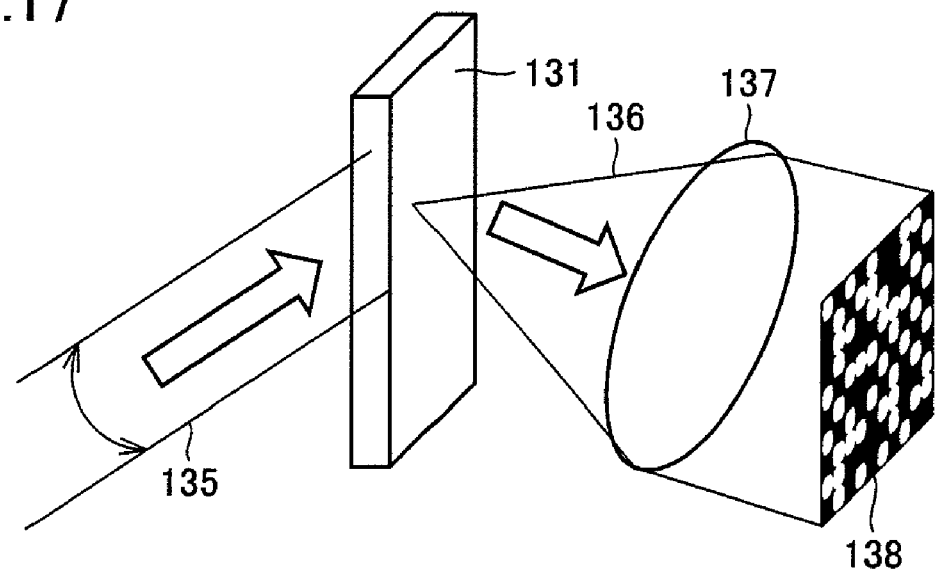
FIG. 17 is a schematic perspective view that illustrates an operation of reading data from the holographic record medium.

The schematic perspective views in FIG. 16 and FIG. 17 illustrate an example of a method for recording information on a holographic record medium and an example of a method for reproducing the recorded information, respectively. As a material for such a holographic record medium, there is utilized iron-doped lithium niobate (Fe: $LiNbO_3$), a photopolymer, or the like, having its refractive index that can be increased by light irradiation.

As shown in FIG. 16, when information is to be recorded, object light 133 including information of two-dimensional digital data 132, for example, is projected onto a holographic record medium 131 through a lens 134. At the same time, reference light 135 having a prescribed angle with respect to object light 133 is projected onto holographic record medium 131. A hologram formed by interference between object light 133 and reference light 135 both projected onto holographic record medium 131 is recorded as refractive index changes in holographic record medium 131. In other words, one page of digital data 132 can be recorded in holographic record medium 131 at a time.

As shown in FIG. 17, when the recorded data is to be reproduced, only reference light 135 used at the recording is applied to holographic record medium 131. Reproducing light 136 caused by diffraction of the hologram in record medium 131 is projected through a projector lens 137 onto a two-dimensional imaging element such as a CCD (charge-coupled device) as a reproduced pattern 138.

In such a holographic record medium 131, it is possible to record different pages of data in a superposed manner by changing an irradiation angle or wavelength of reference light 135. By using reference light as reading light having the same conditions as those of the reference light used for the recording, it is possible to separately reproduce the data recorded on respective pages. In the above-described holographic memory, it is also possible to record and reproduce a two-dimensional image such as a graphic or a photograph as page data.

Further, each of Patent Document 6 of Japanese Patent Laying-Open No. 11-345419 and Non-Patent Document 4 of OPTRONICS, (2001), No. 11, pp. 143-148 disclose a laminated waveguide holographic memory having a structure in which single-mode planar-type waveguides are stacked.

Figure 18:
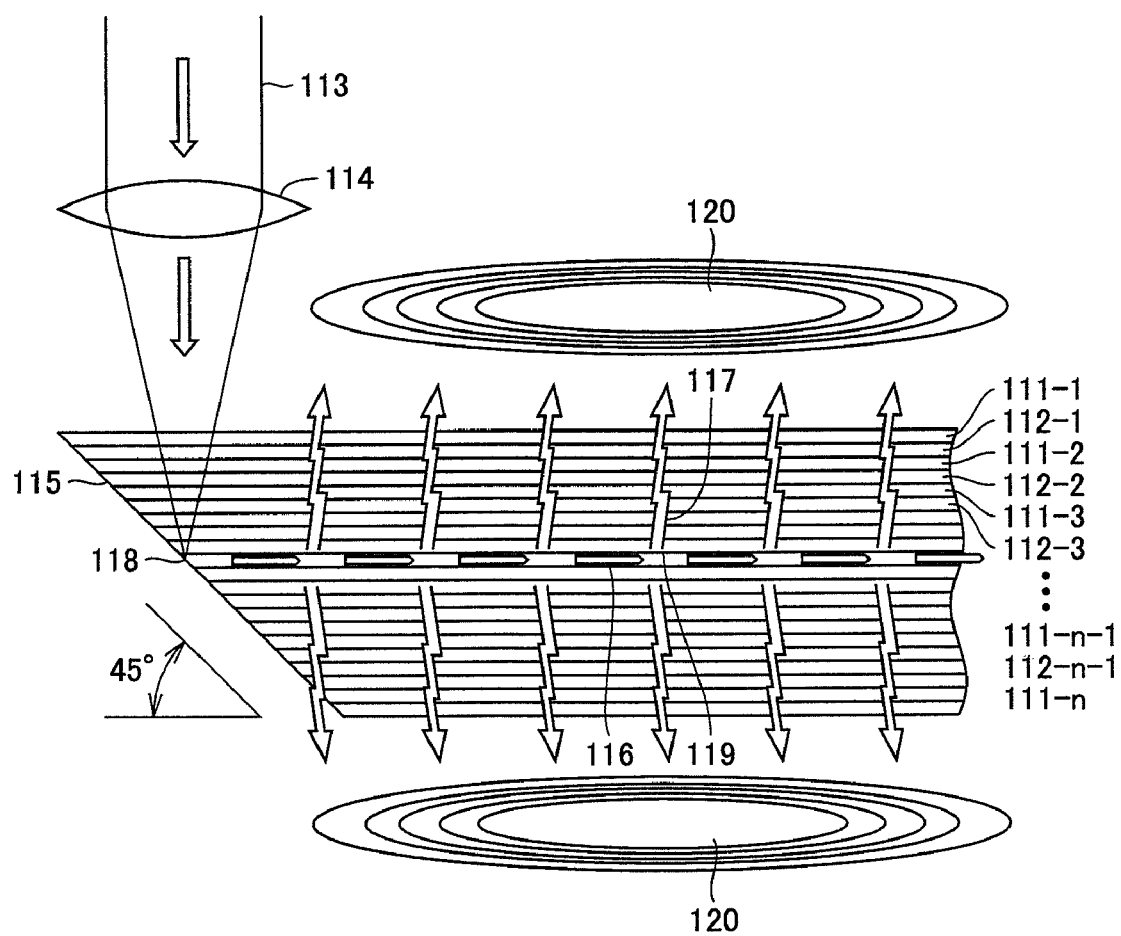
FIG. 18 is a schematic cross-sectional view that illustrates an example of a holographic memory of a laminated waveguide type.

FIG. 18 illustrates in a schematic cross-sectional view an example of the laminated waveguide holographic memory disclosed in Patent Document 6. This laminated waveguide holographic memory includes a plurality of core layers 112-1, 112-2, ..., 112-n-1 sandwiched between a plurality of cladding layers 111-1, 111-2, ..., 111-n. Each superposed unit made of a cladding layer/a core layer/a cladding layer serves as a single-mode planar-type waveguide for a wavelength of laser light 113 to be used. On a single planar waveguide, it is possible to record one page of two-dimensional data. An end face of the planar waveguide into which laser light 113 is introduced through a lens 114 is made to be a reflecting surface 115 that makes an angle of 45 degrees with the planar surface of the waveguide.

If page information recorded in a particular planar waveguide is to be read out, reproducing laser light 113 is focused on a reflection line 118 (extending in a direction orthogonal to the paper plane of FIG. 18) of the particular planar waveguide, by means of (cylindrical) lens 114. Light 116 introduced from reflection line 118 and guided in the planar waveguide propagates in a planar manner in the waveguide, and is partially scattered by light scattering elements (holograms) 119. In this case, if the light scattering elements have periodicity, there exists a direction along which the phases of lights scattered from respective light scattering elements coincide, so that guided light 116 advances along the relevant direction and leaves the planar waveguide as diffracted light 117 to form a holographic image 120. By capturing holographic image 120 by a CCD or the like, the information can be read. At this time, holographic image 120 appears as diffracted light 117 that forms a particular angle with a waveguide surface, and thus can be projected onto the CCD without need of a projector lens.

By adjusting the focal position of laser light 113 with use of lens 114 to change the planar waveguides through which the light is to propagate, it is possible to separately read the page information recorded in the respective planar waveguides. The pattern of light scattering elements 119 corresponding to desired information can be determined by a computer (see Non-Patent Document 4).

Figure 19:
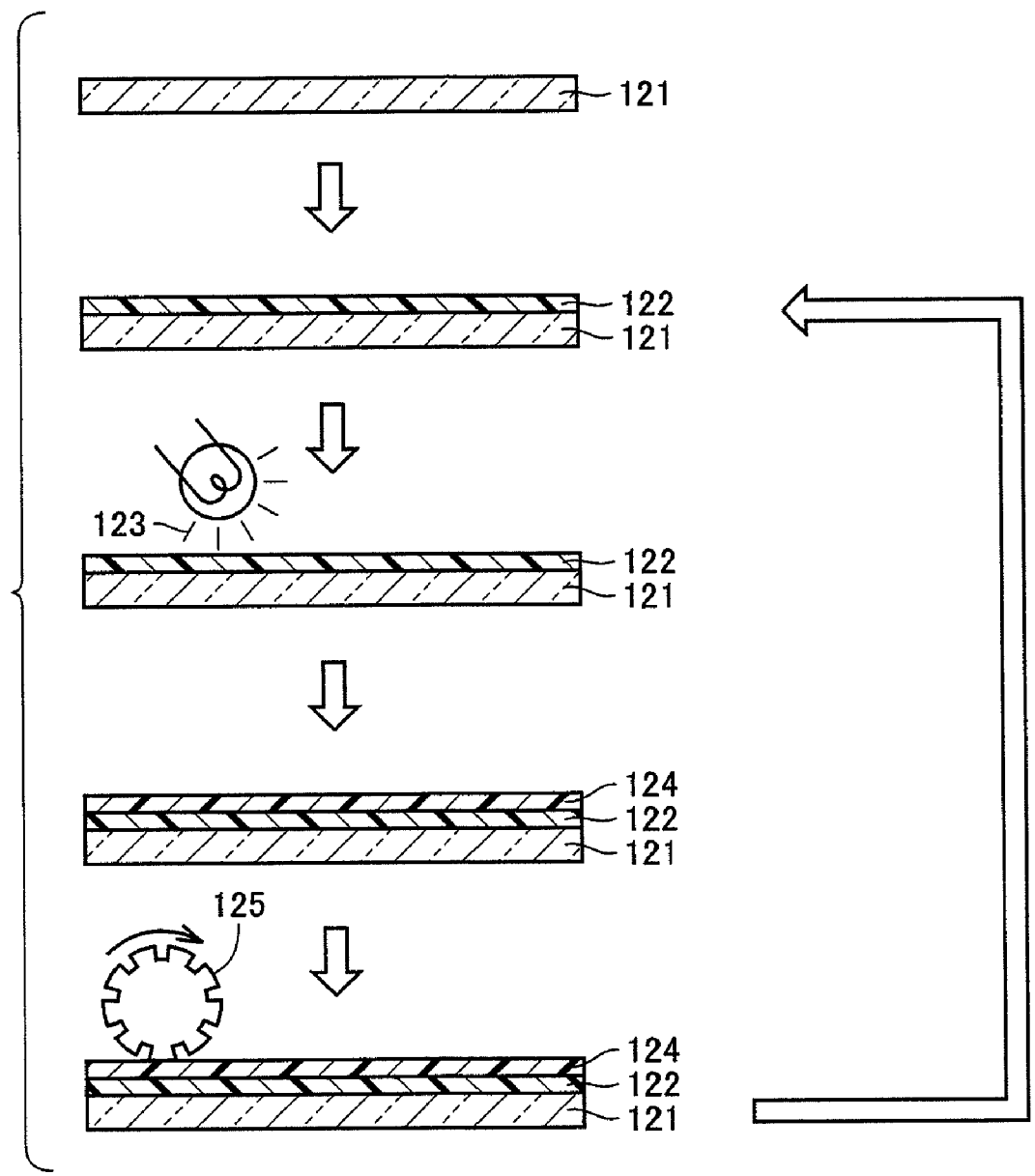
FIG. 19 shows schematic cross-sectional views that illustrate an examplary method for fabricating the holographic memory of a laminated waveguide type shown in FIG. 18.

FIG. 19 illustrates in schematic cross-sectional views an example of a method for fabricating a laminated waveguide holographic memory as shown in FIG. 18. In this fabrication method, an ultraviolet ray cure resin layer 122 having a thickness of 8 µm, for example, is spin-coated on a glass substrate 121, and cured by irradiation with an ultraviolet ray 123. Ultraviolet ray cure resin layer 122 is to serve as a cladding layer.

A PMMA (polymethylmethacrylate) layer 124 having a thickness of 1.7 µm, for example, is spin-coated on ultraviolet ray cure resin layer 122. A roller 125 having concave and convex patterns in the form of line segments at periodicity of 0.46 μm, for example, is allowed to roll on PMMA layer 124, so that the concave and convex patterns are transferred onto PMMA layer 124. PMMA layer 124 is to serve as a core layer. The concave and convex patterns formed on the surface of the core layer serve as periodic light scattering elements, and their patterns are preliminarily determined by a computer in accordance with information to be recorded.

The above-described four processes including the coating with the ultraviolet ray cure resin layer/the exposure with ultraviolet ray/the coating with the PMMA layer/the use of roller are repeated 10 times, and then the coating with the ultraviolet ray resin layer and the exposure with ultraviolet ray are finally carried out once again. As such, it is possible to fabricate a laminated waveguide holographic memory in which 10 planar-type waveguides are stacked.

In the above-described multivalued optical disc, it is not easy to accurately adjust the multi-level depths of minute pits with use of a stamper. In other words, it is not easy to manufacture a multivalued optical disc in which reflectivities based on changes in multilevel depths of the minute pits can accurately be sensed in multiple level.

In the above-described holographic memory, lithium niobate or a photopolymer is mainly used as a recording material. However, a holographic memory made of lithium niobate has low optical sensitivity and a narrow dynamic range for recording. Further, a holographic memory made of lithium niobate requires a high cost, and suffers from degradation of reproducing quality, i.e., a loss of records caused by repetitive read operations, and thus has a short lifetime. On the other hand, a photopolymer causes a problem of volume contraction before and after the recording. In other words, when the recording material expands or contracts, the pitches of the diffraction grating in the hologram and thus the diffraction conditions are changed, so that the reading operation cannot be performed even with use of the reference light used at the recording. Further, with use of a photopolymer as well, refractive index change Δn caused by light irradiation takes a small value of approximately at most 0.08 as described above, so that the dynamic range for recording cannot be increased.

The above-described laminated waveguide holographic memory uses a core layer of PMMA and a cladding layer of an ultraviolet ray cure resin. The light scattering element is formed of an ultraviolet ray cure resin that fills fine concave portions located on a surface of the PMMA core layer. In other words, light scattering is caused by a refractive index difference Δn between the PMMA and the ultraviolet ray cure resin. At this time, the PMMMA has a refractive index of 1.492, while the ultraviolet ray cure resin has a refractive index of 1.480. In other words, refractive index difference Δn between the PMMA and the ultraviolet ray cure resin is only 0.012. Such a small refractive index difference Δn cannot be said as being large enough for forming a light scattering element. Further, there also arises a concern that the ultraviolet ray cure resin layer is degraded owing to change over time.

In view of the circumstances of the conventional optical information recording media as described above, Patent Document 7 of Japanese Patent Laying-Open No. 2006-39303 discloses an optical information record medium utilizing a DLC layer, a method for recording on the same, and a method for manufacturing the same, so as to provide, at a low cost, an optical information record medium that enables easy recording at high information density and has excellent durability as well.

In the optical information record medium that utilizes a DLC layer, the DLC layer deposited on a substrate is considered as a basic component. Information recording on the DLC layer is performed by irradiating a recording spot region selected from a plurality of recording spot regions with an energy beam and increasing the refractive index of the DLC layer in the relevant recording spot region. Note that the refractive index of the DLC layer in an arbitrarily selected recording spot region can also be increased by energy beam irradiation to any one of values set in a plrualtiy of refractive index levels. The amount of refractive index change of the DLC layer can be increased up to Δn=approximately 0.5. By utilizing such characteristics of the DLC layer, it is possible to implement a multivalued optical disc, a holographic memory, and even a laminated waveguide holographic memory, and is thus possible to provide, at a low cost, an optical information record medium that enables easy recording at high information density and has excellent durability as well.

Although the refractive index of the DLC film can significantly be increased by irradiation with an ultraviolet ray or the like, the increase in refractive index tends to cause increase in extinction coefficient for the visible light range to the ultraviolet light range, as described above.

In this case, if ultraviolet light is used as recording light to increase the refractive index of the DLC layer, for example, the extinction coefficient also increases accordingly, and thus the ultraviolet light is less likely to penetrate deeply in the thickness direction of the layer. Therefore, it becomes difficult to uniformly increase the refractive index at a deeper position as the DLC layer becomes thicker, so that there arises a problem of incomplete information recording, difficulty in multivalued recording, and the like.

Further, when the extinction coefficient of the DLC layer is increased, reference light or reading light is absorbed and less likely to pass through the DLC layer in the optical information record medium, so that there also arises a problem of incompleteness of the reproduced information and tendency of much noise.

Therefore, Example 19 uses an Si—O containing hydrogenated carbon film having superior optical properties as compared with the DLC film, to provide at a low cost an optical information record medium that enables easy and more reliable recording with high information density, has excellent durability, and causes less decrease in intensity of the reproducing light.

In other words, in the recording layer made of an Si—O containing hydrogenated carbon film, its extinction coefficient is decreased as its refractive index is decreased by the energy beam irradiation. Therefore, even in the case of a thicker film, it is possible to maintain uniformity of optical property modification in the thickness direction and increase reliability of the information recording. Further, the recording layer of the Si—O containing hydrogenated carbon film absorbs less reference light and reading light, and is thus quite preferable in that decrease in intensity of the reading light is small.

As described above, a known method such as use of various types of masks or interference exposure is applicable to form patterns of refractive index change on the Si—O containing hydrogenated carbon film.

Figure 12:
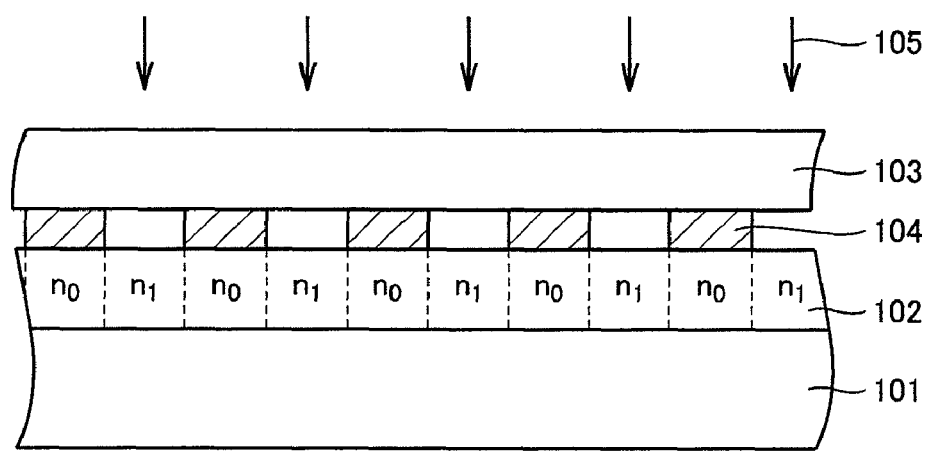
FIG. 12 is a schematic cross-sectional view that illustrates a method for fabricating an optical information record medium according to the present invention.

The schematic cross-sectional view of FIG. 12 similar to FIG. 9 illustrates a method for fabricating the optical information record medium in Example 19 and a method for performing information recording thereon. In this example, an Si—O containing hydrogenated carbon film 102 having a thickness of 1 μm, for example, is deposited on a glass substrate 10 by plasma CVD. In addition, a chromium film is deposited on a glass substrate 103 by evaporation, for example, and patterned by stepper exposure and etching so that a metal film mask pattern 104 can be formed. Metal film mask pattern 104 includes a plurality of minute openings corresponding to the plurality of recording spot regions.

The formed metal film mask pattern 104 is superposed on Si—O containing hydrogenated carbon film 102. Si—O containing hydrogenated carbon film 102 is irradiated with an ultraviolet ray 105 having a wavelength of 250 nm and an irradiation power density of 20 mW/mm², for example, for approximately 30 seconds through metal film mask pattern 104. As a result, a recording spot region in Si—O containing hydrogenated carbon film 102, which is shielded with metal film mask pattern 104 against ultraviolet ray 105, maintains a refractive index $n_0=1.68$, for example, which is an original refractive index at the time when the Si—O containing hydrogenated carbon film was deposited. On the other hand, a recording spot region in Si—O containing hydrogenated carbon film 102, which is irradiated with ultraviolet ray 105 through the openings of metal film mask pattern 104, has a refractive index that can be decreased to $n_1$=approximately 1.58, for example.

By doing so, recording spot regions having two types of refractive indices $n_0$ and $n_1$ are formed in Si—O containing hydrogenated carbon film 102, and this means that binary recording is performed. When a reading light beam is applied to this optical information record medium, the amount of light reflected on or transmitting through each of the recording spot regions changes depending on refractive indices $n_0$ and $n_1$, so that the binary-recorded information can be read out.

EXAMPLE 20

In Example 20, multivalued recording is performed on an optical information record medium that includes an Si—O containing hydrogenated carbon film. In Example 20, binary recording is initially performed as in the case of Example 19 illustrated in FIG. 12.

Figure 13:
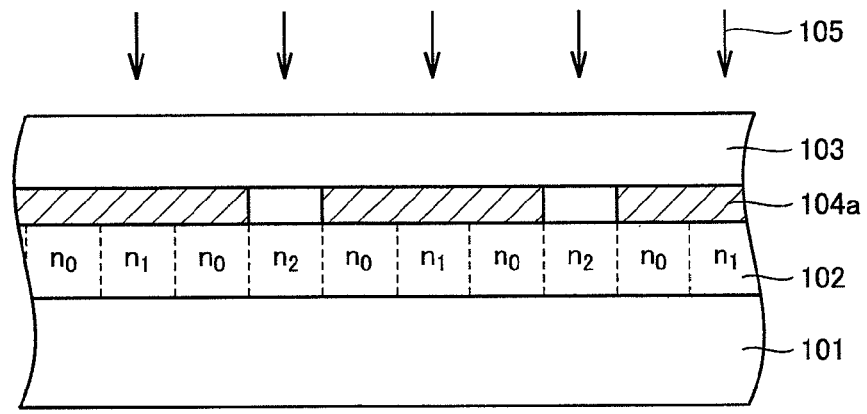
FIG. 13 is a schematic cross-sectional view that illustrates a method for fabricating another optical information record medium according to the present invention.

Subsequently, as illustrated in the schematic cross-sectional view of FIG. 13, a second metal film mask pattern 104a is superposed on Si—O containing hydrogenated carbon film 102. Second metal film mask pattern 104a includes minute openings that correspond to recording spot regions selected from the recording spot regions where a refractive index was decreased to $n_1$ in FIG. 12. Si—O containing hydrogenated carbon film 102 is again irradiated with ultraviolet ray 105 through second metal film mask pattern 104a.

Consequently, the refractive index is further decreased from $n_1$ to $n_2$ in the recording spot region irradiated with ultraviolet ray 105 through the opening of second metal film mask pattern 104a, and accordingly, three-valued recording is performed. As is seen from the above, it becomes possible to perform more-valued recording by repeating ultraviolet ray irradiation with use of an additional metal film mask pattern.

EXAMPLE 21

Figure 14:
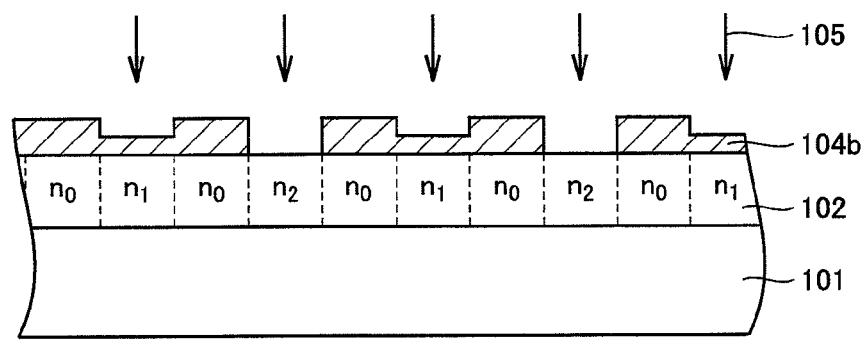
FIG. 14 is a schematic cross-sectional view that illustrates a method for fabricating still another optical information record medium according to the present invention.

The schematic cross-sectional view of FIG. 14 illustrates a method for fabricating an optical information record medium in Example 21, and a method for performing information recording thereon. In Example 21 as well, Si—O containing hydrogenated carbon film 102 is deposited on glass substrate 1 by plasma CVD.

However, a chromium film is deposited on Si—O containing hydrogenated carbon film 102 and patterned by stepper exposure and etching to form a metal film mask pattern 104b. In this case, the stepper exposure and the etching are performed in a plurality of stages. In the example of FIG. 14, metal film mask pattern 104b has its thickness modified in three levels including a thickness of 0, in a plurality of minute regions corresponding to the plurality of recording spot regions. Through metal film mask pattern 104b, ultraviolet ray 105 is applied to Si—O containing hydrogenated carbon film 102.

Although ultraviolet ray 105 cannot transmit through the thickest region of metal film mask pattern 104b, it can partially transmit through a thinner region. For example, an ultraviolet ray having a wavelength of 250 nm can partially transmit through a chromium film having a thickness of at most approximately 60 nm. In other words, metal film mask pattern 104b serves as an energy beam absorbing layer that absorbs an energy beam depending on its thickness modified in a stepwise manner for each of the minute regions corresponding to the recording spot regions. Therefore, by applying ultraviolet ray 105 to Si—O containing hydrogenated carbon film 102 through metal film mask pattern 104b, recording spot regions that have refractive indices modified in three levels are formed in Si—O containing hydrogenated carbon film 102, resulting in that three-valued recording is performed.

If an X-ray, an ion beam, or an electron beam that has transmission power higher than that of an ultraviolet ray is used, it can partially transmit through the metal film even if the film is quite thick, and thus is also applicable to metal film mask pattern 104b having multi-level thicknesses, and facilitates multivalued recording. For the metal mask, gold, nickel, tungsten, or the like can also be used preferably in addition to chromium, depending on the design of energy beam transmission amount.

EXAMPLE 22

In an optical information record medium in Example 22 of the present invention, two-dimensional digital data is holographed on an Si—O containing hydrogenated carbon film, similarly as in the case described with reference to FIG. 16 and FIG. 17. In other words, an Si—O containing hydrogenated carbon film deposited on a glass substrate by plasma CVD and having a thickness of approximately 1 μm is used as holographic record medium 131 in FIG. 16. Further, a chromium film evaporated onto the glass substrate is processed by stepper exposure and etching into a metal film mask pattern representing two-dimensional digital data. The metal film mask pattern is used as two-dimensional digital data 132 shown in FIG. 16.

An ultraviolet ray having a wavelength of 250 nm and an energy density of 10 mW/mm², for example, is used as object light 133 that passes through two-dimensional digital data 132 in the chromium film. This object light is projected onto holographic record medium 131 of the Si—O containing hydrogenated carbon film through lens 134. At the same time, an ultraviolet ray serving as reference light 135 is also applied to holographic record medium 131 of the Si—O containing hydrogenated carbon film, and a hologram produced by interference between object light 133 and reference light 135 is recorded as refractive index changes in record medium 131 of the Si—O containing hydrogenated carbon film.

When the data recorded as such is to be reproduced, only the ultraviolet ray used as reference light 135 at the recording is applied to holographic record medium 131 of the Si—O containing hydrogenated carbon film, as shown in FIG. 17. Reproducing light 136 of the ultraviolet ray caused by diffraction of the hologram in record medium 131 is then projected as reproduced pattern 138 onto a two-dimensional imaging element such as a CCD through projector lens 137.

EXAMPLE 23

In Example 23, a laminated waveguide holographic memory is fabricated. In this Example 23, Si—O containing hydrogenated carbon film 102 having a thickness of 100 nm, for example, is deposited on glass substrate 101 having a thickness of 100 µm, for example, by plasma CVD, similarly as in the case of FIG. 12. In addition, a chromium film is evaporated onto glass substrate 103, and patterned by stepper exposure and etching to form metal film mask pattern 104. Such metal film mask pattern 104 is equivalent to one page of data, and includes a plurality of minute periodic openings in the form of line segments, corresponding to periodic light scattering elements (holograms) 119 as shown in FIG. 18. The minute openings in the form of line segments may extend in a direction orthogonal to the paper plane of FIG. 12.

The formed metal film mask pattern 104 is superposed on Si—O containing hydrogenated carbon film 102. Si—O containing hydrogenated carbon film 102 is then irradiated with ultraviolet ray 105 having a wavelength of 308 nm and an energy density of 20 mW/mm$^2$, for example, for approximately 30 minutes through metal film mask pattern 104. As a result, space regions in Si—O containing hydrogenated carbon film 102, which are shielded by metal film mask pattern 104 against ultraviolet ray 105, maintains a refractive index $n_0=1.70$, for example, which is the original refractive index at the time when the Si—O containing hydrogenated carbon film was deposited. On the other hand, periodic minute regions in the form of line segments in Si—O containing hydrogenated carbon film 102, which are irradiated with ultraviolet ray 105 through the openings of metal film mask pattern 4, have a refractive index that can be decreased to $n_1$=approximately 1.48, for example.

As such, 40 pairs of glass substrate 101 and Si—O containing hydrogenated carbon film 102 where a hologram equivalent to one page of data is recorded are stacked, and then glass substrate 101 having a thickness of 100 µm is superposed on a surface of the uppermost Si—O containing hydrogenated carbon film 102. By doing so, a laminated waveguide holographic memory having a thickness of approximately 4 mm can be fabricated. Reading of the laminated waveguide holographic memory fabricated in Example 23 can be performed similarly as in the method described with reference to FIG. 18.

EXAMPLE 24

Example 24 in the present invention relates to a polarization integrator fabricated by utilization of an Si—O containing hydrogenated carbon film. Such a polarization integrator can be utilized in a liquid crystal projector, for example.

Figure 22:
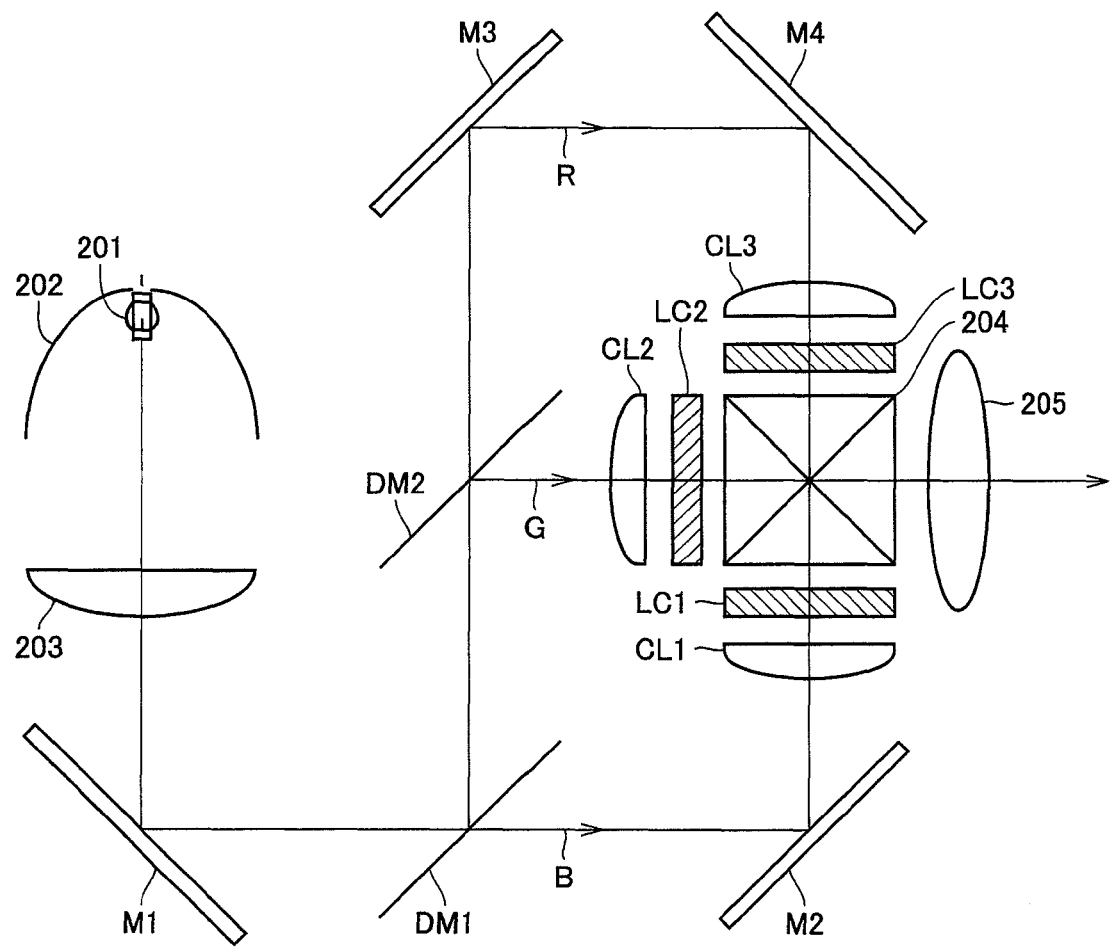
FIG. 22 is a cross-sectional view that illustrates a conventional liquid crystal projector.

FIG. 22 illustrates an example of a conventional liquid crystal projector in a schematic block diagram. The liquid crystal projector includes a light source 201, which is disposed in a dome-like or parabolic reflecting mirror 202 to increase the light utilization efficiency. Light emitted from source 201 is converted into parallel light by a collimator lens 203, and directed to a first dichroic mirror DM1 by a first total reflection mirror M1. First dichroic mirror DM1 allows only blue light B to transmit therethrough, and reflects lights of other colors. Blue light B, which has transmitted through first dichroic mirror DM1, is converged on a first liquid crystal panel LC1 through a second total reflection mirror M2 and a first condenser lens CL1.

The light reflected by first dichroic mirror DM1 is directed to a second dichroic mirror DM2. Second dichroic mirror DM2 reflects only green light G, and allows the remaining red light R to transmit therethrough. Green light G reflected by second dichroic mirror DM2 is converged on an second liquid crystal panel LC2 by a second condenser lens CL2. Red light R, which has transmitted through the second dichroic mirror, is converged on a third liquid crystal panel LC3 through a third total reflection mirror M3, a fourth total reflection mirror M4, and a third condenser lens CL3.

Blue light B, green light G, and red light R converged to first liquid crystal panel LC1, second liquid crystal panel LC2, and third liquid crystal panel LC3, respectively, transmit through the liquid crystal panels corresponding thereto, respectively, and are then integrated by a prism 204. The lights of three primary colors integrated by prism 204 are projected onto a screen (not shown) by a projection lens 205.

As is well known, a liquid crystal panel includes multiple pixel disposed in a matrix, and it is possible to control transmission and blocking of light by providing an electrical signal to each pixel. To enable transmission and blocking of light, a liquid crystal layer is sandwiched by two polarizing plates. In other words, the liquid crystal panel only accepts light polarized in parallel with a prescribed linear direction. However, light emitted from a light source usually used in the liquid crystal projector is non-polarized light (or randomly polarized light). Therefore, the light utilization efficiency, with which light emitted from the light source can transmit to be used as projected light through the liquid crystal panel, is less than a half of the light emitted from the light source. Therefore, to improve the low light utilization efficiency attributed to non-polarized light from the light source, a polarization integrator has been used in the liquid crystal projector in recent years.

Figure 23:
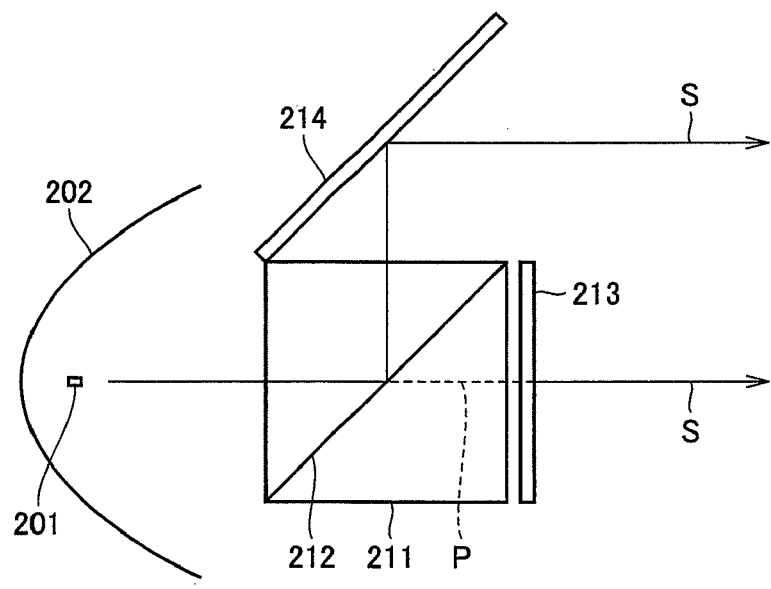
FIG. 23 is a cross-sectional view that schematically illustrates a basic principle of the conventional polarization integrator.

FIG. 23 is a schematic cross-sectional view that illustrates a basic principle of the polarization integrator (see Non-Patent Document 5 of Large-Screen Display edited by Nobuo Nishida, KYORITSU SHUPPAN CO., LTD., published in 2002). In this polarization integrator, light emitted from source 201 covered with dome-like reflecting mirror 202 is converted into parallel light by a collimator lens (not shown), and applied to a polarization separation prism 211. This prism 211 includes a PBS (polarization beam splitter) film 212. PBS film 212 serves to allow P-polarized light to transmit therethrough and reflects S-polarized light. Such a PBS film can be formed of a dielectric multilayer film.

The P-polarized light that has transmitted through PBS film 212 has its polarization direction rotated by a half-wavelength plate 213, and is converted into S-polarized light. On the other hand, the S-polarized light reflected by PBS film 212 is reflected by a total reflection mirror 214 and made parallel with the S-polarized light that has passed through half-wavelength plate 213. The S-polarized light reflected by total reflection mirror 214 is integrated with the S-polarized light that has passed through half-wavelength plate 213 by a lens (not shown), and the integrated S-polarized lights are applied onto the liquid crystal panel.

In the example in FIG. 23, half-wavelength plate 213 is applied to the P-polarized light that has transmitted through PBS film 212. However, it will be understood that half-wavelength plate 213 may also be applied to the S-polarized light reflected by PBS film 212. In that case, a light flux of the light source is separated into a P-polarized light flux and an S-polarized light flux, and the S-polarized light flux is converted into a P-polarized light flux, and then these two P-polarized light fluxes are integrated and applied onto the liquid crystal panel.

The polarization integrator as shown in FIG. 23 includes polarization separation prism 211. Such a prism is not preferable for reduction in size of the liquid crystal projector. Further, when the prism is fabricated with glass, its weight becomes relatively large, and its processing is not easy. On the other hand, the prism is also fabricated with a resin. However, heat resistance of the resin will be an issue as the projector achieves high brightness. Moreover, PBS film 212 requires a polarization separation coating including a few tens of dielectric layers and thus causes a problem of high costs.

In view of the circumstances of the conventional polarization integrator, Patent Document 8 of Japanese Patent Laying-Open No. 2005-195919 teaches utilization of a DLC film so as to provide a polarization integrator that can be reduced in weight and size and is excellent in heat resistance, in an easy manner and at a low cost.

It is possible to increase the refractive index of the DLC film by irradiation with an ultraviolet ray or the like. As described above, however, the extinction coefficient tends to increase as the refractive index increases. This makes it difficult to uniformly increase the refractive index in a thickness direction of the DLC film. Further, in the fabricated refraction-type optical element and refractive index modulated-type diffractive optical element, a high extinction coefficient in a high-refractive-index region means that light is less likely to transmit through the relevant region, and is not preferable from the viewpoint of the light utilization efficiency as well as the diffraction efficiency.

Therefore, Example 24 provides a polarization integrator including a refraction-type optical element or refractive index modulated-type diffractive optical element that is fabricated with use of an Si—O containing hydrogenated carbon film having superior optical properties as compared with the DLC film.

In other words, in the Si—O containing hydrogenated carbon film used in the refraction-type optical element or refractive index modulated-type diffractive optical element included in the polarization integrator in Example 24, an extinction coefficient is further decreased, uniformity in refractive index in the film thickness direction is further improved, and improvement in light utilization efficiency and diffraction efficiency can be achieved, in comparison with the DLC film. Furthermore, in the Si—O containing hydrogenated carbon film, the refractive index is decreased by the energy beam irradiation as described above. The refractive-index-modulated Si—O containing hydrogenated carbon film can achieve a lower mean refractive index, as compared with the refractive-index-modulated DLC film.

In other words, the optical element fabricated with use of the Si—O containing hydrogenated carbon film has a mean refractive index closer to that of a generally-used optical element fabricated with use of glass or a transparent resin material. As compared with the optical element made of a DLC film having a high mean refractive index, therefore, the optical element made of an Si—O containing hydrogenated carbon film is less liable to cause light reflection at an interface with the generally-used optical element and is quite preferable from the viewpoint of adaptability to those generally-used optical elements. From this viewpoint as well, it is possible to obtain a polarization integrator having an improved light utilization efficiency.

Figure 20:
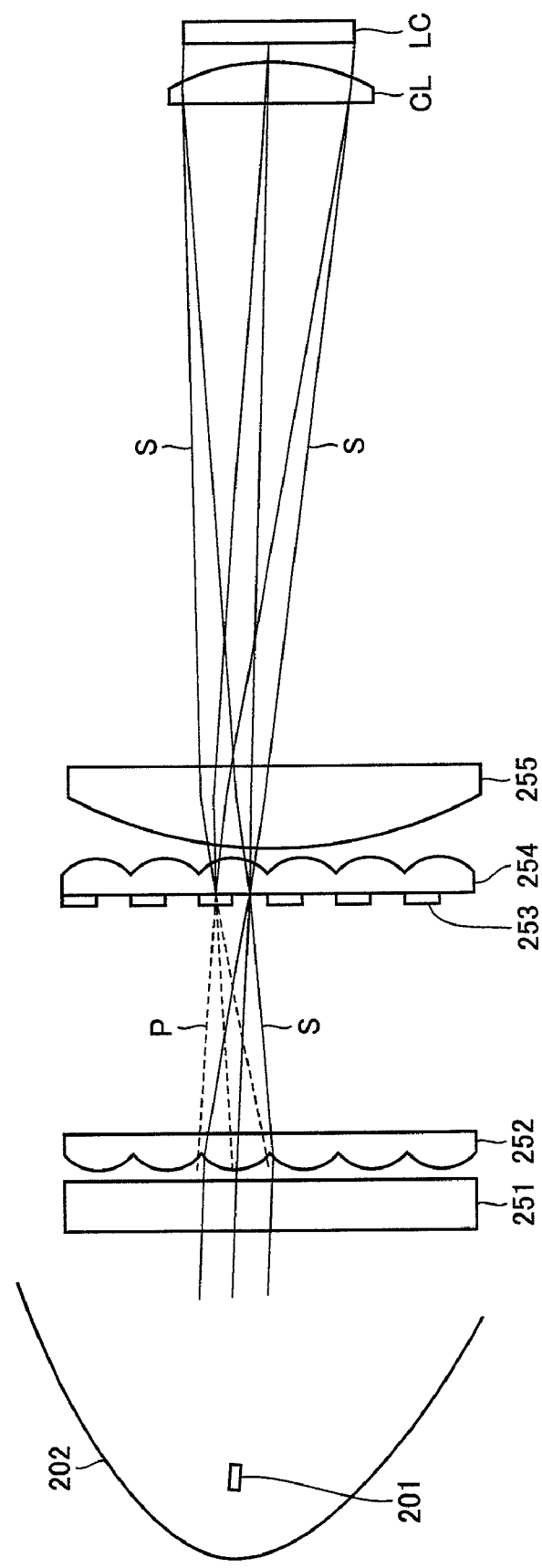
FIG. 20 is a cross-sectional view that schematically illustrates an examplary polarization integrator according to the present invention.

FIG. 20 illustrates the polarization integrator in Example 24 in a schematic cross-sectional view. In this polarization integrator, light source 201 is disposed in a dome-like or parabolic reflecting mirror 202. Light emitted from source 201 is made into parallel light by a collimator lens (not shown), and applied to a polarization beam splitter 251. In other words, polarization beam splitter 251 separates light from the light source into P-polarized light and S-polarized light. A first microlens 252 converges a P-polarized light flux onto a half-wavelength plate 253, and converges an S-polarized light flux onto a region where no half-wavelength plate 253 is disposed.

Half-wavelength plate 253 converts the P-polarized light into S-polarized light. The S-polarized light flux that has transmitted through half-wavelength plate 253 and the S-polarized light flux that has passed through the region where no half-wavelength plate 253 is disposed are integrated by the effect of a second microlens 254 and a lens 255, and applied onto a liquid crystal panel LC by a condenser lens CL. A polarizing plate included in liquid crystal panel LC is of course set to accept S-polarized light.

Although half-wavelength plate 253 is applied to P-polarized light in the example in FIG. 20, half-wavelength plate 253 may also be applied to S-polarized light. In that case, specifically, the light flux from the light source is separated into a P-polarized light flux and an S-polarized light flux by polarization beam splitter 251, and the S-polarized light flux is converted into a P-polarized light flux by half-wavelength plate 253, and then these two P-polarized light fluxes are integrated and applied onto liquid crystal panel LC. The polarizing plate included in liquid crystal panel LC is of course set to accept P-polarized light.

As described above, it is possible to improve the utilization efficiency of light from the light source in the liquid crystal projector by integrating non-polarized lights from the light source into S-polarized lights or P-polarized lights by a polarization integrator.

Here, in Example 24, at least one of the polarization beam splitter, the first microlens, the half-wavelength plate, and the second microlens included in the polarization integrator is formed by utilization of an Si—O containing hydrogenated carbon film. The Si—O containing hydrogenated carbon film is of course thin and lightweight, and has excellent heat resistance. Therefore, if at least one of the polarization beam splitter, the first microlens, the half-wavelength plate, and the second microlens can be fabricated by utilization of an Si—O containing hydrogenated carbon film, it becomes possible to achieve reduction in size, weight, and cost of the polarization integrator and then the liquid crystal projector.

For the refraction-type lens that can be included in the polarization integrator in Example 24, it is possible to utilize the lens as described in detail in relation to FIG. 7. It goes without saying that the polarization integrator in Example 24 can also be fabricated by utilization of a diffraction-type microlens. For the diffraction-type microlens, it is possible to utilize the lens as described in detail in relation to FIG. 8.

Further, in Example 24, polarization beam splitter 251 in FIG. 20 can be fabricated by utilization of the Si—O containing hydrogenated carbon film. In other words, polarization beam splitter 251 includes a refractive index modulated-type diffraction grating formed at the Si—O containing hydrogenated carbon film. Note that Non-Patent Document 6 of Applied Optics, Vol. 41, 2002, pp. 3558-3566, for example, describes that polarizations can be separated by a diffraction grating.

Figure 21:
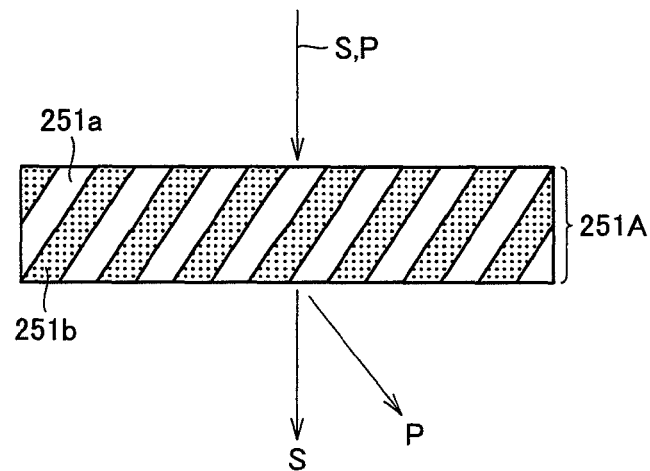
FIG. 21 is a cross-sectional view that schematically illustrates a polarization beam splitter made of an Si—O containing hydrogenated carbon film, included in the polarization integrator shown in FIG. 20.

FIG. 21 shows in a schematic cross-sectional view a polarization beam splitter 251A made of an Si—O containing hydrogenated carbon film including a refractive index modulated-type diffraction grating. In other words, Si—O containing hydrogenated carbon film 251A includes a region 251a having a relatively high refractive index and a region 251b having a relatively low refractive index. High-refractive-index region 251a is a region not irradiated with an energy beam, and has a refractive index of 1.65, for example. On the other hand, low-refractive-index region 251*b* is irradiated with SR (synchrotoron radiation) under the synchrotoron condition of 620 (mA/min/mm$^2$), for example, and its refractive index is decreased to 1.45, for example. Further, an interface between low-refractive-index region 251*b* and high-refractive-index region 251*a* is tilted by 40 degrees, for example, with respect to the surface of Si—O containing hydrogenated carbon film 251A.

Such a polarization beam splitter 251A can be fabricated as follows. For example, on the Si—O containing hydrogenated carbon film, there is formed a gold mask having a line and space pattern where a gold stripe having a width of 0.5 μm is repetitively arranged at periodicity of 1 μm. Subsequently, the SR irradiation may be performed in a direction orthogonal to the length direction of the gold stripe and at a tilt angle of 40 degrees with respect to the surface of the Si—O containing hydrogenated carbon film.

When light including S-polarized light and P-polarized light is directed into polarization beam splitter 251A made of the Si—O containing hydrogenated carbon film as shown in FIG. 21, the S-polarized light transmits as 0th order diffracted light (which corresponds to a TE wave), while the P-polarized light is diffracted as 1st order diffracted light (which corresponds to a TM wave). In other words, the P-polarized light and the S-polarized light are separated from each other.

Further, in Example 24, half-wavelength plate 253 in FIG. 20 can also be fabricated by utilization of the Si—O containing hydrogenated carbon film. In other words, it is possible to provide a function of a half-wavelength plate with use of the Si—O containing hydrogenated carbon film including a diffraction grating similar to the refractive index modulated-type diffraction grating shown in FIG. 21. Such a half-wavelength plate 253 can be fabricated as follows. For example, on an Si—O containing hydrogenated carbon film, there is formed a gold mask having a line and space pattern where a gold stripe having a width of 0.5 μm is repetitively formed at periodicity of 1 μm. Subsequently, SR irradiation may be performed in a direction perpendicular to the surface of the Si—O containing hydrogenated carbon film. When P-polarized light, for example, is allowed to pass through half-wavelength plate 253 made of the Si—O containing hydrogenated carbon film including the refractive index modulated-type diffraction grating obtained as such, the P-polarized light has a linear polarization plane rotated by 90 degrees and is converted into S-polarized light. It is of course possible to convert S-polarized light into P-polarized light by using such a half-wavelength plate.

Although FIG. 22 shows a transmission-type liquid crystal projector, the polarization integrator in Example 24 may of course be applied to the reflection-type liquid crystal projector (see Non-Patent Document 5) as it is.

EXAMPLE 25

Example 25 in the present invention relates to a projector including an diffractive optical element that can make a uniform light intensity distribution in a cross section of a light beam and can also shape a cross-sectional form of the beam.

In recent years, an LCD (Liquid Crystal Display), a PDP (Plasma Display Panel), and the like have been developed for a large-sized image display device. In view of a demand for further increase in size of the display device, however, a projector (projection-type display device) is now of interest.

As kinds of projectors, there are a projector for projecting an image onto the front side of a screen, a rear-projection TV for projecting an image from behind a screen onto the same screen, and the like.

As a kind of projector, a projection-type CRT (cathode-ray tube) display device has conventionally been used, which projects an image created on a high-definition and high-brightness CRT onto a screen for display. In recent years, a projection-type liquid crystal display device has also been developed, in which a light beam is applied from a light source to a liquid crystal panel so as to project an image created on the liquid crystal panel onto a screen for display. Further, a DLP (Digital Light Processing) projector has also been developed, which operates microscopically small mirrors a few thousand times per second so as to depict an image. Such a projection-type liquid crystal display device and a DLP projector are advantageous in that they are suitable for reduction in size and weight and thus they may readily be introduced in ordinary households.

A light beam from a light source that is generally used in the projector, however, has a nonuniform light intensity distribution in a cross section of the beam. For example, the light intensity tends to be higher in the central part of the beam section and lower in the peripheral part as in a Gaussian distribution. In the case that such a light beam is used to project an image created on a liquid crystal panel onto a screen, it is not possible to realize a uniform brightness over the whole area of the screen and then the projected image is darker in the peripheral part of the screen than in the central part.

Further, a light beam from a light source is usually circular in cross section. A screen onto which an image is to be projected from a projector, however, usually has a rectangular shape (square or rectangle). For efficient use of light energy, therefore, it is desired to use an diffractive optical element having a function in which a circular cross section of a beam is converted by diffraction into a rectangular cross section, for example, rather than to use an opening (aperture) for partially shielding the peripheral part of the cross section of the beam so as to shape the cross-sectional form.

Accordingly, Patent Document 9 of Japanese Patent Laying-Open No. 8-313845, for example, discloses an diffractive optical element that can make a uniform intensity distribution in a cross section of a light beam and can convert the cross-sectional shape of the beam. Such an diffractive optical element is sometimes called as a diffraction-type beam-shaping element.

Figure 26:
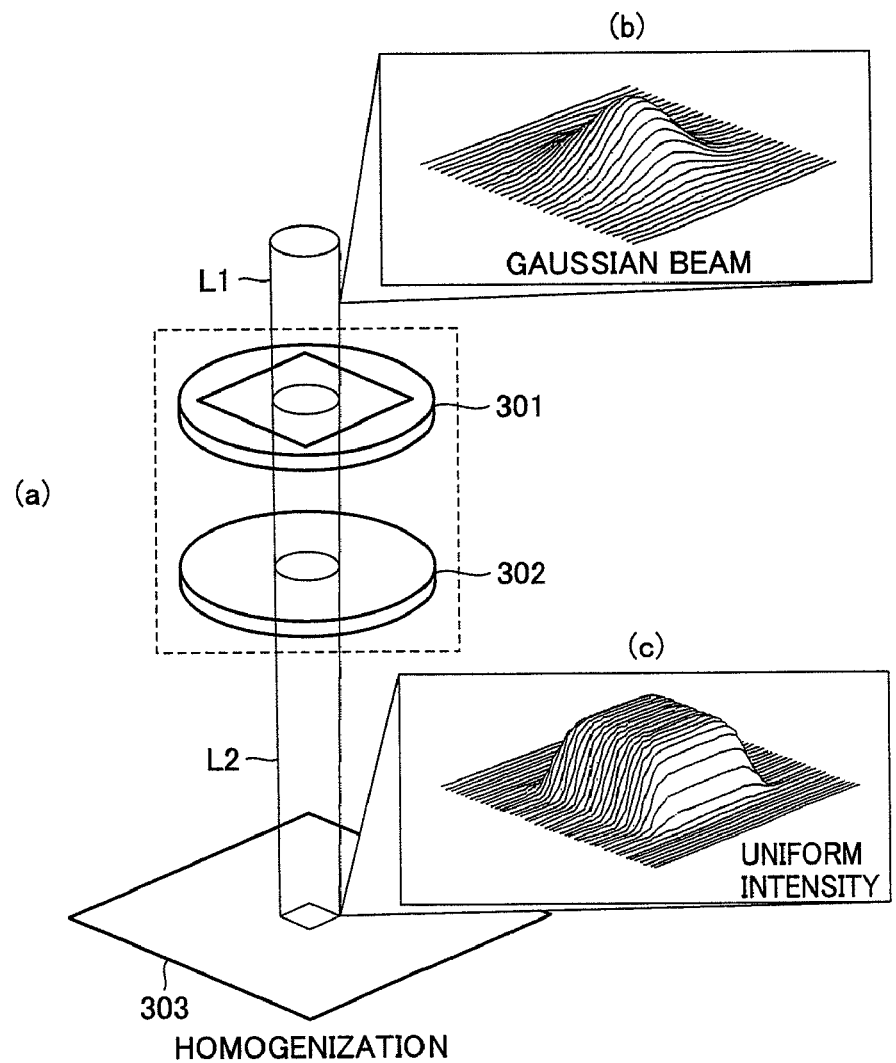
FIG. 26 is a schematic perspective view that illustrates an effect of the diffraction-type beam-shaping element.

In FIG. 26, an example of an effect of a diffraction-type beam-shaping element is illustrated in a schematic perspective view. A light beam L1 directed to a beam-shaping element 301 shown in FIG. 26 (*a*) has a circular cross section and has a Gaussian intensity distribution in the cross section as shown in FIG. 26 (*b*) (in FIG. 26 (*b*), the height of scan lines is shown in proportion to the light intensity). In other words, beam L1 has the highest intensity at the central part of its cross section, while the intensity gradually decreases toward the periphery of the cross section. A light beam L2 having passed through beam-shaping element 301 is applied onto a prescribed irradiation surface 303 through a lens 302. At this time, beam L2 applied onto irradiation surface 303 is changed by a diffraction effect of beam-shaping element 301 to have a cross-sectional shape of a square and to have a uniform intensity distribution in the cross section as shown in FIG. 26 (*c*) (in FIG. 26 (*c*) as well, the height of scan lines is shown in proportion to the light intensity).

Patent Document 10 of Japanese Patent Laying-Open No. 2005-326666 discloses a projector that includes a refractive index modulated-type diffractive optical element fabricated by utilization of a DLC film, in view of the disadvantages in the conventional relief-type diffractive optical elements.

It is possible to increase the refractive index of the DLC film by irradiation with an ultraviolet ray or the like. As described above, however, the extinction coefficient also tends to increase as the refractive index increases. This makes it difficult to uniformly increase the refractive index in a thickness direction of the DLC film. Further, in the fabricated refractive index modulated-type diffractive optical element, a high extinction coefficient in a high-refractive-index region means that light is less likely to transmit through the relevant region, and is not preferable from the viewpoint of the diffraction efficiency. Therefore, Example 25 provides a projector that includes a refractive index modulated-type diffractive optical element fabricated with use of an Si—O containing hydrogenated carbon film having superior properties as compared with the DLC film.

(Refractive-Index-Modulated Pattern)

The inventors performed simulation of a diffraction effect of a beam-shaping element fabricated with use of the Si—O containing hydrogenated carbon film. For this simulation, "VirtualLab" was used, which is calculation software available from LightTrans GmbH in Germany. With this calculation software, it is possible to simulate a diffraction grating and a diffraction effect thereof by repeating calculation using Fourier transform.

Figure 24:
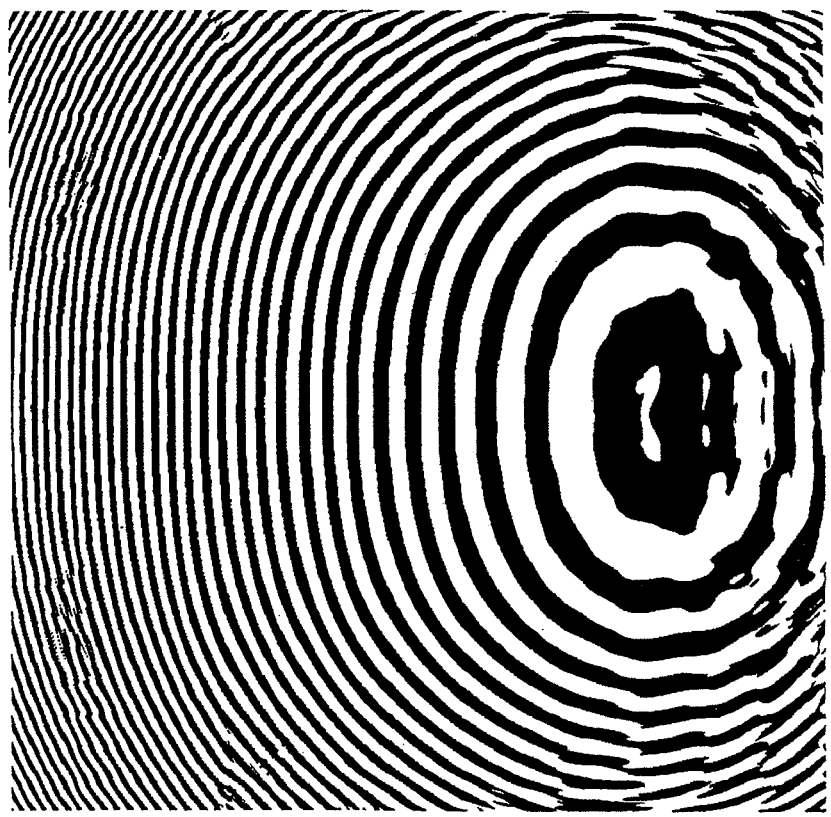
FIG. 24 is a plan view that shows an example of how high-refractive-index regions and low-refractive-index regions are distributed in an diffractive optical element of a refractive index modulated-type according to the present invention.

FIG. 24 is a plan view showing a refractive index distribution in a refractive index modulated-type diffractive optical element, which has been obtained by using VirtualLab. It has been supposed that this diffractive optical element has been fabricated using an Si—O containing hydrogenated carbon film of 4.4 µm thickness, and the diffraction grating pattern of the element shows a square area of 4 mm×4 mm. In the simulation, the calculation for the 4 mm×4 mm square area was carried out after the relevant area was divided into 800× 800 minute square areas (hereinafter referred to as pixels). In other words, one pixel is set to be a square area of 5 µm×5 µm.

In the diffraction grating pattern of FIG. 24, black band-like regions represent high-refractive-index regions and white band-like regions represent low-refractive-index regions. More specifically, the white band-like regions have a low refractive index of 1.48 and the black band-like regions have a high refractive index of 1.65. Namely, the difference in refractive index between these regions is Δn=0.17.

Simulation of beam-shaping was carried out by using the two-level diffractive optical element in FIG. 24 as set as described above. In this simulation, it was supposed that a red light beam having a wavelength of 630 nm is used as incident light to the diffractive optical element and that the beam has a Gaussian intensity distribution in its circular cross section. Consequently, a rectangular irradiated area of 0.5 mm×0.25 mm was formed on a prescribed irradiation surface, and uniform light intensity was obtained in the irradiated area. In this case, variation in uniformity of the light intensity in the irradiated area was 5.8% or less and the diffraction efficiency was 37.6%.

As described above, it is known that the diffraction efficiency in the refractive index modulated-type diffractive optical element can be enhanced with increase in refractive index difference Δn of the refractive index modulation and it is theoretically predicted that the diffraction efficiency can be enhanced up to 40% in the two-level diffractive optical element. Further, the diffraction efficiency can be enhanced by increasing the number of levels of the refractive index modulation in the diffractive optical element. It is theoretically predicted that an diffractive optical element with eight levels, for example, can provide a diffraction efficiency of 95%.

The beam-shaping element as shown in FIG. 24 can be fabricated by irradiating the Si—O containing hydrogenated carbon film with a energy beam by utilization of an appropriate mask, for example, as described above.

The diffraction-type beam-shaping element that can be obtained in the above-described way may preferably be used, for example, for a DLP projector for projecting an image by rapidly operating microscopically small mirrors, a projector such as a projection-type liquid crystal display device, and the like.

Figure 25:
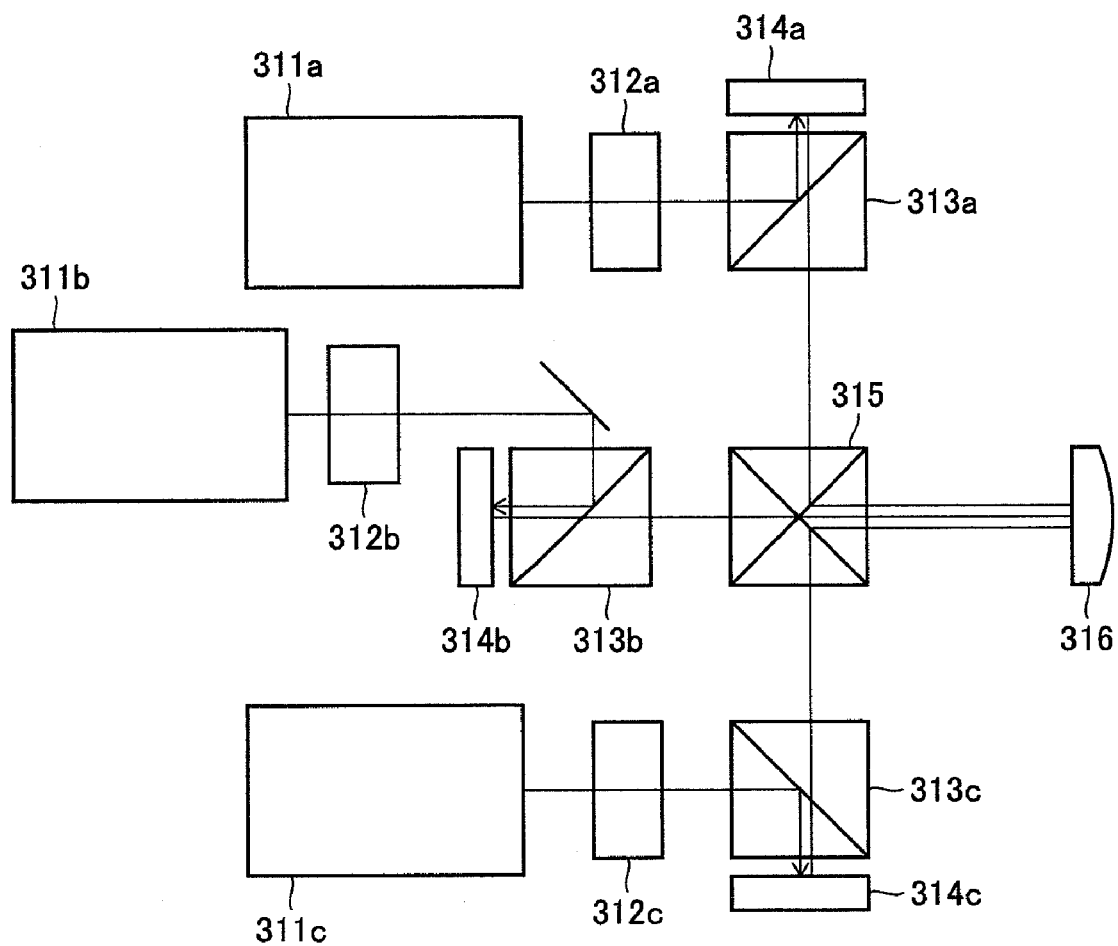
FIG. 25 is a schematic block diagram that shows an examplary color projector including a beam-shaping element of a diffraction-type according to the present invention.

FIG. 25 shows an example of a color projector including the diffraction-type beam-shaping element in Example 25 in a schematic block diagram. In this projector, beams having circular cross sections and respectively emitted from laser devices 311a, 311b, 311c for emitting red light, green light, and blue light, respectively, are converted by diffraction-type beam-shaping elements 312a, 312b, 312c of the present invention into respective beams each having a uniform intensity distribution in its rectangular cross section, and the resultant beams are applied via polarization beam splitters 313a, 313b, 313c onto reflection-type LCD panels 314a, 314b, 314c having rectangular display surfaces. The beams reflected from the respective LCD panels are passed through polarization beam splitters 313a, 313b, 313c, and thereafter combined by a color-combining prism 315 to be projected by a projector lens 16 onto a screen (not shown).

In other words, the beams emitted from laser devices 311a, 311b, 311c, respectively, are efficiently converted by diffraction-type beam-shaping elements 312a, 312b, 312c in Example 25 into respective beams each having a uniform intensity distribution in its rectangular cross section, and the beam as converted to have the rectangular cross section can irradiate the whole region of the rectangular LCD panel with uniform light intensity. Finally, the utilization efficiency of light energy from the light source can be improved while display with uniform brightness can be provided on the whole region of the rectangular screen. Namely, a high-quality image can be projected.

Regarding the refractive index modulated-type diffractive optical element, it has been confirmed by the inventors' simulation that dependency of the diffraction efficiency on light wavelength becomes small with increase in refractive-index difference Δn in the refractive index modulation. Specifically, since the Si—O containing hydrogenated carbon film can be used to fabricate the refractive index modulated-type beam-shaping element having a large refractive index difference Δn as in Example 25, it is possible to provide the beam-shaping element suitable for a color projector in which it is necessary to perform beam-shaping on lights such as red, green, and blue lights having wavelengths different from one another. More specifically, the preferable beam-shaping element of the present invention can provide the beam-shaping effect on visible light in a wide wavelength range of 0.4 to 0.7 µm.

While the laser device is used as a light source in the projector in FIG. 25, it goes without saying that a light-emitting diode or a lamp may be used instead of it. As such a lamp, it is possible to preferably use an extra-high-pressure mercury lamp, a xenon lamp, a halide lamp, and the like.

EXAMPLE 26

Example 26 in the present invention relates to a color liquid crystal display device including a holographic color filter having at least one of a spectroscopic function and a micro-lens function.

In recent years, various types of color liquid crystal display devices have been commercialized. One type of these color liquid crystal display devices is a color liquid crystal projector. Many types of color liquid crystal projectors include three liquid crystal panels. In other words, the three liquid crystal panels display a red (R) optical image, a green (G) optical image, and a blue (B) optical image, respectively, and these optical images of three colors are combined by an optical system and projected as a full color image onto a screen.

Such a three-panel-type color liquid crystal projector requires three expensive liquid crystal panels, and further requires many optical parts for separating and combining lights of three colors. In other words, three-panel-type color liquid crystal projector is expensive and is also difficult to be reduced in size.

In contrast, a single-panel-type color liquid crystal projector can be reduced in cost and size. An example of the single-panel-type color liquid crystal projector commercially available is a rear-projection TV (HV-D50LA1) available from Victor Company of Japan.

Figure 33:
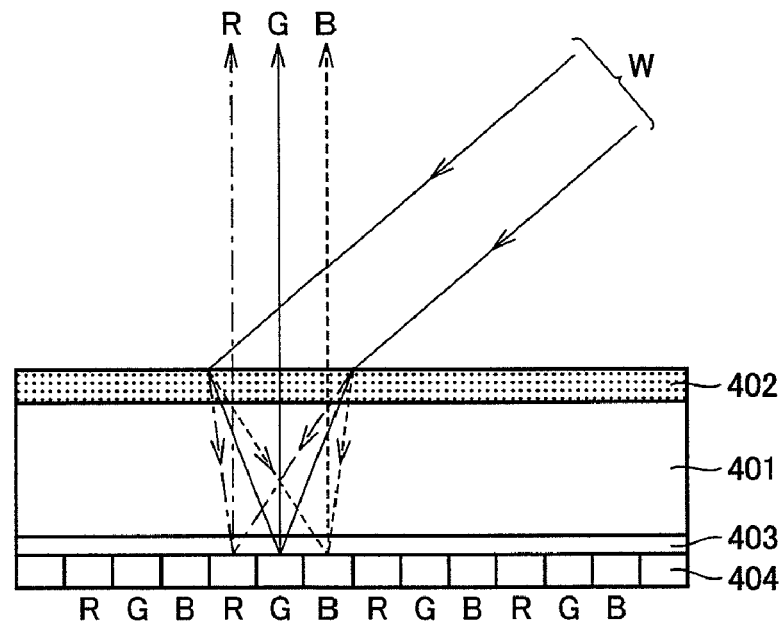
FIG. 33 is a schematic cross-sectional view that illustrates an optical basic principle of a single panel-type color liquid crystal projector according to the prior art technique.

FIG. 33 shows in a schematic cross-sectional view a basic optical principle of the single-panel-type color liquid crystal projector adopted by the HV-D50LA1 available from Victor Company of Japan. This color liquid crystal projector includes a holographic color filter made of a holographic film 402 formed on an upper surface of a glass substrate 401. A liquid crystal layer 403 is provided on a lower surface of glass substrate 401, and a reflection-type electrode layer 404 is provided on a lower surface of liquid crystal layer 403. Reflection-type electrode layer 404 includes reflection-type pixel electrodes for reflecting R, G, and B lights, and a set of R, G, and B reflection-type electrodes constitutes one pixel. In FIG. 33, a plurality of R electrodes are aligned in a direction orthogonal to the drawing, and a plurality of G electrodes and a plrualtiy of B electrodes are similarly aligned in the direction orthogonal to the drawing. Note that a transparent electrode (not shown) is provided between glass substrate 401 and liquid crystal layer 403 to face the R, G, and B electrodes.

In the color liquid crystal projector of FIG. 33, white light W from a light source (not shown) is applied to holographic film 402 at a prescribed incident angle. Holographic film 402 has a function of wavelength-separating (spectroscopically splitting) white light W by a diffraction effect into lights of red R, green G, and blue B, and a function as a microlens array that converges these lights onto the corresponding R, G, and B electrodes. Lights of red R, green G, and blue B reflected by the R, G, and B electrodes, respectively, transmit through holographic film 402 because these lights deviate from a diffraction condition of the holographic film 402, and are projected onto a screen by a projection lens (not shown).

Figure 34:
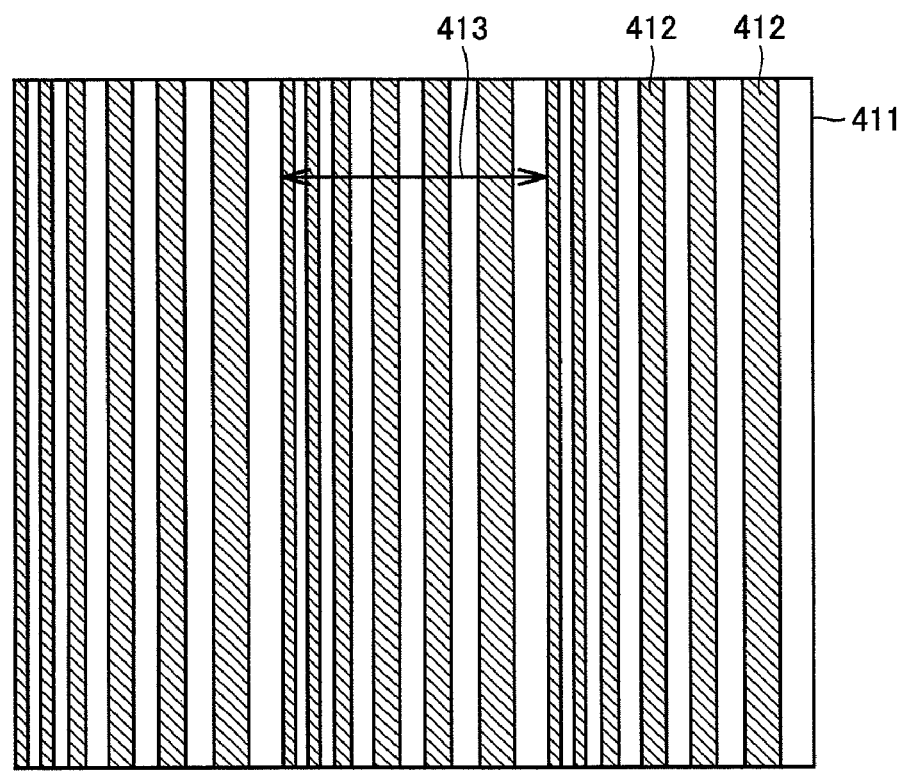
FIG. 34 is a schematic plan view that shows an examplary diffraction grating having not only a wavelength separation function but also a microlens function.

FIG. 34 is a schematic plan view that shows an example of a hologram (diffraction grating) having a spectroscopic function as well as a microlens array function. This diffraction grating includes a grating pattern formed on a glass substrate 411. The grating pattern includes a plurality of band-like regions 412 parallel to each other. Band-like regions 412 can be formed with, for example, a metallic film of chromium (Cr). Cr film 412 is of course non-transparent, and light can pass only through the gaps between the plurality of band-like Cr films 412.

In other words, the plurality of parallel band-like Cr film regions 412 function as a diffraction grating, and light is diffracted in a direction orthogonal to the longitudinal direction of the band-like Cr films 412. Since the diffraction angle depends on a wavelength as well known, the R, G, and B lights are diffracted at diffraction angles different from one another, which enables color separation of white light W.

Further, the diffraction grating in FIG. 34 is characterized in that the widths of band-like Cr film regions 412 and intervals therebetween are changed periodically. This is for the purpose of providing the diffraction grating with a microlens array effect. That is, the diffraction angle at the same wavelength increases as the interval of the diffraction grating decreases, as well known. Thus, it is possible to cause the lens effect by gradually changing the intervals of the diffraction grating.

In the diffraction grating in FIG. 34, light is diffracted only in the direction orthogonal to the longitudinal direction of the band-like Cr films 412, as described above. As such, the lens effect is caused only in that orthogonal direction, so that it functions like a columnar lens having a line focus. If desired, it is of course possible to use a diffraction grating analogous to a well-known Fresnel zone plate to cause an effect of a circular lens or square lens having a point focus.

The diffraction grating in FIG. 34 functions as if it included a plurality of columnar microlenses parallel to each other, with the region indicated by an arrow 413 serving as a single columnar microlens. In a single columnar microlens region 413, the widths of band-like Cr films 412 and the intervals therebetween are decreased on the left side compared to the right side. That is, in the diffraction grating in FIG. 34, the widths and intervals of band-like Cr films 412 are changed periodically in coincidence with the periodicity of columnar microlens regions 413.

In the case of directly using the diffraction grating as shown in FIG. 34 instead of holographic film 402 in the color liquid crystal projector in FIG. 33, the utilization efficiency of white light W from the light source decreases, because band-like Cr film 412 does not allow light to transmit therethrough. Further, in the diffraction grating in FIG. 34, the pitch of band-like Cr film regions 412 is very small. At the central part of region 413, for example, the pitch is approximately 0.5 μm or less. Thus, the diffraction grating as shown in FIG. 34 needs to be fabricated by electron beam drawing that is not suitable for industrial mass production.

In the color liquid crystal projector in FIG. 33, therefore, light is applied to a photopolymer film on a glass substrate through a master diffraction grating, and the photopolymer film irradiated with the light is subjected to heat treatment to thereby fabricate holographic film 402. At that time, a region irradiated with light of higher intensity achieves a higher refractive index n. In other words, holographic film 402 made of a photopolymer has its refractive index n modulated, and serves as a refractive index modulated-type diffraction grating.

Figure 35:
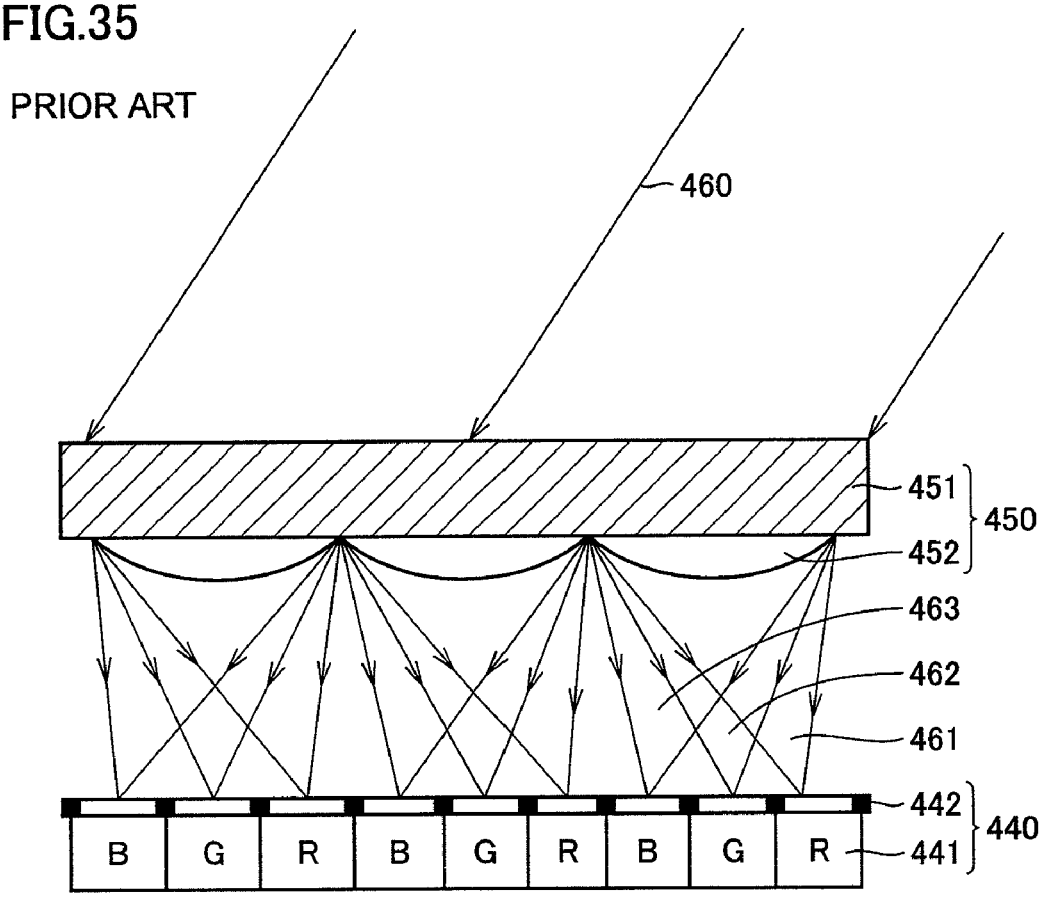
FIG. 35 is a schematic cross-sectional view that shows a color liquid crystal display device according to the prior art technique.

FIG. 35 is a schematic cross-sectional view that shows a color liquid crystal display device disclosed in Patent Document 11 of Japanese Patent Laying-Open No. 10-96807. This color liquid crystal display device includes a well-known light transmission-type liquid crystal panel 440. Liquid crystal panel 440 includes a liquid crystal display layer 441 and a black matrix 442. Liquid crystal display layer 441 includes a plurality of pixels, and each pixel includes a set of a red display region R, a green display region G, and a blue display region B. A boundary between any two of the color display regions is covered with black matrix 442.

A holographic color filter 450 is disposed on a rear surface side of liquid crystal panel 440. Holographic color filter 450 includes a holographic plate 451 and an array of a plurality of microlenses 452. Microlenses 452 are disposed in an array at periodicity corresponding to the periodicity of pixels in liquid crystal panel 440. Further, holographic plate 451 is formed of a silica glass plate including parallel uniform grooves serving as a diffraction grating.

In the color liquid crystal display device in FIG. 35, when backlight 460 is directed to holographic color filter 450, the light is diffracted at different angles depending on the wavelength and is spectroscopically split into red light 461, green light 462, and blue light 463, which appear on an emitted side of holographic plate 451. With microlens 452 disposed adjacent to holographic plate 451, the spectroscopically-split lights are separated for each wavelength and converged onto a focal plane of microlens 452. More specifically, color filter 450 is configured and disposed such that red light 461, green light 462, and the blue light are respectively diffracted and converged onto a red display region R, a green display region G, and a blue display region B, respectively, in a pixel. The lights having the respective color components thereby pass through respective liquid crystal cells almost without being attenuated by black matrix 442, so that the colors of the liquid crystal cells can be displayed, respectively.

In such a color liquid crystal display device, since a transmission-type holographic plate not converging light and having its diffraction efficiency less dependent on wavelength is used as holographic plate 451, it is not necessary to align holographic plate 451 with the arrangement periodicity of microlens 452. Further, in contrast to the case that one microlens is disposed for each color display region, one microlens 452 is disposed for one pixel, so that the arrangement periodicity becomes triple, leading to ease of production and alignment of the microlens array.

Figure 36:
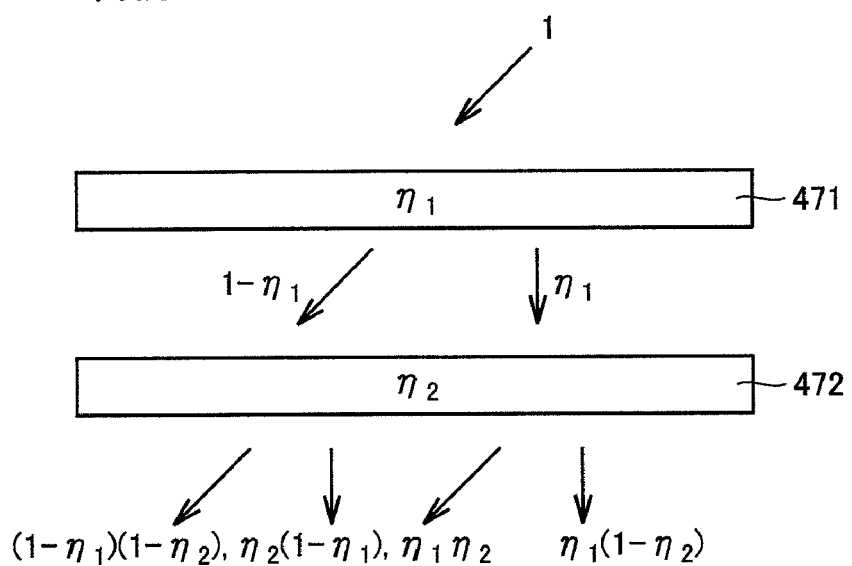
FIG. 36 is a schematic cross-sectional view that illustrates a holographic color filter according to the prior art technique.

FIG. 36 is a cross-sectional view that schematically illustrates a holographic color filter disclosed in Non-Patent Document 7 of ITE Technical Report Vol. 20, 1996, pp. 69-72. This holographic color filter includes two holographic films 471, 472 to improve the intensity balance among the red, green and blue lights.

In general, with a holographic film, there is a wavelength of light that is most efficiently diffracted by the holographic film. That is, a holographic film has its highest diffraction efficiency for light of a specific wavelength, and the diffraction efficiency tends to be lowered as the wavelength difference from the specific wavelength increases. Particularly, in the case that the refractive index difference $\Delta n$ is small in the refractive index modulated-type holographic film, such dependency of the diffraction efficiency on wavelength tends to be significant. For example, with the refractive index difference $\Delta n$ of 0.08 or less as in the case of a holographic film of a photopolymer, it is difficult to obtain a holographic film having small dependency of the diffraction efficiency on wavelength.

Thus, when a holographic film is used to spectroscopically split white light into red, green, and blue lights, the holographic film is designed such that the highest diffraction efficiency can be obtained with the green light which corresponds to an intermediate wavelength region among the red, green, and blue lights. The holographic film designed in this manner has a lower diffraction efficiency for the red and blue lights compared to that for the green light, and thus the red and blue lights spectroscopically split by the holographic film have their intensities lower than that of the green light. Therefore, even if the spectroscopically split red, green, and blue lights are recombined to obtain white light, the combined light tends to be greenish white light.

Further, a metal halide lamp or an extra-high-pressure mercury lamp utilized as a backlight of the color liquid crystal display device includes a strong emission line in a wavelength range of the green light. Therefore, when the light from the metal halide lamp or the extra-high-pressure mercury lamp is spectroscopically split with use of the holographic film designed to obtain the highest diffraction efficiency for the green light, the intensity of the green light, among the spectroscopically split red, green, and blue lights, tends to be more significant.

The holographic color filter in FIG. 36 includes two holographic films 471, 472 in order to solve such a problem of non-uniformity of the diffraction efficiency depending on the wavelength, to thereby improve the color balance of the color liquid crystal display device. First holographic film 471 has a diffraction efficiency of $\eta_1$ for light of a specific wavelength $\lambda$, while second holographic film 472 has a diffraction efficiency of $\eta_2$ for light of that wavelength $\lambda$. Herein, it is defined that the diffraction efficiency is 1 when all the incident light is diffracted and it is 0 when all the incident light is transmitted without being diffracted.

When the incident light of intensity 1 having specific wavelength $\lambda$ passes through first holographic film 471, the intensity ratio between the transmitted light and the diffracted light becomes $(1-\eta_1): \eta_1$. When the transmitted light having passed through first holographic film 471 passes through second holographic film 472, the intensity ratio between the transmitted light (parallel to the direction of the original incident light) and the diffracted light (parallel to the diffraction direction by first holographic film 471) becomes $(1-\eta_1)(1-\eta_2): \eta_2(1-\eta_1)$, When the diffracted light having passed through first holographic film 471 passes through second holographic film 472, the intensity ratio between the diffracted light (parallel to the direction of the original incident light) and the transmitted light (parallel to the diffraction direction by first holographic film 471) becomes $\eta_1\eta_2: \eta_1(1-\eta_2)$. As such, the light having passed through two holographic films 471, 472 in the diffraction direction has the intensity of $\eta_2(1-\eta_1)+\eta_1(1-\eta_2)=\eta_1+\eta_2-2\eta_1\eta_2$.

Figure 37:
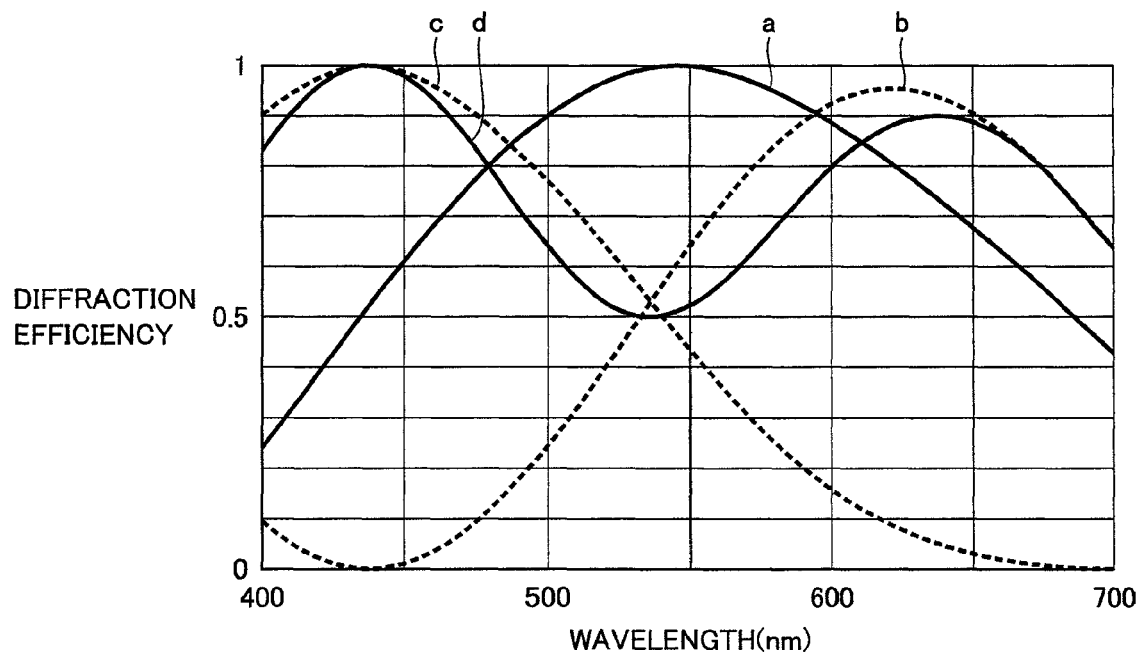
FIG. 37 is a graph that schematically shows dependency of the diffraction efficiency on wavelength in the holographic color filter shown in FIG. 36.

FIG. 37 shows an example of a result of computer simulation concerning a holographic color filter including such two holographic films as shown in FIG. 36. Specifically, in the graph in FIG. 37, a horizontal axis shows the wavelength (nm) of light, and a vertical axis shows the diffraction efficiency of the holographic films.

A curved line a shows an example of a diffraction efficiency of a holographic color filter made of a single holographic film. This single holographic film a is designed such that the diffraction efficiency becomes maximum for the green light corresponding to the intermediate wavelength between the red and blue lights. Thus, after white light is spectroscopically split by holographic film a, the intensities of red and blue lights tend to be lower than that of the green light.

In contrast, a holographic film b is designed such that the diffraction efficiency becomes maximum for the red light, and a holographic film c is designed such that the diffraction efficiency becomes maximum for the blue light. The holographic color filter having these two holographic films b and c has such a combined diffraction efficiency as shown by a curved line d. That is, holographic color filter d has a higher diffraction efficiency for the red and blue lights compared to the green light, and is sometimes called a two-peak holographic color filter because it has two peaks in diffraction efficiency.

Figure 38:
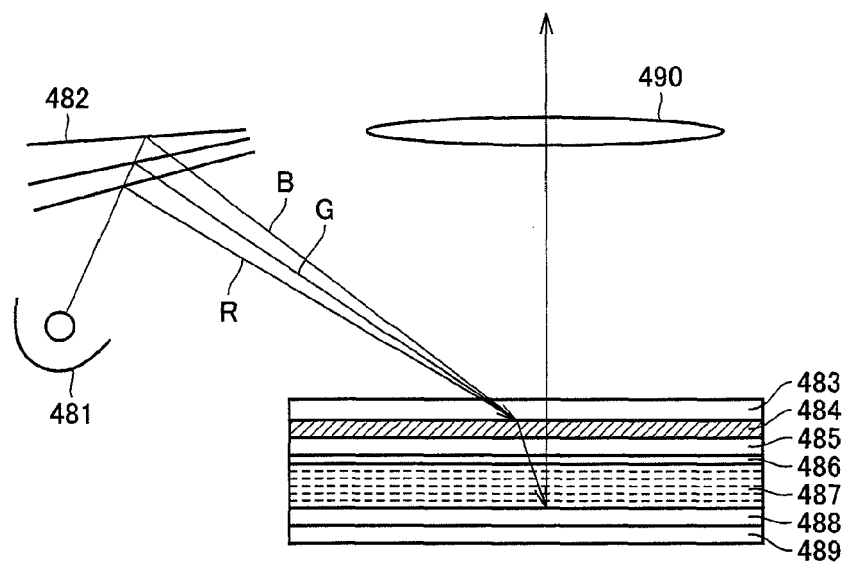
FIG. 38 is a schematic cross-sectional view that illustrates a color liquid crystal projector according to the prior art technique.

FIG. 38 is a schematic cross-sectional view that shows a color liquid crystal projector disclosed in Patent Document 12 of Japanese Patent Laying-Open No. 2000-235179. This color liquid crystal display device includes a white light source 481, three dichroic mirrors 482, a glass substrate 483, a holographic lens layer 484 of a photopolymer, a thin glass plate layer 485, a transparent electrode 486, a liquid crystal layer 487, a pixel electrode 488, an active matrix drive circuit 489, and a projection lens 490.

In the color liquid crystal projector of FIG. 38, white light emitted from white light source 481 is spectroscopically split, by three dichroic mirrors 482, into lights of three primary colors of R, G, and B. The spectroscopically split R, G, and B lights are projected onto holographic lens layer 484 at incident angles different from one another such that respective lights are converged with the highest diffraction efficiency.

As described above, in a holographic film of a photopolymer, refractive index change Δn can only be increased up to approximately 0.08 by light irradiation. As is well known, in the refractive index modulated-type diffraction grating, larger refractive index difference Δn in refractive index modulation can cause higher diffraction efficiency (light utilization efficiency). Further, larger refractive index difference Δn can cause smaller dependency of the diffraction efficiency on wavelength. Here, refractive index difference Δn of approximately 0.08 cannot be said as being sufficient, and thus it is difficult to increase the diffraction efficiency of the holographic film of a photopolymer.

In recent years, high brightness is demanded in the color liquid crystal projector, and accordingly, optical parts included in the projector are required to have heat resistance at a temperature of approximately 80-100° C. or higher. However, heat resistance of the photopolymer cannot be said as being sufficient, and if the photopolymer undergoes repetitive thermal history between the room temperature and a temperature of about 100° C., the holographic film itself of a photopolymer may be deteriorated or peel off the glass substrate.

Further, as disclosed in Patent Document 11, a holographic plate made of silica glass and having a plurality of fine grooves must be fabricated one by one through electron beam lithography and etching, and thus is not suitable for industrial mass production.

In view of such circumstances, Patent Document 13 of Pamphlet of WO2005/088364 discloses a color liquid crystal display device including a holographic color filter utilizing a DLC film so as to provide a color liquid crystal display device that includes a holographic color filter having its improved light utilization efficiency and heat resistance, has high brightness, and has improved color balance.

As described above, however, when the DLC film is irradiated with the energy beam to increase the refractive index, the extinction coefficient is also increased accordingly. In the case of irradiating the DLC film with ultraviolet light, for example, to increase the refractive index, if the extinction coefficient increases as the refractive index increases, it becomes difficult to uniformly increase the refractive index in the film thickness direction. In a holographic film having such a non-uniform refractive index distribution in the film thickness direction, there is caused an unpreferable effect such as decrease in diffraction efficiency. Further, the high extinction coefficient in the high-refractive-index region means that light is less likely to transmit through the relevant region, and this is not also preferable from the viewpoint of the diffraction efficiency.

Therefore, Example 26 provides a color liquid crystal display device that includes a holographic color filter fabricated by utilization of the Si—O containing hydrogenated carbon film having superior properties as compared with the DLC film.

Figure 27:
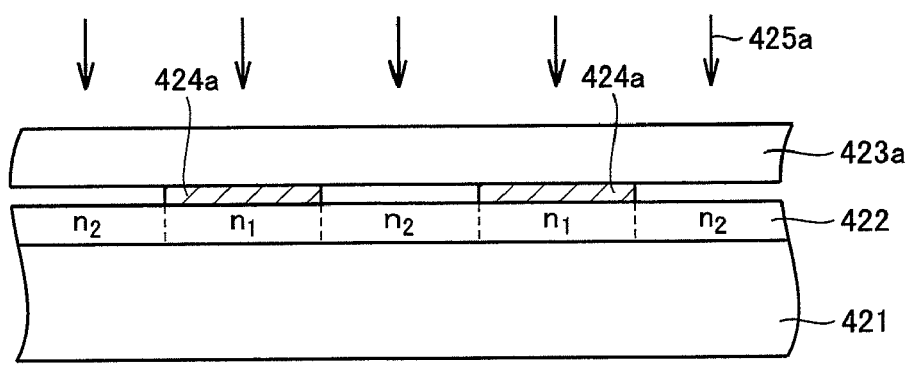
FIG. 27 is a schematic cross-sectional view that illustrates an examplary method for fabricating a holographic film included in a color liquid crystal display device according to the present invention.

FIG. 27, which is similar to FIG. 12, shows an example of a method for fabricating a holographic film utilizing the Si—O containing hydrogenated carbon film in Example 26. Such a holographic film of the Si—O containing hydrogenated carbon film can preferably be substituted for any of holographic film 402 of a photopolymer in the color liquid crystal projector in FIG. 33, holographic plate 451 of silica glass in the color liquid crystal display device in FIG. 35, holographic films 471, 472 of a photopolymer in FIG. 36, and holographic film 484 of a photopolymer in the color liquid crystal projector in FIG. 38.

In the method for fabricating the holographic film in FIG. 27, an Si—O containing hydrogenated carbon film 422 is formed by plasma CVD on a silica ($SiO_2$) glass substrate 421, for example, similarly as in the case of FIG. 12. A mask 424a formed on a silica glass substrate 423a is superposed on Si—O containing hydrogenated carbon film 422. Although mask 424a can be formed of one of various materials, a gold (Au) film can be used more preferably because gold is easy to process with high precision and excellent in blocking the energy beam and does not cause problems of oxidation and corrosion. Gold mask 424a can be fabricated in, for example, the following manner.

Firstly, a gold film of about 0.5 μm thickness is deposited on a glass substrate by the well-known sputtering or EB (electron beam) evaporation method, and a resist layer is applied thereon. The resist layer is patterned by exposure to light in a stepper. The gold film is patterned by dry etching with the resist pattern. The resist pattern is then removed to obtain a gold mask pattern.

Alternatively, an Ni conductive layer of about 50 nm or less thickness may firstly be deposited on a glass substrate by a sputtering or EB evaporation method, and a resist pattern may be formed thereon. A gold film of about 0.5 μm thickness is deposited on the Ni layer by electroplating with the resist pattern and then the resist can be removed to obtain a gold mask.

The gold mask formed in either way as above has a pattern corresponding to the diffraction grating pattern for a holographic effect. Note that FIG. 27 shows that band-like gold film 424a has a constant width and interval for the sake of simplicity and clarity of the drawing.

As shown in FIG. 27, in a state that gold film mask 424a is superposed on Si—O containing hydrogenated carbon film 422, Si—O containing hydrogenated carbon film 422 is irradiated with UV light 425a from above. As a result, regions in Si—O containing hydrogenated carbon film 422 that are covered with gold mask 424a and not irradiated with UV light 425a undergo no refractive index change, maintaining the original refractive index $n_1$ of the film as deposited by plasma CVD. On the other hand, the other regions in Si—O containing hydrogenated carbon film 422 that are not covered with gold mask 424a and thus irradiated with UV light 425a undergo refractive index change, and its refractive index is decreased to $n_2$. After the irradiation with UV light, silica glass substrate 423a and gold mask 424a are removed from holographic film 422. Holographic film 422 thus obtained includes two values of refractive indices of $n_1$ and $n_2$, and serves as a two-level refractive index modulated-type diffraction grating.

Comparison is now made between holographic film 422 shown in FIG. 27 and the diffraction grating shown in FIG. 34. In the diffraction grating of FIG. 34, light blocked by Cr film 412 cannot be utilized as diffracted light, causing decrease in light utilization efficiency. In holographic film 422 shown in FIG. 27, on the other hand, both of light having passed through the regions of high refractive index $n_1$ and light having passed through the regions of low refractive index $n_2$ can be utilized as diffracted light, resulting in a high light utilization efficiency.

In contrast, each of holographic films 42, 471, 472, 484 made of a photopolymer in FIGS. 33, 36, and 38 serves as a refractive index modulated-type diffraction grating that includes a low-refractive-index region and a high-refractiveindex region, similarly as in holographic film 422 of the Si—O containing hydrogenated carbon film in FIG. 27. Therefore, in the holographic film of a photopolymer as well, both of light having passed through the region of a low refractive index and light having passed through the region of a high refractive index can be utilized as diffracted light. As described above, however, refractive index difference Δn that can be achieved by irradiating the photopolymer film with light irradiation is at most approximately 0.08, whereas refractive index difference Δn that can be achieved by irradiating the Si—O containing hydrogenated carbon film with UV light irradiation can reach approximately 0.2. Therefore, holographic film 422 of the Si—O containing hydrogenated carbon film in FIG. 27 can achieve a diffraction efficiency significantly higher than that of the holographic film of a photopolymer, and can improve the light utilization efficiency. Further, in the holographic film of the Si—O containing hydrogenated carbon film that can increase refractive index difference Δn, the dependency of diffraction efficiency on wavelength can be decreased.

Figure 28:
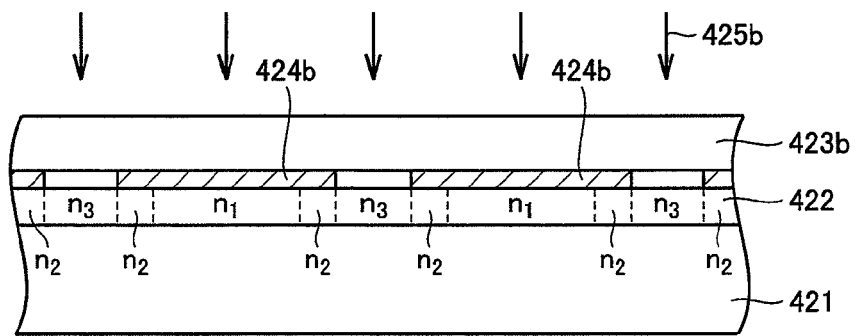
FIG. 28 is a schematic cross-sectional view that shows another example of the method for fabricating the holographic film included in the color liquid crystal display device according to the present invention.

FIG. 28 illustrates, in a schematic cross-sectional view, another method for fabricating a holographic film using an Si—O containing hydrogenated carbon film in Example 26. In FIG. 28, a second gold mask 424b formed on a silica glass substrate 423a is further superposed on holographic film 422 that was formed in a similar manner as in FIG. 27 and includes the two-level refractive index modulation of $n_1$ and $n_2$. In this state, UV light irradiation 425b is carried out again.

At this time, second gold mask 424b has openings, each of which allows UV light to be applied to only a selected partial region within the region of low refractive index $n_2$ in the holographic film formed in the process shown in FIG. 27. Thus, after irradiation with UV light 425b, the refractive index in the selected partial region within the region of relatively low refractive index $n_2$ in the Si—O containing hydrogenated carbon film 422 is further decreased to $n_3$. That is, holographic film 422 fabricated in FIG. 28 serves as a diffraction grating including three levels of refractive index modulation of $n_1$, $n_2$, and $n_3$.

As described above, it is possible to obtain a holographic film including desired multi-level refractive index modulation, by repeatedly irradiating an Si—O containing hydrogenated carbon film with UV light while successively using masks having partially modified patterns. Compared with a two-level refractive index modulated-type diffraction grating, a multi-level refractive index modulated-type diffraction grating can produce a higher diffraction efficiency as well known, whereby the light utilization efficiency can further be improved.

Figure 29:
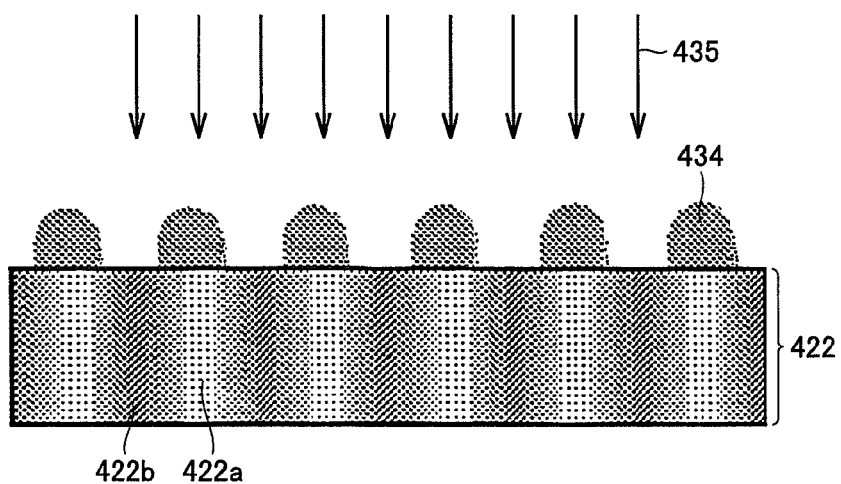
FIG. 29 is a schematic cross-sectional view that illustrates still another example of the method for fabricating the holographic film included in the color liquid crystal display device according to the present invention.

FIG. 29 illustrates, in a schematic cross-sectional view, still another method for fabricating a holographic film using an Si—O containing hydrogenated carbon film in Example 26. In this fabrication method, a gold mask 434 is formed on Si—O containing hydrogenated carbon film 422 formed on a silica glass substrate (not shown). This gold mask 424a can also be formed by electron beam drawing, and has a prescribed holographic (diffraction grating) pattern. Note that FIG. 29 also shows that band-like gold film 434 has a constant width and interval for the sake of simplicity and clarity of the drawing.

Here, the band-like gold film 434 is characterized in that its upper surface is formed as a semi-cylindrical surface. Such a semi-cylindrical surface may be formed, for example, by etching or nanoimprint (die transfer).

Si—O containing hydrogenated carbon film 422 is irradiated with He ions 435, for example, through gold mask 434 thus formed. Since each band-like gold film 434 has the upper surface of semi-cylindrical shape, a part of He ions can penetrate the mask in the vicinity of the side surface of each band-like gold film 434, and can enter Si—O containing hydrogenated carbon film 422. As a result, in Si—O containing hydrogenated carbon film 422 shown in FIG. 29, the refractive index changes continuously in the vicinity of the interface between a high-refractive-index region 422a and a low-refractive-index region 422b. After such modification of the refractive index of the Si—O containing hydrogenated carbon film by ion beam irradiation, gold mask 434 can be resolved and removed by being immersed in a cyan-based etchant for gold at a room temperature for about several minutes.

As described above, in a multi-level refractive index modulated-type diffraction grating, the higher the number of levels is made, the more the diffraction efficiency is improved. The refractive index modulated-type diffraction grating having its refractive index continuously modulated corresponds to one having infinite levels of refractive index modulation. That is, the holographic film obtained in FIG. 29 has a diffraction efficiency further improved than in the case of FIG. 28, and thus can further improve the light utilization efficiency.

Figure 30:
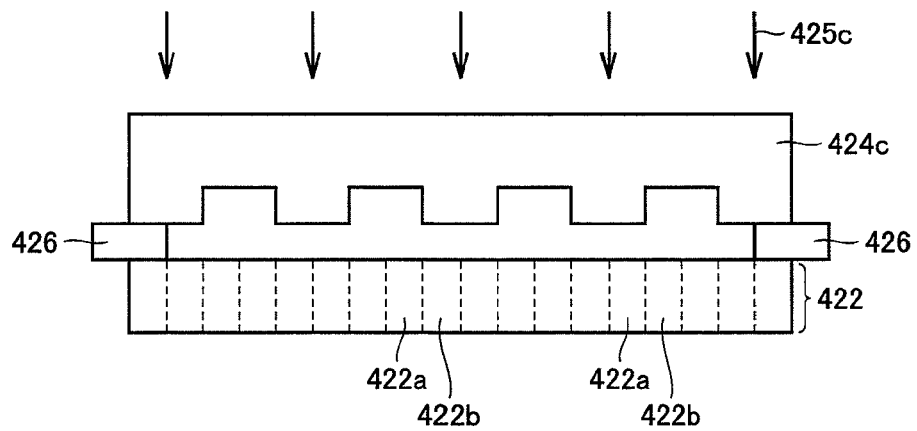
FIG. 30 is a schematic cross-sectional view that illustrates a further example of the method for fabricating the holographic film included in the color liquid crystal display device according to the present invention.

FIG. 30 illustrates, in a schematic cross-sectional view, a further method for fabricating a holographic film using the Si—O containing hydrogenated carbon film in Example 26. In this fabrication method, a relief-type phase grating mask (diffraction grating) 424c made of glass is disposed in the proximity of Si—O containing hydrogenated carbon film 422, with a spacer 426 of 100 μm thickness, for example, interposed therebetween. In this state, irradiation with KrF laser light (wavelength of 248 nm) 425c at an energy density of 16 mW/mm² for one hour, for example, makes it possible to fabricate the holographic film. At this time, the refractive index is decreased in regions 422b exposed to the resultant light of interference between the +1st order diffracted light and the −1st order diffracted light emerging from phase grating mask 424c. In regions 422a not exposed to the resultant interference light, on the other hand, the refractive index is maintained in the original state of the film.

In this case, the resultant light of interference between the +1st order diffracted light and the −1st order diffracted light appears at periodicity corresponding to half the periodicity of concavities and convexities of relief-type phase grating mask 424c. As such, it is possible to use relief-type phase grating mask 424c formed at the periodicity of concavities and convexities twice the desired periodicity of low-refractive-index regions 422b in the Si—O containing hydrogenated carbon film. Further, the intensity of the interference light is higher at a position nearer to the center in a width of low-refractive-index region 422b. Thus, in Si—O containing hydrogenated carbon film 422 in FIG. 30 as well, the refractive index changes continuously in the vicinity of the interface between high-refractive-index region 422a and low-refractive-index region 422b, whereby it is possible to obtain a high diffraction efficiency, similarly as in the case of FIG. 29. If desired, relief-type phase grating mask 424c may be replaced with an amplitude-type phase grating mask that can be formed by patterning a chromium film, a chromium oxide film, an aluminum film, or the like.

Further, while the case that the boundary region between the high and low-refractive-index regions is parallel to the film thickness direction has been shown by way of example in the method for fabricating the holographic film in FIGS. 27 to 30, the boundary region may of course be tilted with respect to the film thickness direction, if desired. To this end, in the fabrication method shown in FIGS. 27 to 29, for example, an energy beam may be directed at an oblique angle to the surface of the Si—O containing hydrogenated carbon film.

Further, in the fabrication method shown in FIG. 30 as well, ultraviolet light 425c may be directed at an oblique angle to the surface of the Si—O containing hydrogenated carbon film to make use of exposure to resultant light of interference between the 0th order diffracted light and the +1st or −1st order diffracted light. The resultant light of interference between the 0th order diffracted light and the +1st or −1st order diffracted light, however, appears at the same periodicity as that of concavities and convexities of phase grating mask 424c. Thus, it is necessary to use a phase grating mask 424c having concavities and convexities formed at the same periodicity as a desired periodicity of low-refractive-index regions 422b in the Si—O containing hydrogenated carbon film.

Figure 31:
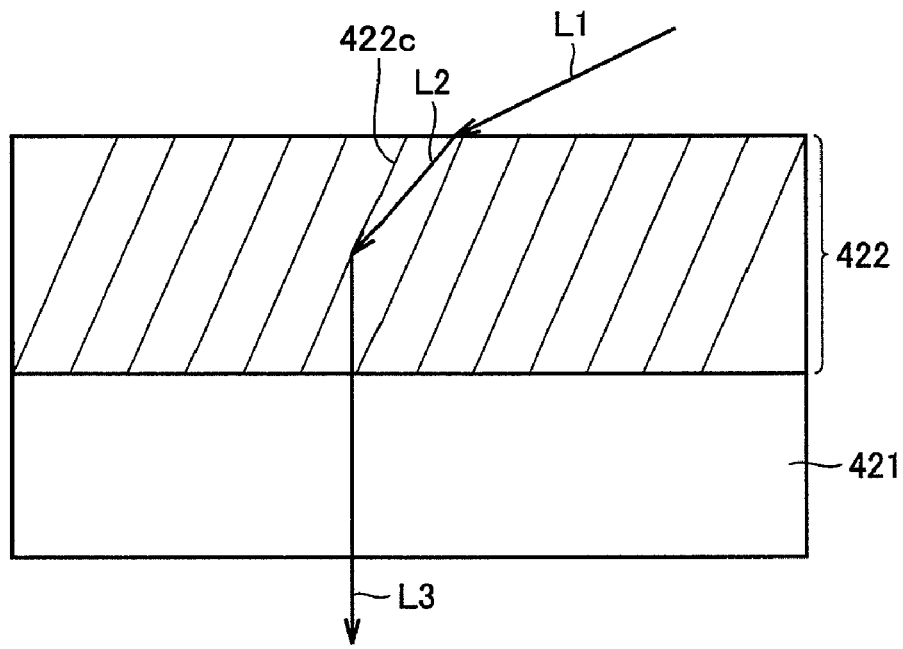
FIG. 31 is a schematic cross-sectional view that shows an example of diffraction caused by Bragg reflection in a holographic color filter in which a boundary between the high-refractive-index region and the low-refractive-index region is tilted with respect to a thickness direction of the Si—O containing hydrogenated carbon film.

A schematic cross-sectional view in FIG. 31 shows an example of the case that a boundary region between the high-refractive-index region and the low-refractive-index region is preferably tilted with respect to the film thickness direction. Specifically, in holographic film 422 formed on glass substrate 421, a boundary region 422c between the high-refractive-index region and the low-refractive-index region is tilted with respect to the film thickness direction. In this case, incident light L1, for example, is refracted when being directed into Si—O containing hydrogenated carbon film 422 and turns into light L2, and then further turns into light L3, which is diffracted in boundary region 422c between the high-refractive-index region and the low-refractive-index region with a high efficiency at a prescribed Bragg reflection angle θ. Since boundary region 422c is tilted with respect to the thickness direction of the Si—O containing hydrogenated carbon film, this diffracted light L3 can be emitted in a direction orthogonal to the Si—O containing hydrogenated carbon film. That is, diffracted light L3 can be directed orthogonally, for example, to the surface of the liquid crystal panel with a high efficiency.

Figure 32:
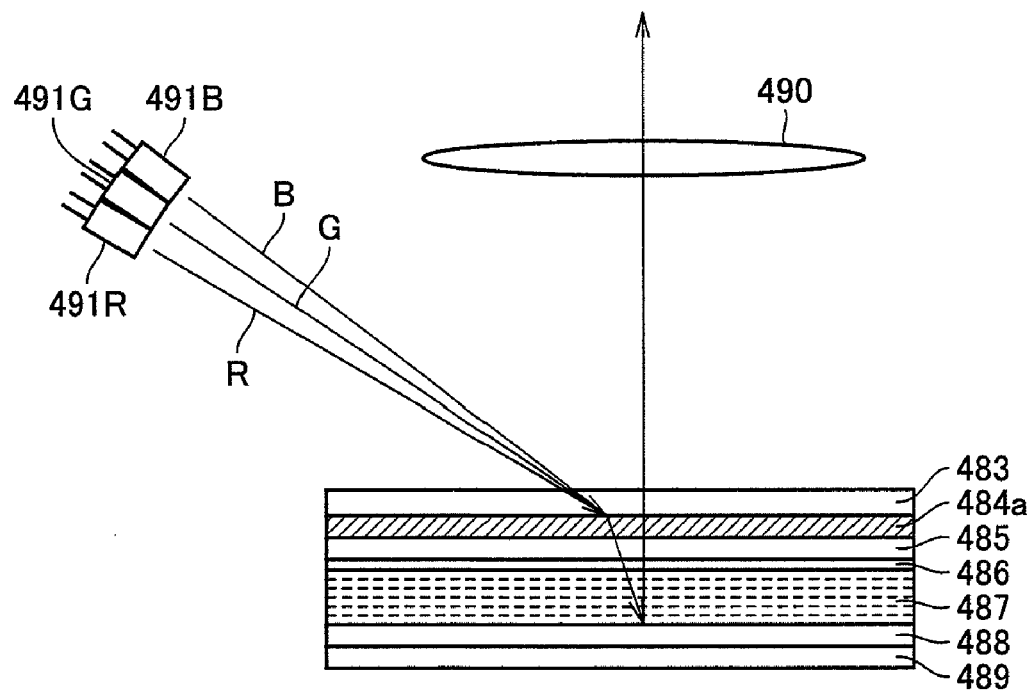
FIG. 32 is a schematic cross-sectional view that illustrates an examplary color liquid crystal projector according to the present invention.

The schematic cross-sectional view of FIG. 32, which is similar to that in FIG. 38, shows an example of a color liquid crystal projector in Example 26. The color liquid crystal projector of FIG. 32 is similar to the one of FIG. 38, except that holographic film 484 of a photopolymer film is replaced with a holographic film 484a of an Si—O containing hydrogenated carbon film, and that white light source 481 and dichroic mirror 482 are replaced with a blue light-emitting element 491B, a green light-emitting element 491G, and a red light-emitting element 491R. As an element for emitting light of each of the three primary colors, a light-emitting diode (LED) or a semiconductor laser (LD) can preferably be used. In this case, lights of respective colors are spectroscopically split at diffraction angles corresponding to their respective wavelengths.

The semiconductor light-emitting elements can emit lights of three primary colors having higher purity, in comparison with lights of three primary colors obtained by spectroscopically splitting white light with use of a dichroic mirror. It is possible to dispose these semiconductor light-emitting elements such that lights of respective three primary colors are directed to holographic film 484a at particular angles that can achieve the highest diffraction efficiency for the respective wavelengths of these lights. Therefore, a bright full-color projected image having high color purity and excellent in color rendering properties can be obtained with the color liquid crystal projector of FIG. 32.

Although the reflection-type color liquid crystal projectors have been explained in conjunction with FIGS. 32, 33, and 38 in the above-described description, it goes without saying that the holographic film made of an Si—O containing hydrogenated carbon film in Example 26 is also applicable to the transmission-type color liquid crystal projector. For example, it will be understood that, in view of a partial difference between the reflection-type color liquid crystal projector of FIG. 33 and the transmission-type color liquid crystal projector, the reflection-type one can be modified to the transmission-type one by replacing reflection-type electrode layer 404 with a transparent electrode layer. In that case, it is not necessary to extract light to be projected through the holographic film, so that light from the light source can also be applied from directly behind the holographic film. In that case, within a refractive-index-modulated region in the holographic film which corresponds to a single microlens region 413 in the diffraction grating pattern shown in FIG. 34, widths and intervals of the high (or low)-refractive-index regions in the opposite side parts may further be decreased than those in the central part. Further, it is of course possible to preferably apply the holographic film of an Si—O containing hydrogenated carbon film in the present invention, not only to a projector-type display device but also to a generally-used color liquid crystal display device as shown in FIG. 35. Furthermore, as the light source for the color liquid crystal projector or color liquid crystal display device to which the present invention can be applied, it is possible to preferably use a metal halide lamp, an extra-high-pressure mercury lamp, a cold cathode-ray tube, a xenon lamp, a light-emitting diode, a semiconductor laser, an Ar laser, an He—Ne laser, and a YAG (yttrium aluminum garnet) laser, and the like.

EXAMPLE 27

Example 27 in the present invention relates to an optical pickup device for at least one of recording and reproducing of information on an optical information record medium. In the optical pickup device used for recording and/or reproducing of information on an optical information record medium such as a CD or a DVD, a light beam from a light source is converged onto a record surface of the optical information record medium, and light reflected from the information record surface is converged onto a light-receiving unit. To this end, the optical pickup device uses various optical elements such as a light-emitting element, a polarization beam splitter, a quarter-wavelength plate, an objective lens, a focusing lens, and a light-receiving element (e.g., see Patent Document 14 of Japanese Patent Laying-Open No. 2003-66324).

In the optical pickup device disclosed in Patent Document 14, a relief-type (film thickness modulated-type) diffraction grating is used as optical elements such as a polarization beam splitter, a quarter-wavelength plate, an objective lens, and a focusing lens. For the objective lens, there is used a relief-type diffraction lens as shown in the schematic cross-sectional view of FIG. 41.

Figure 41:
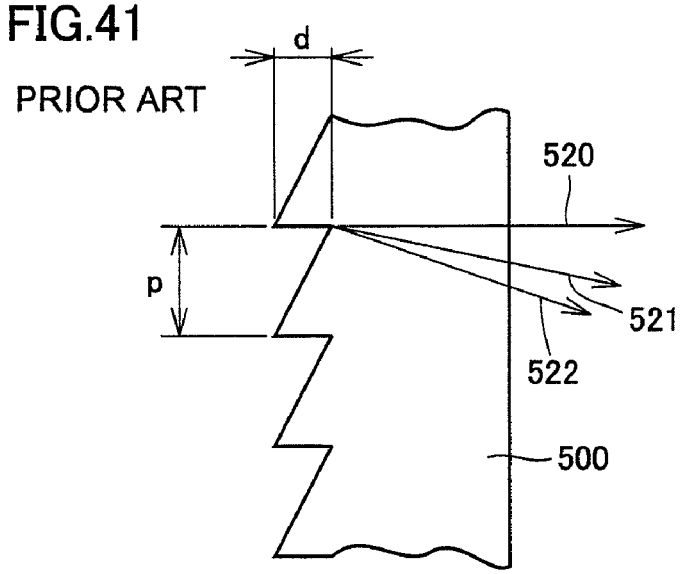
FIG. 41 is a schematic cross-sectional view that shows an examplary relief-type lens used in a conventional optical pickup device.

The relief-type diffraction lens of FIG. 41 includes a serrated relief having a pitch p and a height d. Specifically, this lens has its lens film thickness regularly modulated in a concentric manner, and allows incident light 520 to be diffracted (e.g., into 1st order diffracted light 521, 2nd order diffracted light 522, and the like) and converged as in the case of a convex lens. Therefore, a fabrication process of the relief-type diffraction lens is difficult, and there arise a problem of not being able to superposing another member on the lens, and other problems.

Further, the conventional polarization beam splitter is formed of two microprisms and has a thickness of at least 3 mm, so that further reduction in size is difficult. In addition, the conventional quarter-wavelength plate uses a quartz plate having a thickness of at least 0.5 mm, and thus further reduction in size is difficult. In other words, reduction in size and/or integration of the conventional optical elements that form an optical pickup device are/is limited, and thus reduction in size of the optical pickup device is difficult.

In view of the problems in such a conventional optical pickup device, Patent Document 15 of Japanese Patent Laying-Open No. 2006-53992 discloses an optical pickup device that includes a refraction-type optical element or refractive index modulated-type diffractive optical element that utilizes a DLC film.

Although the refractive index of the DLC film can be increased by irradiation with an ultraviolet ray or the like, an extinction coefficient tends to increase with the increase in refractive index, as described above. This makes it difficult to uniformly increase the refractive index in a thickness direction of the DLC film. Further, in the fabricated refractive index modulated-type diffractive optical element, a high extinction coefficient in the high-refractive-index region means that light is less likely to transmit through the relevant region, and this is not preferable from the viewpoint of diffraction efficiency as well. Therefore, Example 27 provides an optical pickup device including various optical elements fabricated with use of an Si—O containing hydrogenated carbon film that has superior properties as compared with the DLC film.

(Optical Pickup Device)

Figure 39:
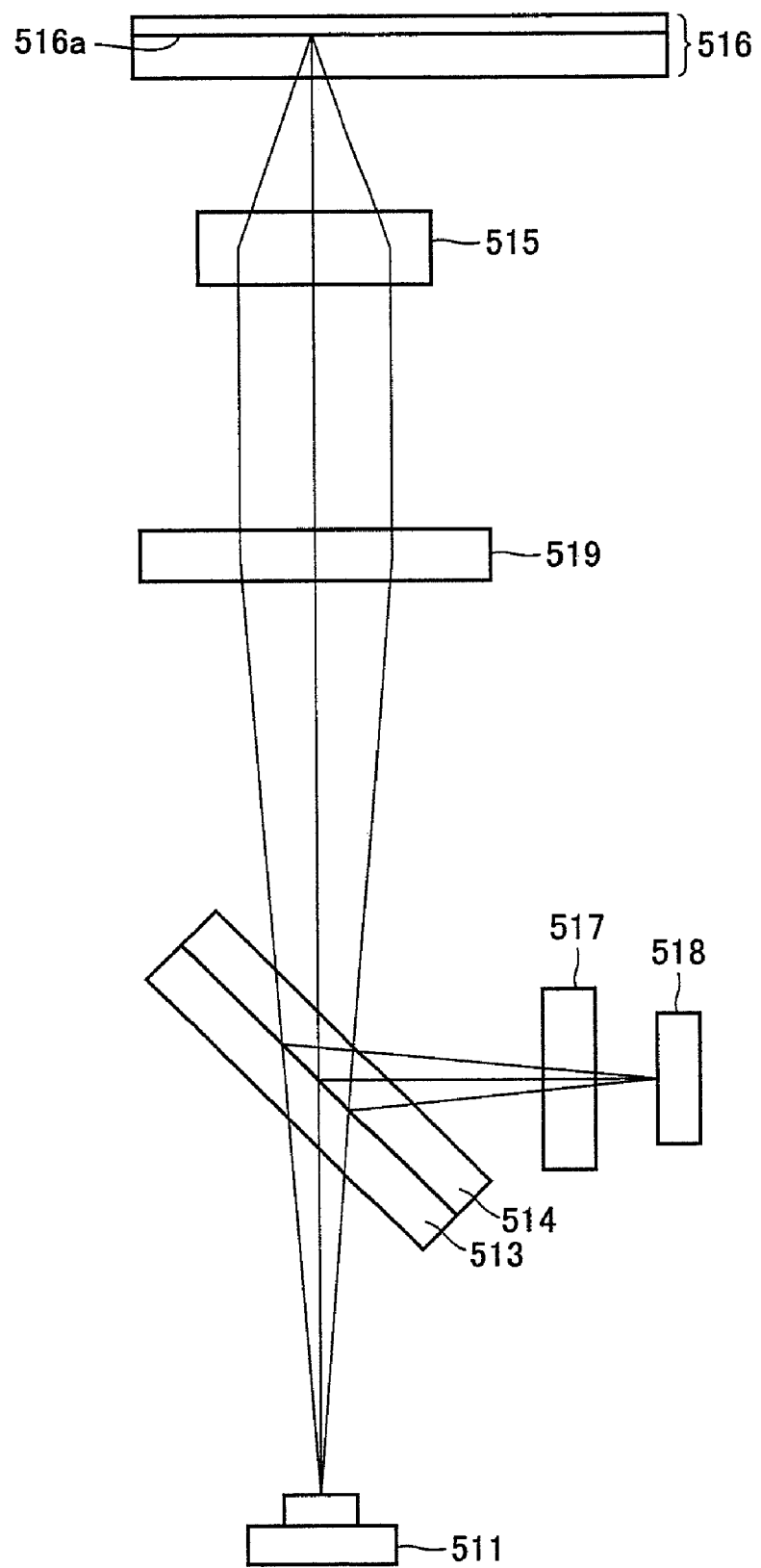
FIG. 39 is a schematic block diagram that shows an examplary optical pickup device according to the present invention.

FIG. 39 shows in a schematic block diagram an example of an optical pickup device in Example 27. In this optical pickup device, beam light from a light source 511 passes through a polarization beam splitter 513 to turn into first linearly polarized light, and is then made into circularly-polarized light by a quarter-wavelength plate 514, and converged onto a record surface 516a of an optical information record medium 516 through an objective lens 515. Return light reflected from information record surface 516a passes through objective lens 515 and quarter wavelength plate 514 to thereby turn into second linearly polarized light, which is rotated by 90 degrees with respect to the polarization direction of the first linearly polarized light. The second linearly polarized light reflected by polarization beam splitter 513 is then converged onto a light-receiving element 518 through a focusing lens 517.

Here, at least one of the optical elements included in the optical pickup device of FIG. 39 can be formed by utilization of an Si—O containing hydrogenated carbon film that includes a local region having a relatively low refractive index and a local region having a relatively high refractive index.

In the optical pickup device according to Example 27 as shown in FIG. 39, a collimator lens 519 for making light into a parallel light beam can be added as an optical element. A position for disposing collimator lens 519 is not particularly limited. Although it is disposed between quarter-wavelength plate 514 and objective lens 515 in FIG. 39, it may also be disposed between light source 511 and polarization beam splitter 513, for example.

In the optical pickup device according to the present invention, at least any of polarization beam splitter 513 and quarter-wavelength plate 514 can be fabricated by utilization of an Si—O containing hydrogenated carbon film. In other words, at least one of the polarization beam splitter and the quarter-wavelength plate can include a refractive index modulated-type diffraction grating formed in the Si—O containing hydrogenated carbon film.

(Polarization Beam Splitter)

For the polarization beam splitter, it is possible to utilize an Si—O containing hydrogenated carbon film that includes a refractive index modulated-type diffraction grating as described in detail in relation to FIG. 21.

(Quarter-Wavelength Plate)

A quarter-wavelength plate that includes a refractive index modulated-type diffraction grating can have a structure similar to that of the polarization beam splitter. For example, when P-polarized light of a light beam is directed to a quarter-wavelength plate (at this time, the quarter-wavelength plate is disposed such that the direction of the line and space of the low and high-refractive-index regions is rotated by 45 degrees with respect to the polarization direction of the P-polarized light), light having passed through the quarter-wavelength plate turns into circularly polarized light, the polarization direction of which is rotated in a counterclockwise direction with respect to the light advancing direction.

In the optical pickup device of FIG. 39, a complex obtained by combining polarization beam splitter 513 and quarter-wavelength plate 514 functions as follows. Specifically, regarding a light beam from light source 511, only the first linearly polarized light (S-polarized light) transmits through polarization beam splitter 513, turns into circularly polarized light rotated by quarter wavelength plate 514 in a counter-clockwise direction with respect to its advancing direction, passes through collimator lens 519, and is then converged by objective lens 515 onto record surface 516a of optical information record medium 516. Next, return light reflected from information record surface 516a (the rotational direction of the circularly polarized light is inverted owing to the reflection) passes through objective lens 515 and collimator lens 519, and is directed to quarter wavelength plate 514 in an inverse direction, to thereby turn into the second linearly polarized light (P-polarized light) rotated by 90 degrees with respect to the polarization direction of the first linearly polarized light. Therefore, the second linearly polarized light can be diffracted by polarization beam splitter 513, pass through focusing lens 517, and be converged onto light-receiving element 518.

Figure 40:
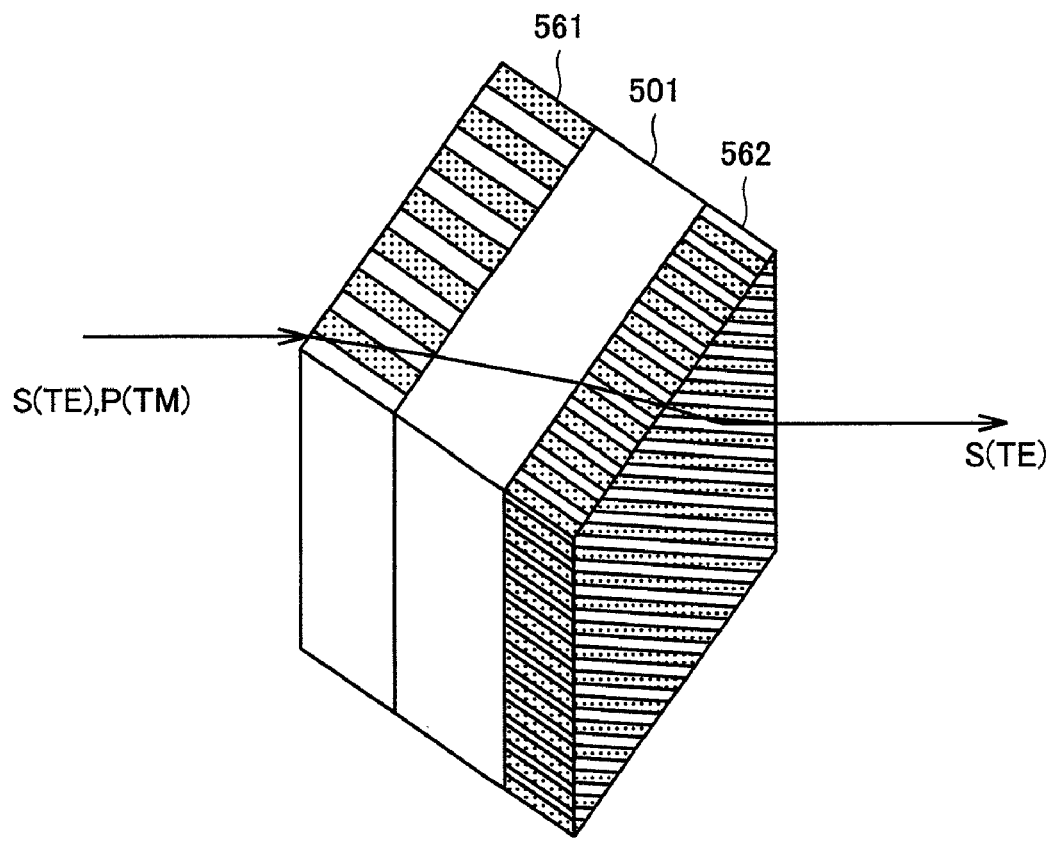
FIG. 40 is a schematic perspective view that shows an examplary complex of a polarization beam splitter and a quarter wavelength plate used in the optical pickup device according to the present invention.

Here, as shown in the schematic perspective view of FIG. 40, the complex of the polarization beam splitter and the quarter-wavelength plate can be obtained by forming a first Si—O containing hydrogenated carbon film 561 that serves as a polarization beam splitter on a first main surface of a substrate 501 made of SiO$_2$, for example, and forming a second Si—O containing hydrogenated carbon film 562 that serves as a quarter-wavelength plate on a second main surface of substrate 501.

In the optical pickup device according to the present invention, it is also possible to adopt an optical element that includes an Si—O containing hydrogenated carbon film for at least one of the objective lens, the focusing lens, and the collimator lens. Here, at least one of the objective lens, the focusing lens, and the collimator lens can include any of a refraction-type lens and a refractive index modulated-type diffraction lens formed in the Si—O containing hydrogenated carbon film.

(Refraction-Type Lens)

The refraction-type lens utilizing an Si—O containing hydrogenated carbon film can be fabricated, for example, as described above in detail with reference to FIG. 7.

(Refractive Index Modulated-Type Diffraction Lens)

The refractive index modulated-type lens utilizing an Si—O containing hydrogenated carbon film can be fabricated, for example, as described above in detail with reference to FIGS. 8 and 9. Such a diffraction-type lens can be fabricated thinner than the normal refraction-type lens, and can be fabricated in an Si—O containing hydrogenated carbon film having a thickness of approximately 1-2 µm. Therefore, by using this diffraction-type lens for at least one of the objective lens, the focusing lens, and the collimator lens in the optical pickup device, the optical pickup device can be reduced in size.

EXAMPLE 28

Example 28 in the present invention relates to an optical beam scan device and an optical product including the same. Conventionally, the optical beam scan device has widely been utilized in an optical product such as a laser printer, a bar code reader, or a scanner. In recent years, however, a demand for reduction in manufacturing costs and further reduction in size has been increased in such an optical product including an optical beam scan device.

For example, in the conventional laser beam scan device, it was necessary to control the maximum diameter of a laser beam emitted from a semiconductor laser with use of a pinhole aperture, and dispose a plurality of cylindrical lenses and prisms so as to receive the laser beam emitted from the semiconductor laser at a collimator lens and set a beam waist position to a desired position in each of a vertical vibration direction and a horizontal vibration direction (see paragraph [0004] in Patent Document 16 of Japanese Patent Laying-Open No. 6-27398).

In the conventional laser beam scan device, however, if a plurality of cylindrical lenses and prisms are provided in addition to the collimator lens at an emitting end of the semiconductor laser, the number of parts increases, for example, to thereby cause a problem of increase in manufacturing cost of the laser beam scan device and further a problem of difficulty in size reduction.

To solve such problems, Patent Document 16 discloses a laser beam scan device in which a laser beam emitted from a semiconductor laser is shaped by a conversion lens and a pinhole aperture (see paragraph [0009] in Patent Document 16), and the shaped laser beam is directed to beam scan means including a polygon mirror and the like and then applied to a bar code identified as an object to be irradiated (see paragraphs [0018]-[0026] and FIG. 2 of Patent Document 16).

In this laser beam scan device, however, the converging lens and the pinhole aperture are used for shaping a laser beam, and furthermore, the converging lens is provided with tilt angle control means for changing the tilt angle of the conversion lens (see paragraph [0008] and FIG. 1 of Patent Document 16).

Thus, this laser beam scan device also has a problem of insufficient reduction in manufacturing cost owing to the large number of parts. Further, this laser beam scan device has a problem of difficulty in size reduction as well because it is necessary to combine the above-described parts.

Therefore, it has been demanded to use an diffractive optical element to shape the laser beam by diffraction, instead of using a conversion lens and a pinhole aperture to shape the laser beam. As an example of the effect of such a diffraction-type beam-shaping element, reference can be made to FIG. 26 described above and the description relating thereto.

Further for example, Patent Document 17 of Japanese Patent Laying-Open No. 2006-30840 discloses an optical beam scan device including a light source for emitting a light beam, an diffractive optical element for shaping the light beam, and light beam scan means for changing the advancing direction of the light beam, in which a refractive index modulated-type diffractive optical element fabricated by utilization of a DLC film is used as the diffractive optical element for shaping the light beam.

In the optical beam scan device disclosed in Patent Document 17, however, it is necessary to irradiate the DLC film with an energy beam so as to locally increase the refractive index of the DLC film. Therefore, there is a tendency to cause increase in mean refractive index of the DLC film, and thus cause more light reflection at an interface between the DLC film and another medium adjacent thereto, resulting in a loss of light energy supplied from the light source.

Therefore, Example 28 provides an optical beam scan device capable of suppressing a loss of light energy supplied from the light source, and an optical product including the same.

(Refractive Index Modulation Pattern)

In an optical beam scan device according to Example 28, an diffractive optical element for shaping a beam is fabricated by utilization of an Si—O containing hydrogenated carbon film. Its refractive index modulation pattern can be determined by simulation as described in detail in relation to FIG. 24.

(Optical Beam Scan Device)

Figure 42:
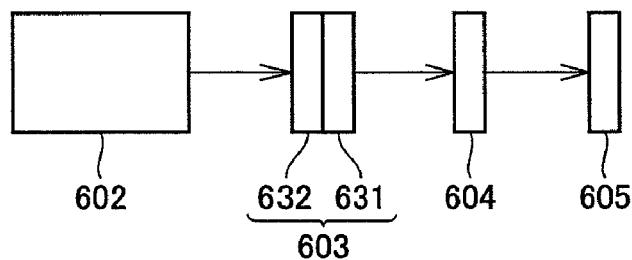
FIG. 42 is a schematic block diagram that shows an examplary optical beam irradiation in an optical beam scan device according to the present invention.

The schematic block diagram of FIG. 42 illustrates an optical beam irradiation caused by the optical beam scan device according to Example 28. This optical beam scan device includes an diffractive optical element 603 made with a transparent substrate 631 and an Si—O containing hydrogenated carbon film 632 formed thereon, as means for shaping a light beam emitted from a light source 602.

In other words, this optical beam scan device uses Si—O containing hydrogenated carbon film 632 instead of a DLC film in diffractive optical element 603 that shapes the light beam emitted from light source 602, and thus for the above-described reasons, it is possible to further suppress a loss of light energy in the light beam emitted from light source 602, as compared with a prior-art optical beam scan device using an DLC film.

In the optical beam scan device of FIG. 42, the light beam emitted from light source 602 is shaped by diffractive optical element 603. The light beam shaped by diffractive optical element 603 is then directed to a polygon mirror 604 being in rotary motion at a constant rate and then has its advancing direction changed by polygon mirror 604. The light beam having its changed advancing direction is applied to an object 605 to be irradiated. Here, a laser device such as a semiconductor laser, a light-emitting diode, or a lamp such as an extra-high-pressure mercury lamp, a xenon lamp, or a halide lamp is used for light source 602.

Note that in FIG. 42, refractive index modulated-type diffractive optical element 603 may also be disposed behind polygon mirror 604. In this case, the light beam emitted from light source 602 has its advancing direction changed by polygon mirror 604, and is then directed into diffractive optical element 603. The light beam shaped by diffractive optical element 603 is applied to object 605 to be irradiated.

(Laser Printer)

Figure 43:
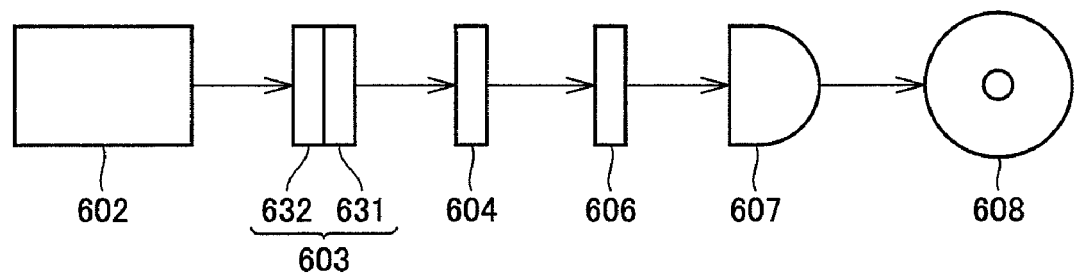
FIG. 43 is a schematic block diagram that shows an examplary laser printer according to the present invention.

The schematic block diagram of FIG. 43 shows an example of a laser printer that uses the optical beam scan device of FIG. 42. In this laser printer as well, a laser beam emitted from light source 602 of a semiconductor laser, for example, is shaped by refractive index modulated-type diffractive optical element 603 made with transparent substrate 631 and Si—O containing hydrogenated carbon film 632 located thereon, and then directed to polygon mirror 604. The laser beam having its advancing direction changed by polygon mirror 604 is shaped by a spherical lens 606 and a toroidal lens 607, and then applied to a photoconductive drum 608. As described above, in the laser printer according to Example 28, the laser beam is shaped only by diffractive optical element 603 without using many parts, and thus the light utilization efficiency can be improved.

The laser beam reflected by one of side surfaces of polygon mirror 604, which side surfaces are identified as side surfaces of a polygonal column and made as mirrors, scans on photoconductive drum 608 at a constant rate to form an image corresponding to a single row on photoconductive drum 608. By successively performing the image formation at a high rate, a two-dimensional image is depicted on photoconductive drum 608. Subsequently, toner is attached onto photoconductive drum 608 in accordance with the two-dimensional image depicted on photoconductive drum 608, and is then transferred onto a sheet of paper for printing the image.

In Example 28, it is also possible to use a second refractive index modulated-type diffractive optical element fabricated by utilization of an Si—O containing hydrogenated carbon film, instead of using spherical lens 606 and toroidal lens 607 shown in FIG. 43. In this case, the number of parts can further be decreased. In this case, the laser beam having its advancing direction changed by polygon mirror 604 is applied to photoconductive drum 608 through the second diffractive optical element.

(Scanner)

Figure 44:
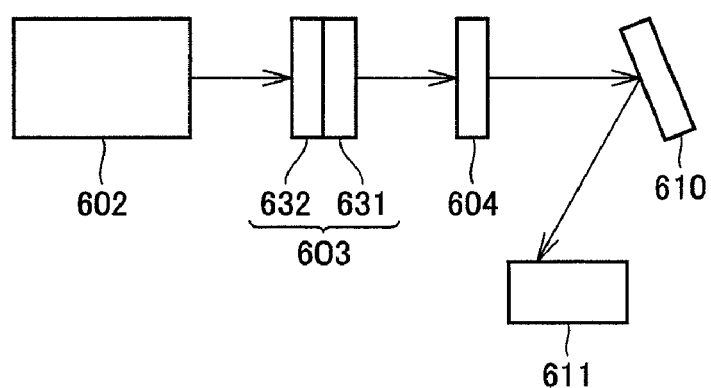
FIG. 44 is a schematic block diagram that shows an examplary scanner according to the present invention.

The schematic block diagram of FIG. 44 shows an example of a scanner in Example 28. In this scanner, a laser beam emitted from a semiconductor laser serving as light source 602 is shaped by refractive index modulated-type diffractive optical element 603, and then directed to polygon mirror 604. Next, the laser beam having its advancing direction changed by polygon mirror 604 is applied to a source document 610 on which an image is printed. The laser beam is then reflected from source document 610, and high or low intensity of the reflected laser beam is detected by a detector 611 such as a line scanner and converted into an electrical signal. As described above, in the scanner according to Example 28 as well, the laser beam can be shaped only by diffractive optical element 603 without using many parts, and the light utilization efficiency can be improved. Note that if source document 610 shown in FIG. 44 is replaced with a bar code, this scanner becomes a bar code reader.

INDUSTRIAL APPLICABILITY

As described above, according to the present invention, it is possible to provide a refractive index modulated-type diffractive optical element having a large amount of refractive index change Δn (i.e., high diffraction efficiency), high transparency for the ultraviolet light range as well as the visible light range, and favorable adaptability to generally-used optical elements, and an Si—O containing hydrogenated carbon film that can implement the same.

Further, by utilizing such an Si—O containing hydrogenated carbon film, it is possible to provide various types of optical devices.

The invention claimed is:

1. An Si—O containing hydrogenated carbon film which has a refractive index in a range from at least 1.48 to at most 1.85 for light of 520 nm wavelength and an extinction coefficient of less than 0.15 for light of 248 nm wavelength, wherein said refractive index and said extinction coefficient are decreased with energy beam irradiation.

2. The Si—O containing hydrogenated carbon film according to claim 1, wherein said extinction coefficient for the light of 248 nm wavelength is less than 0.12 before said energy beam irradiation.

3. The Si—O containing hydrogenated carbon film according to claim 1, wherein said refractive index for the light of 520 nm wavelength is in a range from at least 1.56 to at most 1.76 before said energy beam irradiation.

4. The Si—O containing hydrogenated carbon film according to claim 1, wherein said refractive index for the light of 520 nm wavelength is decreased with said energy beam irradiation by an amount of change in a range from at least 0.03 to at most 0.40, and the decreased refractive index is at least 1.45.

5. The Si—O containing hydrogenated carbon film according to claim 4, wherein said amount of change in said refractive index is in a range from at least 0.10 to at most 0.30.

6. The Si—O containing hydrogenated carbon film according to claim 1, wherein, before said energy beam irradiation, silicon content is more than $0.80 \times 10^{22}$ atoms/cm$^3$ and less than $1.5 \times 10^{22}$ atoms/cm$^3$, hydrogen content is more than $4.0 \times 10^{22}$ atoms/cm$^3$ and less than $8.0 \times 10^{22}$ atoms/cm$^3$, oxygen content is more than $0.80 \times 10^{22}$ atoms/cm$^3$ and less than $1.4 \times 10^{22}$ atoms/cm$^3$, carbon content is more than $1.5 \times 10^{22}$ atoms/cm$^3$ and less than $2.3 \times 10^{22}$ atoms/cm$^3$, an atomic % ratio of O/Si is more than 0.5 and less than 1.5, and an atomic % ratio of C/Si is more than 1.0 and less than 3.0.

7. The Si—O containing hydrogenated carbon film according to claim 1, wherein, before said energy beam irradiation, degree of density is in a range from more than 1.15 g/cm$^3$ to less than 1.60 g/cm$^3$, and spin density is in a range from more than $1.0 \times 10^{16}$ spins/cm$^3$ to less than $1.0 \times 10^{20}$ spins/cm$^3$.

8. The Si—O containing hydrogenated carbon film according to claim 1, wherein, after said energy beam irradiation, silicon content is more than $0.80 \times 10^{22}$ atoms/cm$^3$ and less than $1.5 \times 10^{22}$ atoms/cm$^3$, hydrogen content is more than $1.0 \times 10^{22}$ atoms/cm$^3$ and less than $8.0 \times 10^{22}$ atoms/cm$^3$, oxygen content is more than $0.80 \times 10^{22}$ atoms/cm$^3$ and less than $3.0 \times 10^{22}$ atoms/cm$^3$, carbon content is more than $1.0 \times 10^{22}$ atoms/cm$^3$ and less than $2.3 \times 10^{22}$ atoms/cm$^3$, an atomic % ratio of O/Si is more than 0.5 and less than 2.0, and an atomic % ratio of C/Si is more than 1.0 and less than 3.0.

9. The Si—O containing hydrogenated carbon film according to claim 1, wherein, after said energy beam irradiation, degree of density is in a range from more than 1.15 g/cm$^3$ to less than 1.80 g/cm$^3$, and spin density is less than $1.0 \times 10^{20}$ spins/cm$^3$.

10. A method for manufacturing the Si—O containing hydrogenated carbon film of claim 1, wherein said film is formed by plasma CVD using siloxanes as a source material, and a condition for the plasma CVD is that substrate temperature is at least 80° C. and at most 100° C., high-frequency power is at least 0.5 W/cm$^2$ and at most 1.2 W/cm$^2$, pressure is at least 6.7 Pa and at most 40 Pa, and the pressure until elapsed time of at least 3 minutes after a start of film formation is continuously increased at a rate in a range from at least 1.3 Pa/minute to at most 2.7 Pa/minute.

11. An optical element fabricated with use of the Si—O containing hydrogenated carbon film of claim 1, wherein the optical element includes a local region having a relatively high refractive index and a local region having a relatively low refractive index.

12. The optical element according to claim 11, wherein said local region having the relatively high refractive index is a region which has not undergone said energy beam irradiation in said Si—O containing hydrogenated carbon film.

13. The optical element according to claim 11, wherein said local region having the relatively low refractive index is a region which has undergone said energy beam irradiation in said Si—O containing hydrogenated carbon film.

14. A method for manufacturing the optical element of claim 11, wherein said local region having the relatively low refractive index is formed by said energy beam irradiation with a corpuscular beam including an ion beam, an electron beam, or a neutron beam, or an electromagnetic wave including an ultraviolet ray, an X-ray, or a gamma ray.

15. An optical film, wherein the Si—O containing hydrogenated carbon film of claim 1 is formed on a substrate, and at least one protective layer made of any of an oxide film, a nitride film, an oxynitride film, a fluoride film, and a film containing carbon and hydrogen as a major component is superposed on the Si—O containing hydrogenated carbon film.

16. An optical film, wherein the Si—O containing hydrogenated carbon film of claim 1 is formed on a substrate, and a transparent material plate having a thickness of at least 10 μm is joined on the Si—O containing hydrogenated carbon film.

17. The optical film according to claim 15, wherein a transparent material plate having a thickness of at least 10 μm is joined on said protective layer.

18. An optical element comprising the optical film of claim 15, wherein said Si-O containing hydrogenated carbon film has a refractive-index-modulated structure.

19. A flat plate-type microlens formed with use of the Si—O containing hydrogenated carbon film of claim 1, wherein said Si—O containing hydrogenated carbon film includes a region having its refractive index modulated, and produces a lens effect when a light flux passes through said region having its refractive index modulated.

20. An optical information record medium comprising the Si—O containing hydrogenated carbon film of claim 1 deposited on a substrate, wherein recording of information on the optical information record medium can be performed by irradiating a recording spot region selected from a plurality of recording spot regions with the energy beam, and decreasing the refractive index of said Si—O containing hydrogenated carbon film in the selected recording spot region.

21. A polarization integrator comprising: a polarization beam splitter for separating light from a light source into P-polarized light and S-polarized light; a first microlens; a half-wavelength plate; and a second microlens, wherein
said first microlens is disposed to converge the P-polarized light and the S-polarized light separated by said polarization beam splitter to positions different from each other,
said half-wavelength plate is disposed at a position to which said P-polarized light or said S-polarized light is converged, so as to serve to convert the P-polarized light into S-polarized light or convert the S-polarized light into P-polarized light,
said second microlens serves to integrate the S-polarized light or the P-polarized light having passed through said half-wavelength plate and converted into the other polarization, with the S-polarized light or the P-polarized light having not passed through said half-wavelength plate, and
at least one of said polarization beam splitter, said first microlens, said half-wavelength plate, and said second microlens is formed by using the Si—O containing hydrogenated carbon film of claim 1.

22. The polarization integrator according to claim 21, wherein at least one of said polarization beam splitter and said half-wavelength plate is formed of a refractive index modulated-type diffraction grating formed in said Si—O containing hydrogenated carbon film.

23. A liquid crystal projector comprising the polarization integrator of claim 21.

24. A projector comprising: a light source; and an diffractive optical element for diffracting light from the light source, wherein
said diffractive optical element includes the Si—O containing hydrogenated carbon film of claim 1 formed on a transparent substrate,
said Si—O containing hydrogenated carbon film is subjected to refractive index modulation so as to include a plurality of regions having a relatively high refractive index and a plurality of regions having a relatively low refractive index, for causing diffraction of the light, and
said refractive index modulation causes a diffraction effect so as to convert an intensity distribution in a cross section of a light beam directed to said Si—O containing hydrogenated carbon film into a uniform intensity distribution on a prescribed irradiation surface.

25. The projector according to claim 24, wherein said refractive index modulation also causes a diffraction effect so as to convert a cross-sectional shape of the light beam directed to said Si—O containing hydrogenated carbon film into a prescribed cross-sectional shape on said prescribed irradiation surface.

26. A color liquid crystal display device comprising: a light source; a holographic color filter; and a liquid crystal panel, wherein
said holographic color filter includes the Si—O containing hydrogenated carbon film of claim 1 formed on a transparent substrate,
said Si—O containing hydrogenated carbon film has a refractive-index-modulated structure in which a band-like region having a relatively high refractive index and a band-like region having a relatively low refractive index are alternately disposed, and has a function of diffracting and spectroscopically splitting, by a hologram, incident light supplied from said light source, so as to emit lights of different wavelengths at a prescribed spatial periodicity, and
said spatial periodicity corresponds to a periodicity of a plurality of pixels included in said liquid crystal panel.

27. The color liquid crystal display device according to claim 26, wherein said band-like region having the relatively high refractive index has its width and interval being periodically changed corresponding to said spatial periodicity, so as to cause said holographic color filter to have not only a spectroscopic function but also a microlens array function.

28. The color liquid crystal display device according to claim 26, wherein the refractive index is continuously changed in a boundary region between said band-like region having the low refractive index and said band-like region having the high refractive index in said holographic color filter.

29. The color liquid crystal display device according to claim 26, wherein a boundary region between said band-like region having the low refractive index and said band-like region having the high refractive index in said holographic color filter is tilted with respect to a thickness direction of said Si—O containing hydrogenated carbon film.

30. The color liquid crystal display device according to claim 26, wherein each of the plurality of pixels included in said liquid crystal panel includes a red display region, a green display region and a blue display region, and said holographic color filter spectroscopically splits said incident light so as to direct red light, green light, and blue light to said red display region, said green display region, and said blue display region, respectively.

31. An optical pickup device for at least any of recording and reproducing of information on an optical information record medium, comprising: a light source for emitting a light beam; and a plurality of optical elements for controlling said light beam, wherein at least one of these optical elements includes the Si—O containing hydrogenated carbon film of claim 1, and this film includes a local region having a relatively high refractive index and a local region having a relatively low refractive index.

32. The optical pickup device according to claim 31, wherein the optical element including the Si—O containing hydrogenated carbon film is any of a polarization beam splitter, a quarter wavelength plate, an objective lens, a focusing lens, and a collimator lens.

33. An optical beam scan device comprising: a light source for emitting a light beam; an diffractive optical element for shaping said light beam; and light beam scan means for changing a traveling direction of said light beam, wherein said diffractive optical element includes the Si—O containing hydrogenated carbon film of claim 1 formed on a transparent substrate, and this film includes a plurality of regions having a relatively high refractive index and a plurality of regions having a relatively low refractive index.

* * * * *